US012699479B2

(12) United States Patent
Kim et al.

(10) Patent No.: US 12,699,479 B2
(45) Date of Patent: Aug. 4, 2026

(54) ELECTRONIC DEVICE

(71) Applicant: SAMSUNG DISPLAY CO., LTD., Yongin-si (KR)

(72) Inventors: Hyungbae Kim, Yongin-si (KR); Sanghyun Lim, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/924,181

(22) Filed: Oct. 23, 2024

(65) Prior Publication Data

US 2025/0138669 A1 May 1, 2025

(30) Foreign Application Priority Data

Nov. 1, 2023 (KR) ........................ 10-2023-0149005

(51) Int. Cl.
  *G06F 3/041* (2006.01)
  *G06F 3/044* (2006.01)

(52) U.S. Cl.
  CPC ........ *G06F 3/04164* (2019.05); *G06F 3/0446* (2019.05); *G06F 2203/04101* (2013.01); *G06F 2203/04106* (2013.01); *G06F 2203/04111* (2013.01)

(58) Field of Classification Search
  CPC ............... G06F 3/04164; G06F 3/0446; G06F 2203/04101; G06F 2203/04106; G06F 2203/04111; G06F 3/04166; G06F 3/0442; G06F 3/04162; G06F 3/03545; G06F 3/047
  See application file for complete search history.

(56) References Cited

U.S. PATENT DOCUMENTS

| | | | |
|---|---|---|---|
| 8,674,967 B2 | 3/2014 | Fukushima et al. | |
| 8,952,924 B2 * | 2/2015 | Lee ........................ | G06F 3/0446 |
| | | | 345/174 |
| 9,081,440 B2 * | 7/2015 | Chang .................... | G06F 3/0447 |
| 9,696,858 B2 * | 7/2017 | Shepelev .............. | G06F 3/0412 |
| 10,521,044 B2 | 12/2019 | Fujisawa et al. | |
| 10,684,731 B2 * | 6/2020 | Wang .................... | G06F 3/0443 |
| 11,029,790 B2 * | 6/2021 | Ju ........................ | G06F 3/03545 |
| 11,294,501 B2 * | 4/2022 | Tang ................. | G06F 3/041662 |
| 11,360,620 B2 * | 6/2022 | Kim ...................... | G06F 3/0446 |
| 11,444,136 B2 * | 9/2022 | Kim ...................... | G06F 3/0445 |

(Continued)

FOREIGN PATENT DOCUMENTS

| | | |
|---|---|---|
| KR | 10-2020-0050664 | 5/2020 |
| KR | 10-2020-0143628 | 12/2020 |

*Primary Examiner* — Benyam Ketema
(74) *Attorney, Agent, or Firm* — F. CHAU & ASSOCIATES, LLC

(57) ABSTRACT

An electronic device includes a sensor layer and a sensor driver configured to operate in one of a first mode to sense an input by a touch and a second mode to sense an input by a pen. The sensor layer includes a plurality of first electrodes, a plurality of second electrodes, a third electrode having a plurality of first auxiliary electrodes overlapping the plurality of first electrodes, and a fourth electrode having a plurality of second auxiliary electrodes overlapping the plurality of second electrodes. In the second mode, the sensor driver is configured to receive a signal from at least one electrode among the plurality of first electrodes, the plurality of second electrodes, the third electrode, and the fourth electrode.

27 Claims, 36 Drawing Sheets

(56)　　　　References Cited

U.S. PATENT DOCUMENTS

| | | | |
|---|---|---|---|
| 11,625,118 B2* | 4/2023 | Kim | G06F 3/0412 |
| | | | 345/173 |
| 11,709,564 B2 | 7/2023 | Heo et al. | |
| 11,726,625 B2* | 8/2023 | Kim | G06F 3/0445 |
| | | | 345/174 |
| 12,204,708 B2* | 1/2025 | Jin | G06F 3/04166 |
| 12,236,054 B1* | 2/2025 | Lim | G06F 3/046 |
| 12,265,677 B1* | 4/2025 | Ko | G06F 3/046 |
| 12,422,944 B2* | 9/2025 | Kim | G06F 3/0416 |
| 2010/0245289 A1* | 9/2010 | Svajda | G06F 3/0421 |
| | | | 345/175 |
| 2011/0048812 A1* | 3/2011 | Yilmaz | G06F 3/04164 |
| | | | 178/18.06 |
| 2012/0075249 A1* | 3/2012 | Hoch | G06F 3/0445 |
| | | | 345/174 |
| 2012/0092350 A1* | 4/2012 | Ganapathi | G06F 3/04146 |
| | | | 29/829 |
| 2013/0300691 A1* | 11/2013 | Huang | H01H 1/12 |
| | | | 200/275 |
| 2014/0347319 A1* | 11/2014 | Lin | G06F 3/0445 |
| | | | 345/174 |
| 2015/0305138 A1* | 10/2015 | Tombs | H05K 3/107 |
| | | | 29/850 |
| 2016/0070398 A1* | 3/2016 | Worfolk | G06F 3/0446 |
| | | | 345/174 |
| 2016/0139701 A1* | 5/2016 | Wang | G06F 3/046 |
| | | | 345/174 |
| 2017/0068368 A1* | 3/2017 | Hsiao | G06F 3/0445 |
| 2017/0123555 A1* | 5/2017 | Kim | G06V 40/1359 |
| 2017/0322674 A1* | 11/2017 | Rosenberg | G06F 3/04182 |
| 2019/0196639 A1* | 6/2019 | Mugiraneza | G06F 3/046 |
| 2020/0249793 A1* | 8/2020 | Xu | G06F 3/0446 |
| 2022/0050576 A1* | 2/2022 | Jo | G06F 3/04164 |
| 2022/0147212 A1* | 5/2022 | Kim | G06F 3/04162 |
| 2022/0187938 A1* | 6/2022 | Han | G06F 3/04162 |
| 2022/0187979 A1* | 6/2022 | Jung | G06F 3/0446 |
| 2023/0096996 A1* | 3/2023 | Kishimoto | H10K 59/131 |
| | | | 345/174 |
| 2024/0118776 A1* | 4/2024 | Yi | G06F 3/0446 |
| 2024/0184397 A1* | 6/2024 | Ku | G06F 3/0443 |
| 2025/0138667 A1* | 5/2025 | Lim | G06F 3/0443 |
| 2025/0138686 A1* | 5/2025 | Ko | G06F 3/04162 |
| 2025/0138687 A1* | 5/2025 | Ku | H10K 59/40 |
| 2025/0231650 A1* | 7/2025 | So | G06F 3/04164 |
| 2025/0251815 A1* | 8/2025 | Lim | G06F 3/044 |
| 2025/0251827 A1* | 8/2025 | Lim | G06F 3/04164 |
| 2025/0271966 A1* | 8/2025 | Gwon | G06F 3/04182 |
| 2025/0348169 A1* | 11/2025 | Han | G06F 3/04166 |
| 2025/0348175 A1* | 11/2025 | Park | G06F 3/04166 |

* cited by examiner

FIG. 11
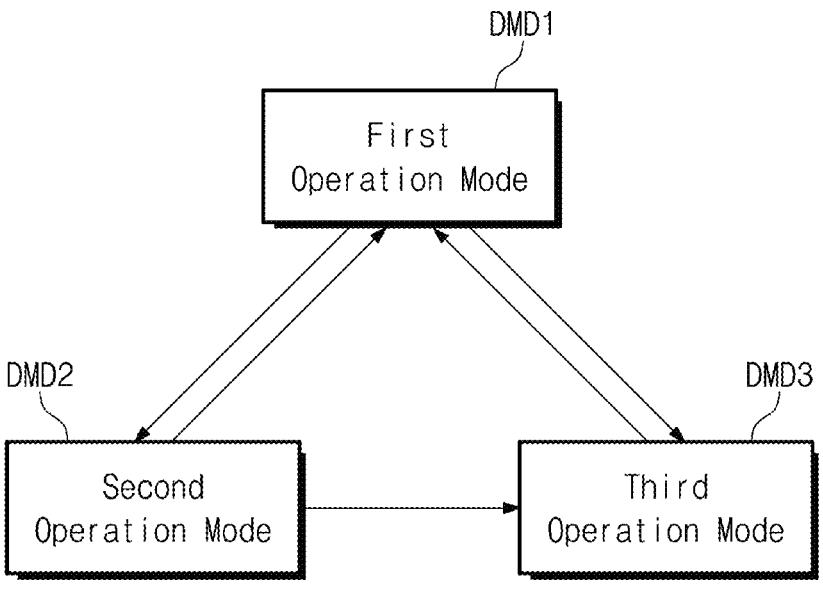
FIG. 12
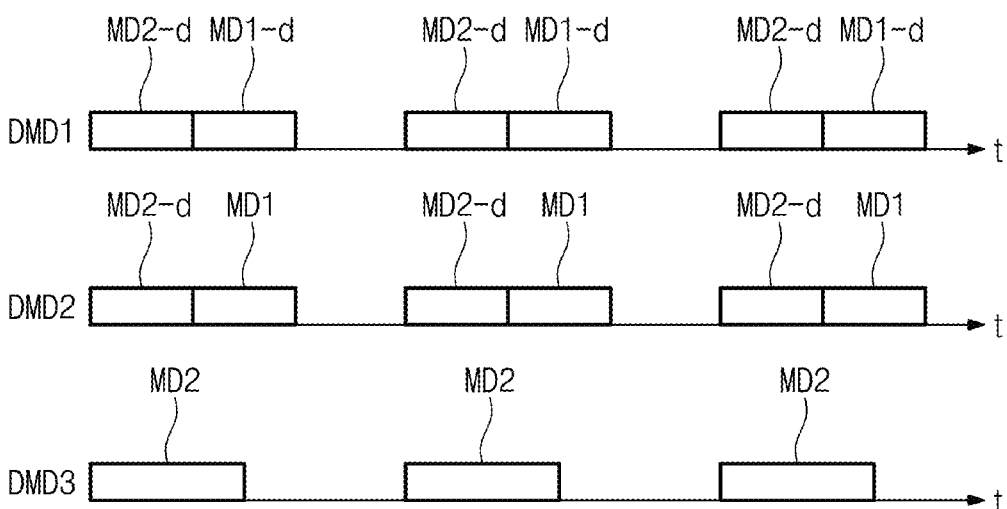
FIG. 13
| MD2 | PCD | PHS | PPS |

FIG. 20

|  | First Electrode | Second Electrode | Third Electrode | Fourth Electrode |
|---|---|---|---|---|
| DATA1 | HSG1 | HSG2 | HSG3 | HSG4 |
| DATA2 | HSG1 | HSG2 | — | HSG4 |
| DATA3 | HSG1 | HSG2 | — | — |

FIG. 21A

|  | DATA1 > TH1 | DATA2 > TH2 | DATA3 > TH3 |
|---|---|---|---|
| ST1 | ○ | ○ | ○ |
| ST2 | ○ | ○ | × |
| ST3 | ○ | × | × |
| ST4 | × | × | × |

FIG. 21B

| ST1 | THa < SDATA |
|---|---|
| ST2 | THb < SDATA ≦ THa |
| ST3 | THc < SDATA ≦ THb |
| ST4 | SDATA ≦ THc |

FIG. 22

|  | ST1 | ST2 | ST3 | ST4 |
|---|---|---|---|---|
| First Electrode | EN | EN | EN | EN |
| Second Electrode | EN | EN | EN | EN |
| Third Electrode | DIS | DIS | DIS | EN |
| Fourth Electrode | DIS | DIS | EN | EN |

ELECTRONIC DEVICE

CROSS-REFERENCE TO RELATED APPLICATIONS

This U.S. non-provisional patent application claims priority under 35 U.S.C. § 119 to Korean Patent Application No. 10-2023-0149005, filed on Nov. 1, 2023, the entire disclosure of which is incorporated by reference in its entirety herein.

TECHNICAL FIELD

The present disclosure herein is directed to an electronic device capable of sensing an input by a pen and a proximity input by the pen.

DISCUSSION OF RELATED ART

Multimedia electronic apparatuses, such as a television, a mobile phone, a tablet computer, a laptop computer, a navigation system, and a game console, include display devices for providing images. The electronic apparatus may include a touch-based input system that enables a user to input information or command intuitively and conveniently, different from a general input system such as a button, a keyboard, and a mouse.

A sensor layer of the touch-based input system may sense touch, pressure, or proximity of an object (e.g., a finger, a pen/stylus). For example, the pen may be used for sketching or drawing. However, it may be difficult to recognize a proximity of the pen. Thus, there is a need for a sensor layer with increased ability to recognize the proximity of the pen.

SUMMARY

The present disclosure provides an electronic device capable of sensing an input by a pen and a proximity input by the pen.

An embodiment of the inventive concept provides an electronic device including a sensor layer, and a sensor driver. The sensor driver is configured to operate in one of a first mode to sense an input by a touch and a second mode to sense an input by a pen. The sensor layer includes a plurality of first electrodes arranged along a first direction, and extending along a second direction crossing the first direction, a plurality of second electrodes arranged along the second direction, and extending along the first direction, a third electrode having a plurality of first auxiliary electrodes which are arranged along the first direction, extend along the second direction, and overlap the plurality of first electrodes, and a fourth electrode having a plurality of second auxiliary electrodes which are arranged along the second direction, extend along the first direction, and overlap the plurality of second electrodes. The sensor driver is configured to receive a signal from at least one electrode among the plurality of first electrodes, the plurality of second electrodes, the third electrode, and the fourth electrode, in the second mode.

In an embodiment, the sensor driver may include an analog front-end circuit, and in the second mode, the analog front-end circuit may be selectively connected to the at least one electrode.

In an embodiment, the second mode may include a pen proximity sensing driving mode, and in the pen proximity sensing driving mode, the sensor driver may be configured to calculate first data based on signals received from the plurality of first electrodes, the plurality of second electrodes, the third electrode, and the fourth electrode, to calculate second data based on signals received from the plurality of first electrodes, the plurality of second electrodes, and the fourth electrode, and to calculate third data based on signals received from the plurality of first electrodes and the plurality of second electrodes.

In an embodiment, the sensor driver may be configured to determine a distance section between the sensor layer and the pen by comparing the first data to a first threshold value, the second data to a second threshold value, and the third data to a third threshold value.

In an embodiment, the sensor driver may be configured to determine a distance section between the sensor layer and the pen by comparing a sum of the first data, the second data, and the third data to a plurality of threshold values.

In an embodiment, distance sections between the sensor layer and the pen may include a contact section which is most adjacent to the sensor layer, a proximity section which is above the contact section, and a remote distance section which is above the proximity section, and the sensor driver may be configured to deactivate the third electrode and the fourth electrode when it is determined that the pen is positioned in the contact section, and deactivate the third electrode when it is determined that the pen is positioned in the proximity section.

In an embodiment, one first electrode among the plurality of first electrodes may overlap one first auxiliary electrode among the plurality of first auxiliary electrodes, and one second electrode among the plurality of second electrodes may overlap one second auxiliary electrode among the plurality of second auxiliary electrodes, and a first coupling capacitor may be defined between the one first electrode and the one first auxiliary electrode, and a second coupling capacitor may be defined between the one second electrode and the one second auxiliary electrode.

In an embodiment, the second mode may include a pen sensing driving mode, and in the pen sensing driving mode, the sensor driver may be configured to operate in a normal operation mode where a first induced current, flowing from the one first auxiliary electrode toward the one first electrode through the first coupling capacitor, is received, and a second induced current, flowing from the one second auxiliary electrode toward the one second electrode through the second coupling capacitor, is received.

In an embodiment, in the pen sensing driving mode, the sensor driver may operate in a time-division manner in the normal operation mode and any one among a first operation mode where signals are received from the plurality of first electrodes, the plurality of second electrodes, the plurality of first auxiliary electrodes, and the plurality of second auxiliary electrodes, a second operation mode where signals are received from the plurality of first electrodes, the plurality of second electrodes, and the plurality of second auxiliary electrodes, and a third operation mode where signals are received from the plurality of first electrodes, the plurality of second electrodes, and the plurality of first auxiliary electrodes.

In an embodiment, the sensor layer may further include a plurality of first trace lines electrically connected to the plurality of first electrodes in a one-to-one correspondence, a plurality of second trace lines electrically connected to the plurality of second electrodes in a one-to-one correspondence, a third trace line electrically connected to the plurality of first auxiliary electrodes, and a fourth trace line electrically connected to at least one second auxiliary electrode among the plurality of second auxiliary electrodes.

In an embodiment, all of the plurality of second auxiliary electrodes may be electrically connected to the fourth trace line.

In an embodiment, the fourth trace line may be connected to one end portion of each of the plurality of second auxiliary electrodes.

In an embodiment, the fourth trace line may be connected in a region where the fourth trace line overlaps each of the plurality of second auxiliary electrodes.

In an embodiment, the fourth trace line may be provided in plurality, one fourth trace line may be electrically connected to some second auxiliary electrodes among the plurality of second auxiliary electrodes, and another fourth trace line may be electrically connected to the other second auxiliary electrodes among the plurality of second auxiliary electrodes, and the one fourth trace line may be spaced apart from the other fourth trace line in the first direction.

In an embodiment, the third trace line may be connected to first end portions of the plurality of first auxiliary electrodes to electrically connect the first end portions to each other, and second end portions of the plurality of first auxiliary electrodes, may be spaced apart from the first end portions in the second direction, and the second end portions may be spaced apart from each other.

In an embodiment, the third trace line may include a first line portion extending along the first direction and electrically connected to the first end portions of the plurality of first auxiliary electrodes, a second line portion extending from one end of the first line portion along the second direction, and a third line portion extending from the other end of the first line portion along the second direction.

In an embodiment, the sensor layer may further include a plurality of fifth trace lines electrically connected to the plurality of first auxiliary electrodes.

In an embodiment, the sensor driver may include an analog front-end circuit, and in the second mode, the analog front-end circuit may be selectively connected to at least one of the second line portion, the third line portion, or the plurality of fifth trace lines.

In an embodiment of the inventive concept, an electronic device includes a sensor layer and a sensor driver. The sensor driver is configured to operate in one of a first mode to sense an input by a touch and a second mode to sense an input by a pen. The sensor driver includes an analog front-end circuit. The sensor layer includes a first electrode, a second electrode crossing the first electrode, a first auxiliary electrode overlapping the first electrode, and a second auxiliary electrode overlapping the second electrode. In the second mode, the analog front-end circuit is electrically connected to the first electrode and the second electrode, and selectively electrically connected to the first auxiliary electrode and the second auxiliary electrode.

In an embodiment, the second mode may include a pen proximity sensing driving mode, in the pen proximity sensing driving mode, the sensor driver may be configured to calculate first data based on signals received from the first electrode, the second electrode, the first auxiliary electrode, and the second auxiliary electrode, to calculate second data based on signals received from the first electrode, the second electrode, and the second auxiliary electrode, and to calculate third data based on signals received from the first electrode and the second electrode. The sensor driver may be configured to determine a distance section between the sensor layer and the pen by comparing the first data, the second data, and the third data to a threshold value, the distance section may include a contact section which is most adjacent to the sensor layer, a proximity section which is above the contact section, and a remote distance section which is above the proximity section, and the sensor driver may be configured to deactivate the first auxiliary electrode and the second auxiliary electrode when it is determined that the pen is positioned in the contact section, and deactivate the first auxiliary electrode when it is determined that the pen is positioned in the proximity section.

In an embodiment, the second mode may include a pen sensing driving mode, and in the pen sensing driving mode, the sensor driver may be configured to operate in a normal operation mode where a first induced current, flowing from the first auxiliary electrode toward the first electrode through a first coupling capacitor between the first electrode and the first auxiliary electrode, is received, and a second induced current, flowing from the second auxiliary electrode toward the second electrode through a second coupling capacitor between the second electrode and the second auxiliary electrode, is received.

In an embodiment, in the pen sensing driving mode, the sensor driver may operate in a time-division manner in the normal operation mode and any one among a first operation mode where signals are received from the first electrode, the second electrode, the first auxiliary electrode, and the second auxiliary electrode, a second operation mode where signals are received from the first electrode, the second electrode, and the second auxiliary electrode, and a third operation mode where signals are received from the first electrode, the second electrode, and the first auxiliary electrode.

In an embodiment of the inventive concept, an electronic device includes a sensor layer, and a sensor driver. The sensor driver is configured to operate in one of a first mode to sense an input by a touch and a second mode to sense an input by a pen. The sensor layer includes a first electrode to which a first driving signal is applied in the first mode, a second electrode configured to output a first sensing signal in the first mode, a third electrode overlapping the first electrode and configured to output a first signal in the second mode, and a fourth electrode overlapping the second electrode, and configured to output a second signal in the second mode. In the second mode, the sensor driver is configured to calculate a plurality of pieces of data based on the first signal and the second signal, and determine a distance section between the sensor layer and the pen based on the plurality of pieces of data.

In an embodiment, in the second mode, the sensor driver may be configured to further receive a third signal from the first electrode, and further receive a fourth signal from the second electrode.

In an embodiment, in the second mode, the sensor driver may be configured to calculate first data based on signals received from the first electrode, the second electrode, the third electrode, and the fourth electrode, to calculate second data based on signals received from the first electrode, the second electrode, and the fourth electrode, and to calculate third data based on signals received from the first electrode and the second electrode.

In an embodiment, the sensor driver may be configured to determine a distance section between the sensor layer and the pen by comparing the first data to a first threshold value, the second data to a second threshold value, and the third data to a third threshold value.

In an embodiment, the sensor driver may be configured to determine a distance section between the sensor layer and the pen by comparing a sum of the first data, the second data, and the third data to a plurality of threshold values.

BRIEF DESCRIPTION OF THE FIGURES

The accompanying drawings are included to provide a further understanding of the inventive concept, and are incorporated in and constitute a part of this specification. The drawings illustrate embodiments of the inventive concept and, together with the description, serve to explain principles of the inventive concept. In the drawings:

FIG. 11 is a drawing illustrating operation of a sensor driver according to an embodiment of the inventive concept;

FIG. 12 is a drawing illustrating operation of a sensor driver according to an embodiment of the inventive concept;

FIG. 13 is a drawing illustrating operation of a sensor driver according to an embodiment of the inventive concept;

FIG. 20 is a drawing illustrating a pen proximity sensing driving mode according to an embodiment of the inventive concept;

FIG. 21A is a drawing illustrating a pen proximity sensing driving mode according to an embodiment of the inventive concept;

FIG. 21B is a drawing illustrating a pen proximity sensing driving mode according to an embodiment of the inventive concept;

FIG. 22 is a drawing illustrating a pen proximity sensing driving mode according to an embodiment of the inventive concept;

DETAILED DESCRIPTION

Figure 1A:
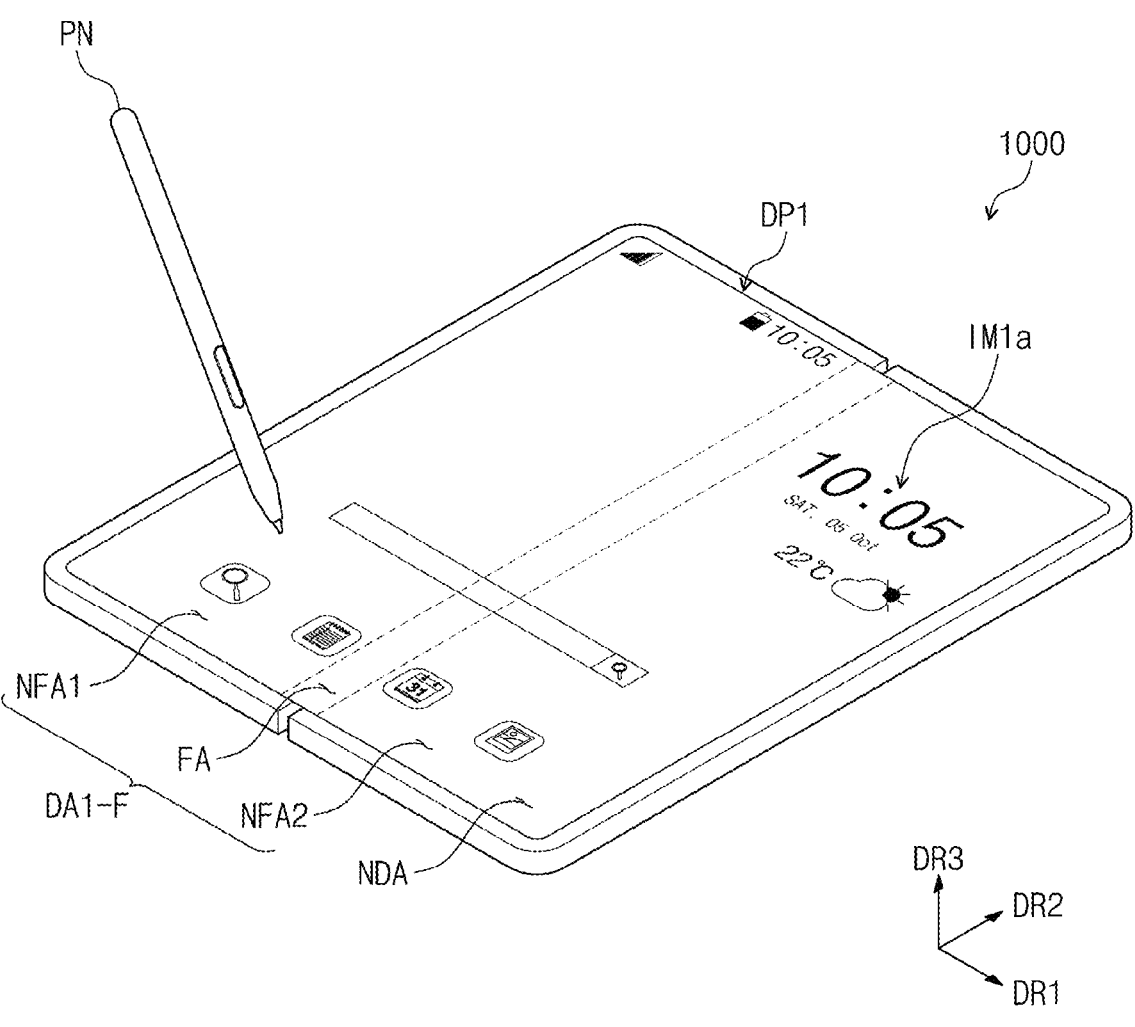
FIG. 1A is a perspective view of an electronic device according to an embodiment of the inventive concept.

In this specification, it will be understood that when an element (or a region, a layer, a portion, or the like) is referred to as being "on", "connected to", "coupled to" another element, it may be directly disposed on, connected or coupled to the other element, or intervening elements may be disposed therebetween.

Like reference numerals or symbols refer to like elements throughout. As used herein, the term "and/or" includes any and all combinations of one or more of the associated listed items. As used herein, the singular forms, "a", "an" and "the" are intended to include the plural forms as well, unless the context clearly indicates otherwise.

The term "part" or "unit" herein may mean a software component or a hardware component that performs a specific function. The hardware component may include, for example, a field-programmable gate array (FPGA) or an application-specific integrated circuit (ASIC). The software component may refer to data used by an executable code and/or an executable code within an addressable storage medium. Therefore, the software components may be, for example, object-oriented software components, class components, and task components, and may include processes, functions, properties, procedures, subroutines, program code segments, drivers, firmware, micro codes, circuits, data, database, data structures, tables, arrangements, or variables.

Hereinafter, embodiments of the inventive concept are described with reference to the accompanying drawings.

Figure 1B:
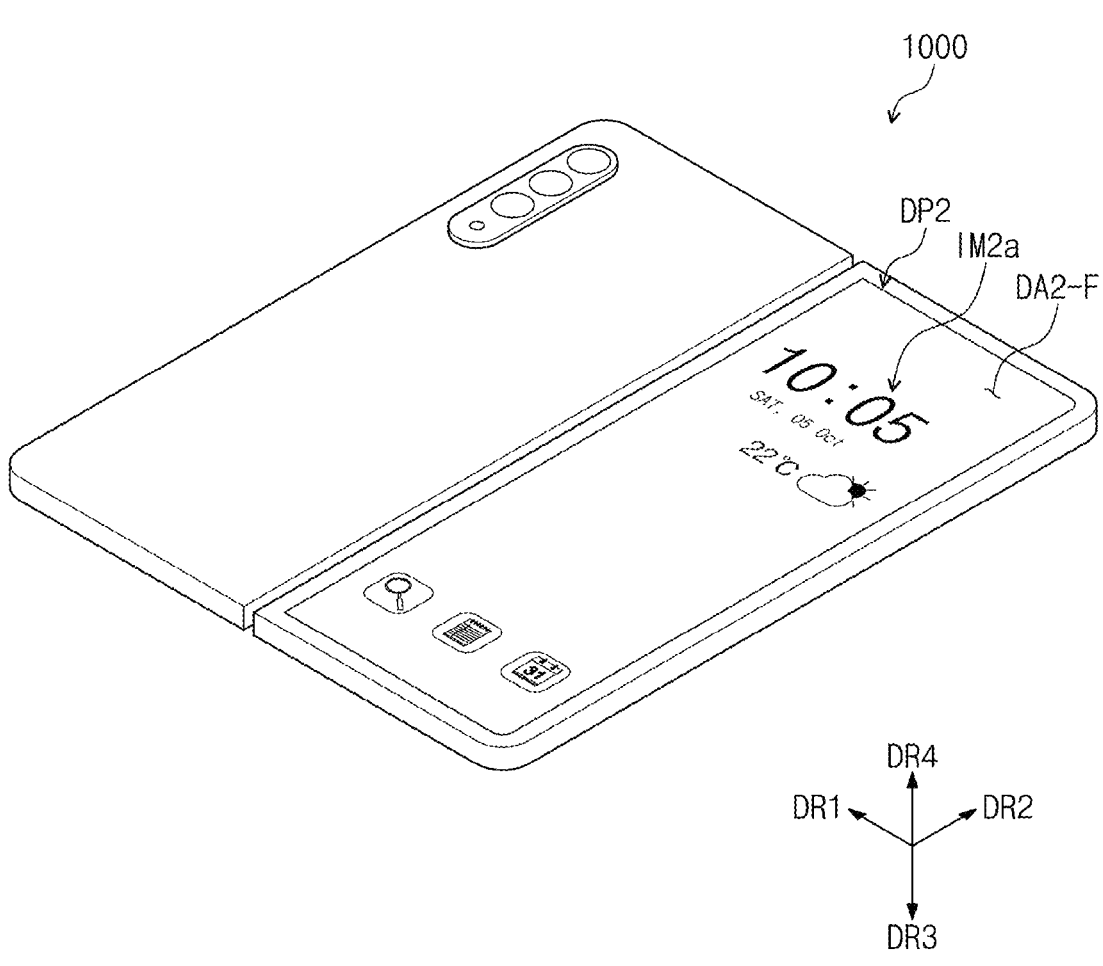
FIG. 1B is a rear perspective view of an electronic device according to an embodiment of the inventive concept.

FIG. 1A is a perspective view of an electronic device 1000 according to an embodiment of the inventive concept. FIG. 1B is a rear perspective view of the electronic device 1000 according to an embodiment of the inventive concept.

Referring to FIGS. 1A and 1B, the electronic device 1000 may be activated in response to electrical signals. For example, the electronic device 1000 may display an image, and sense inputs applied from the outside. The external input may be an input by a user. The input by the user may include various types of external inputs such as a part of a user's body (e.g., a finger), a pen (PN) or stylus, light, heat, or pressure. The pen or the stylus may also be referred to as an object.

The electronic device 1000 may include a first display panel DP1 and a second display panel DP2. The first display panel DP1 and the second display panel DP2 may be different panels separated from each other. The first display panel DP1 may be referred to as a main display panel, and the second display panel DP2 may be referred to as an auxiliary display panel or an external display panel.

The first display panel DP1 may include a first display part DA1-F, and the second display panel DP2 may include a second display part DA2-F. The area of the second display panel DP2 may be smaller than the area of the first display panel DP1. In correspondence to the sizes of the first display panel DP1 and the second display panel DP2, the area of the first display part DA1-F may be larger than the area of the second display part DA2-F.

When the electronic device 1000 is unfolded, the first display part DA1-F may have a flat surface substantially parallel to a first direction DR1 and a second direction DR2. The thickness direction of the electronic device 1000 may be parallel to a third direction DR3 crossing the first direction DR1 and the second direction DR2. Therefore, a front surface (or upper surface) and a rear surface (or lower surface) of each of members constituting the electronic device 1000 may be defined on the basis of the third direction DR3.

The first display panel DP1 or the first display part DA1-F may include a folding region FA capable of folding and unfolding, and a plurality of non-folding regions NFA1 and NFA2 spaced apart from each other with the folding region FA therebetween. The second display panel DP2 may overlap any one among the plurality of non-folding regions NFA1 and NFA2. For example, the second display panel DP2 may overlap a first non-folding region NFA1.

A display direction in which a first image IM1$a$ is displayed in a portion of the first display panel DP1, for example, in the first non-folding region NFA1, may be the complete opposite direction of a display direction in which a second image IM2$a$ is displayed in the second display panel DP2. For example, the first image IM1$a$ may be displayed in the third direction DR3, and the second image IM2$a$ may be displayed in a fourth direction DR4 which is the complete opposite direction of the third direction DR3.

According to an embodiment of the inventive concept, the folding region FA may be bent with respect to a folding axis extending along a direction parallel to a long side of the electronic device 1000, for example, along a direction parallel to the second direction DR2. When the electronic device 1000 is folded, the folding region FA has a predetermined curvature and radius of curvature. The first non-folding region NFA1 and the second non-folding region NFA2 may face each other, and the electronic device 1000 may be inner-folded such that the first display part DA1-F is not exposed to the outside.

According to an embodiment of the inventive concept, the electronic device 1000 may be outer-folded such that the first display part DA1-F is exposed to the outside. According to an embodiment of the inventive concept, the electronic device 1000 may be capable of performing both operations of unfolding to inner-folding and unfolding to outer-folding, but embodiments of the inventive concept are not limited thereto.

FIG. 1A exemplarily illustrates that one folding region FA is defined in the electronic device 1000, but embodiment of the inventive concept are not limited thereto. For example, a plurality of folding axes and a plurality of folding regions corresponding thereto may be defined in an electronic device 1000, and the electronic device 1000 may be capable of performing operations of unfolding to inner-folding and unfolding to outer-folding in each of the plurality of folding regions.

According to an embodiment of the inventive concept, at least one of the first display panel DP1 or the second display panel DP2 may sense an input by an object (e.g., the pen PN) without including a digitizer. Accordingly, since the digitizer for sensing the pen PN is omitted, increases in thickness and weight or decreases in flexibility, caused by addition of the digitizer, may not occur in the electronic device 1000. The digitizer may be a component that captures physical touch inputs and converts them into digital signals. Therefore, not only the first display panel DP1 but also the second display panel DP2 may be designed to sense the pen PN.

Figure 2:
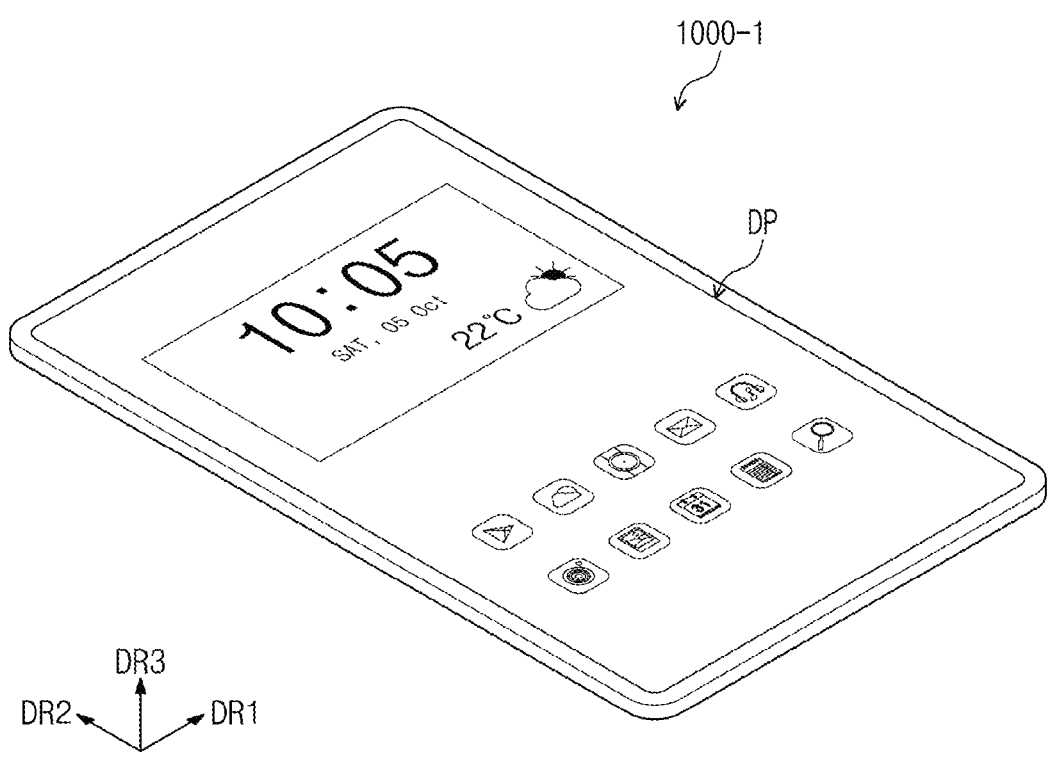
FIG. 2 is a perspective view of an electronic device according to an embodiment of the inventive concept.
Figure 3:
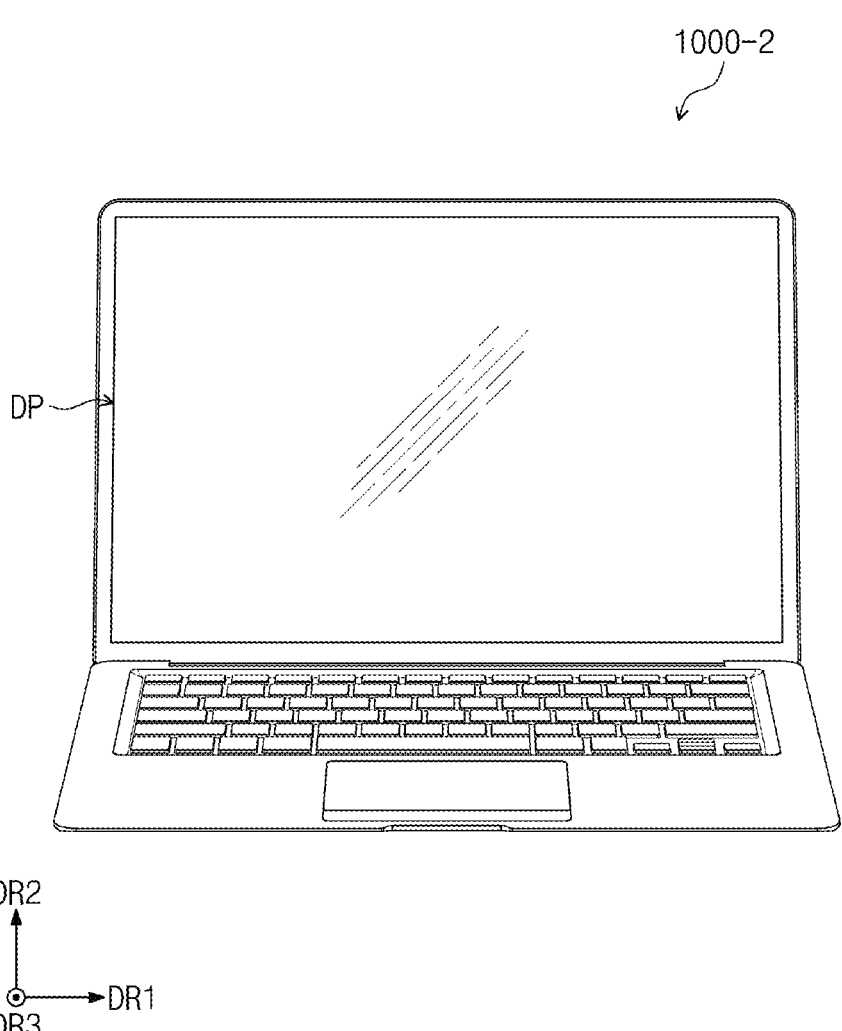
FIG. 3 is a perspective view of an electronic device according to an embodiment of the inventive concept.

FIG. 2 is a perspective view of an electronic device 1000-1 according to an embodiment of the inventive concept. FIG. 3 is a perspective view of an electronic device 1000-2 according to an embodiment of the inventive concept.

In FIG. 2, the electronic device 1000-1 is exemplarily illustrated as a mobile phone, and the electronic device 1000-1 may include a display panel DP. In FIG. 3, the electronic device 1000-2 is exemplarily illustrated as a laptop computer, and the electronic device 1000-2 may include a display panel DP.

According to an embodiment of the inventive concept, the display panel DP may sense inputs applied from the outside. The external input may be an input by a user. The input by a user may include various types of external inputs such as a part of a user's body, the pen PN (see FIG. 1A) or stylus, light, heat, or pressure.

According to an embodiment of the inventive concept, the display panel DP may sense an input by the pen PN without including a digitizer. Accordingly, since the digitizer for sensing the pen PN is omitted, increases in thickness and weight, caused by addition of the digitizer, may not occur in the electronic device 1000-1 or 1000-2.

FIG. 1A exemplarily illustrates a foldable electronic device 1000, and FIG. 2 exemplarily illustrates a bar-type electronic device 1000-1, embodiments of the inventive concept to be described hereinafter are not limited thereto. For example, the following descriptions may be applied to various electronic devices such as a rollable electronic device, a slidable electronic device, and a stretchable electronic device.

Figure 4:
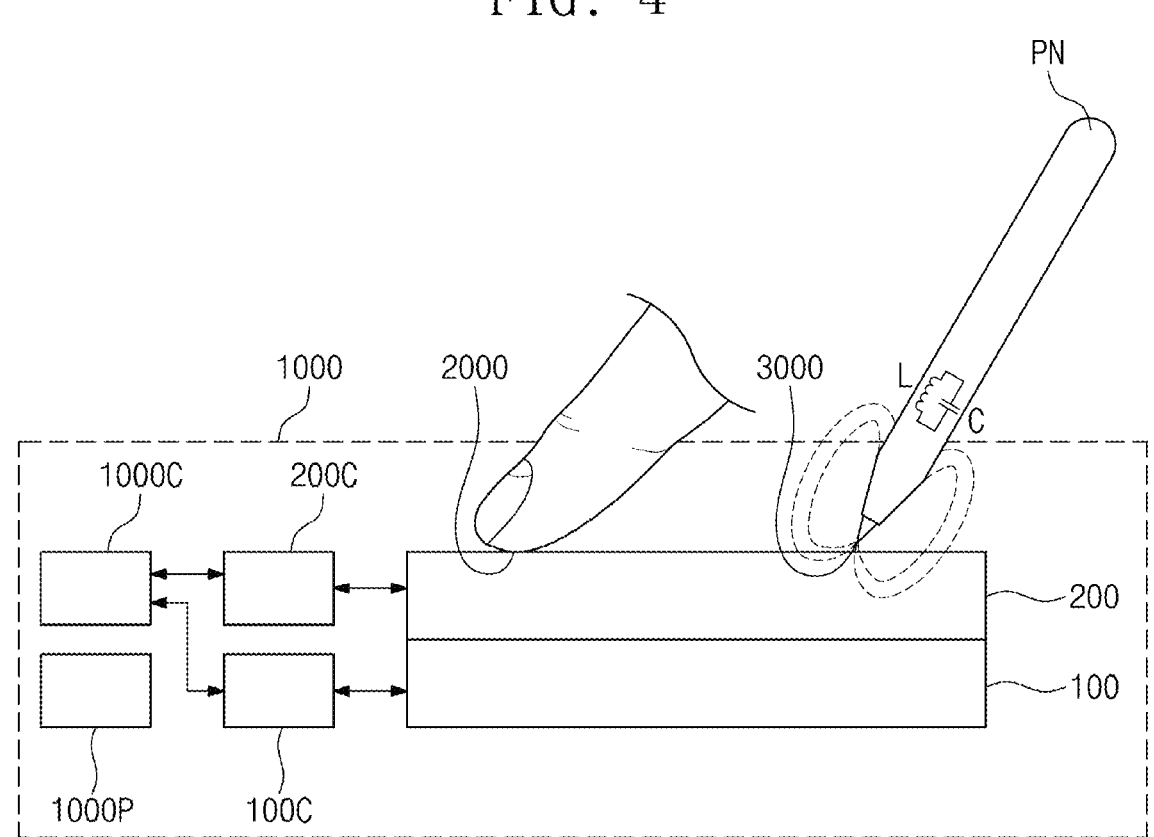
FIG. 4 is a drawing illustrating operation of an electronic device according to an embodiment of the inventive concept.

FIG. 4 is a drawing illustrating operation of an electronic device 1000 according to an embodiment of the inventive concept.

Referring to FIG. 4, the electronic device 1000 may include a display layer 100, a sensor layer 200, a display driver 100C (e.g., a first driver circuit), a sensor driver 200C (e.g., a second driver circuit), a main driver 1000C (e.g., a main driver circuit), and a power circuit 1000P.

The sensor layer 200 may sense a first input 2000 or a second input 3000 applied from the outside. The first input 2000 and the second input 3000 may each be an input by an input method capable of providing change to capacitance of the sensor layer 200, or an input by an input method capable of inducing a current in the sensor layer 200. For example, the first input 2000 may be an input by a passive-type input method such as a user's body. The second input 3000 may be an input by the pen PN or an input by a radio-frequency identification (RFID) tag. For example, the pen PN may be a passive-type pen or an active-type pen.

According to an embodiment of the inventive concept, the pen PN is a device that generates a magnetic field with a predetermined resonance frequency. The pen PN may be provided to transmit an output signal based on electromagnetic resonance. The pen PN may be referred to as an input device, an input pen, a magnetic pen, a stylus pen, or an electromagnetic resonance type pen.

The pen PN may include an RLC resonance circuit, and the RLC resonance circuit may include an inductor L and a capacitor C. According to an embodiment of the inventive concept, the RLC resonance circuit is a variable resonance circuit that changes the resonance frequency. In this case, the inductor L may be a variable inductor, and/or the capacitor C may be a variable capacitor, but embodiments of the inventive concept are not limited thereto.

The inductor L generates a current due to a magnetic field formed in the sensor layer 200. However, embodiments of the inventive concept are not limited thereto. For example, when the pen PN operates as an active type, the pen PN may also generate a current even though a magnetic field is provided from the outside. The generated current is transferred to the capacitor C. The capacitor C charges the current that is input by the inductor L, and discharges the charged current to the inductor L. After this, the inductor L may emit a magnetic field of a certain resonance frequency. An induced current may flow through the sensor layer 200 due to the magnetic field emitted by the pen PN, and the induced current may be transferred to the sensor driver 200C as a reception signal (or a sensing signal).

The main driver 1000C may control an entire operation of the electronic device 1000. For example, the main driver 1000C may control operations of the display driver 100C and the sensor driver 200C. The main driver 1000C may include at least one micro-processor, and may further include a graphic controller. The main driver 1000C may be referred to as an application processor, a central processing unit, or a main processor.

The display driver 100C may drive the display layer 100. The display driver 100C may receive image data and a control signal from the main driver 1000C. The control signal may include various signals. For example, the control signal may include at least one of an input vertical synchronization signal, an input horizontal synchronization signal, a main clock signal and a data enable signal.

The sensor driver 200C may drive the sensor layer 200. The sensor driver 200C may receive a control signal from the main driver 1000C. The control signal may include a clock signal of the sensor driver 200C. In addition, the control signal may further include a mode-determining signal that determines operation modes of the sensor driver 200C and the sensor layer 200.

The sensor driver 200C may be provided as an integrated circuit IC, and may thus be electrically connected to the sensor layer 200. For example, the sensor driver 200C may be directly mounted on a predetermined region of a display panel, or mounted on a separate printed circuit board in a chip-on-film (COF) method, to be electrically connected to the sensor layer 200.

The sensor driver 200C and the sensor layer 200 may operate selectively in one of a first mode and a second mode. For example, the first mode may be a mode where an input by a touch, for example, the first input 2000, is sensed. The second mode may be a mode where an input by the pen PN, for example, the second input 3000, is sensed. The first mode may be referred to as a touch-sensing mode, and the second mode may be referred to as a pen-sensing mode.

Transition between the first mode and the second mode may be performed in various ways. For example, the sensor driver 200C and the sensor layer 200 may operate in a time-division manner in the first mode and the second mode to sense the first input 2000 and the second input 3000. The time-division manner may mean that the sensor driver 200C and the sensor layer 200 operate in the first mode for a first period, the sensor driver 200C and the sensor layer 200 operate in the second mode for a second period when the first period ends, and then this operation repeats a certain number of times. Alternatively, the transition between the first mode and the second mode may occur due to a decision or specific action of a user, or any one among the first mode and the second mode may be activated or deactivated, or one mode may be switched to the other mode, due to activation or deactivation of a particular application. In addition, while the sensor driver 200C and the sensor layer 200 operate alternately in the first mode and in the second mode, the first mode may be maintained when the first input 2000 is sensed, or the second mode may be maintained when the second input 3000 is sensed.

The sensor driver 200C may calculate coordinate information of the input based on a signal received from the sensor layer 200, and provide a coordinate signal having the coordinate information to the main driver 1000C. The main driver 1000C executes an operation corresponding to the user's input based on the coordinate information. For example, the main driver 1000C may drive the display driver 100C such that a new application image is displayed on the display layer 100 based on the coordinate information.

The power circuit 1000P may include a power management integrated circuit (PMIC). The power circuit 1000P may generate a plurality of driving voltages for driving the display layer 100, the sensor layer 200, the display driver 100C, and the sensor driver 200C. For example, the plurality of driving voltages may include a high gate voltage, a low gate voltage, a first driving voltage (for example, an ELVSS voltage), a second driving voltage (for example, an ELVDD voltage), an initialization voltage, etc., but embodiments of the inventive concept are not limited thereto.

Figure 5:
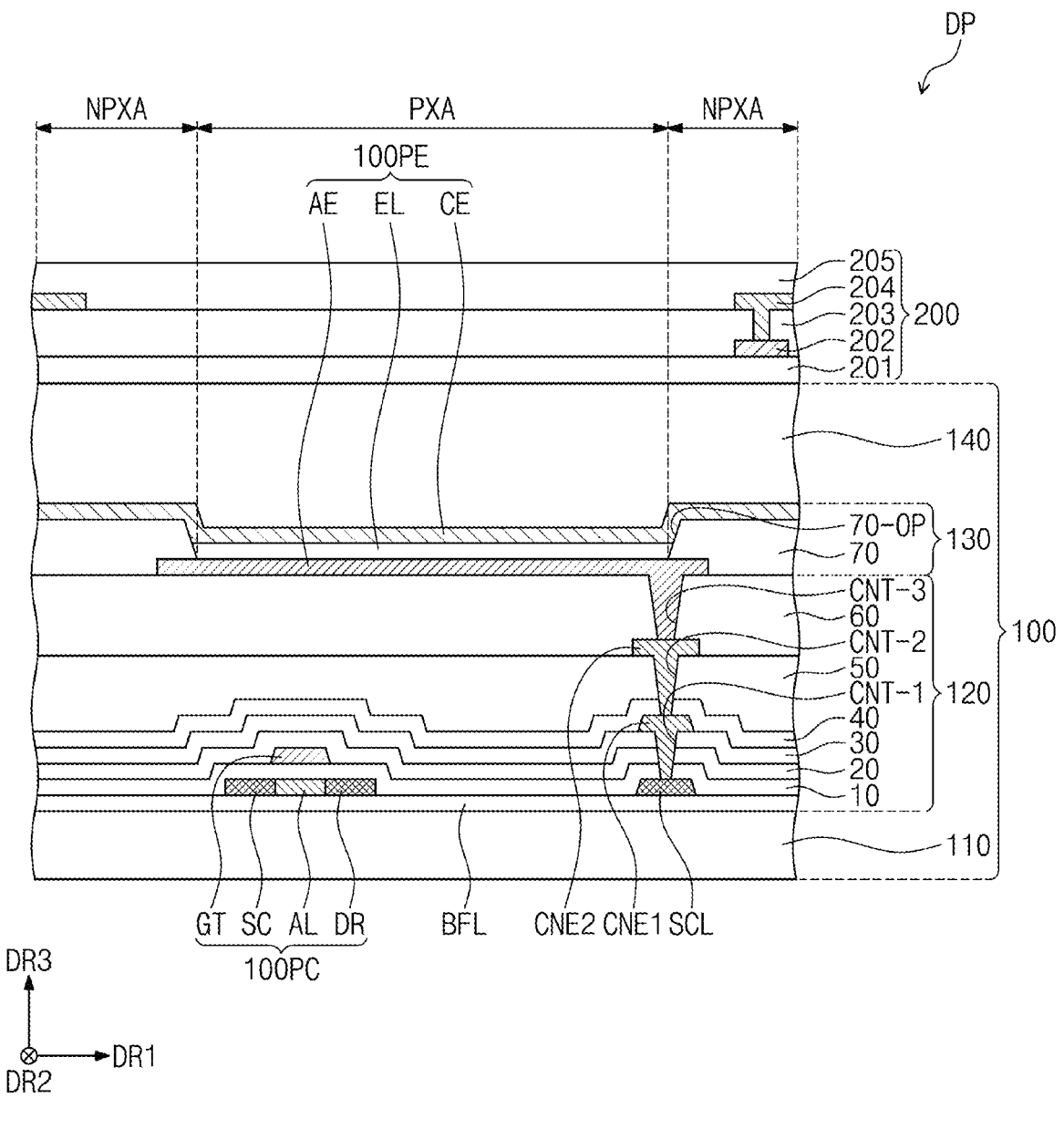
FIG. 5 is a cross-sectional view of a display panel according to an embodiment of the inventive concept.

FIG. 5 is a cross-sectional view of a display panel DP according to an embodiment of the inventive concept.

Referring to FIG. 5, the display panel DP may include a display layer 100 and a sensor layer 200.

The display layer 100 may be a component that substantially generates an image. The display layer 100 may be an emission-type display layer, and for example, the display layer 100 may be an organic light-emitting display layer, an inorganic light-emitting display layer, an organic-inorganic light-emitting display layer, a quantum-dot display layer, a micro-LED display layer, or a nano-LED display layer. The display layer 100 may include a base layer 110, a circuit layer 120, a light-emitting element layer 130, and an encapsulation layer 140.

The base layer 110 may be a member that provides a base surface on which a circuit layer 120 is disposed. The base layer 110 may have a multi-layer or single-layer structure. The base layer 110 may be a glass substrate, a metal substrate, a silicon substrate, or a polymer substrate, but embodiments of the inventive concept are not limited thereto. The circuit layer 120 may be disposed on the base layer 110. The circuit layer 120 may include at least one of an insulation layer, a semiconductor pattern, a conductive pattern and a signal line. The insulation layer, a semiconductor layer, and a conductive layer may be formed on the base layer 110 through coating or deposition, and the insulation layer, the semiconductor layer, and the conductive layer may be selectively patterned through multiple cycles of a photolithography process.

The light-emitting element layer 130 may be disposed on the circuit layer 120. The light-emitting element layer 130 may include a light-emitting element. For example, the light-emitting element layer 130 may include an organic light-emitting material, an inorganic light-emitting material, an organic-inorganic light-emitting material, quantum dots, quantum rods, a micro-LED, or a nano-LED. The encapsulation layer 140 may be disposed on the light-emitting element layer 130. The encapsulation layer 140 may protect the light-emitting element layer 130 from moisture, oxygen, and foreign substances such as dust particles.

At least one buffer layer BFL is formed on an upper surface of the base layer 110. The buffer layer BFL may increase bonding forces between the base layer 110 and the semiconductor pattern. The buffer layer BFL may be formed in multiple layers. Alternatively, the display layer 100 may also further include a barrier layer. The buffer layer BFL may include at least one of silicon oxide, silicon nitride, or silicon oxynitride. For example, the buffer layer BFL may include a structure in which a silicon oxide layer and a silicon nitride layer are alternately stacked.

The semiconductor pattern SC, AL, DR, and SCL may be disposed on the buffer layer BFL. The semiconductor pattern SC, AL, DR, and SCL may include polysilicon. However, embodiments of the inventive concept are not limited thereto, and the semiconductor pattern SC, AL, DR, and SCL may also include amorphous silicon, low-temperature polycrystalline silicon, or an oxide semiconductor.

FIG. 5 illustrates only a part of the semiconductor pattern SC, AL, DR, and SCL, and the semiconductor pattern may be further disposed in another region. The semiconductor pattern SC, AL, DR, and SCL may be arranged across pixels according to a particular rule. The semiconductor pattern SC, AL, DR, SCL may vary in electrical property according to whether it is doped or not. The semiconductor pattern SC, AL, DR, and SCL may include a first region SC, DR, and SCL having high conductivity, and a second region AL having low conductivity. The first region SC, DR, and SCL may be doped with an N-type dopant or a P-type dopant. A P-type transistor may include a doped region doped with a P-type dopant, and an N-type transistor may include a doped region doped with an N-type dopant. The second region AL may be an undoped region, or a region doped with lower concentration than that of the first region.

The first region SC, DR, and SCL may have higher conductivity than the conductivity of the second region AL, and substantially serve as an electrode or a signal line. The second region AL may substantially correspond to an active region AL (or channel) of a transistor 100PC. In other words, a part AL of the semiconductor pattern SC, AL, DR, and SCL may be the active region AL of the transistor 100PC, another part SC or DR may be a source region SC or a drain region DR of the transistor 100PC, and another part SCL may be a connection electrode or a connection signal line SCL.

FIG. 5 exemplarily illustrates one transistor 100PC and one light-emitting element 100PE included in the pixel.

The source region SC, the active region AL, and the drain region DR of the transistor 100PC may be formed from the semiconductor pattern SC, AL, DR, and SCL. The source region SC and the drain region DR may extend in opposite directions from the active region AL on a cross-section. FIG. 5 illustrates a portion of the connection signal line SCL formed from the semiconductor pattern SC, AL, DR, and SCL. Although not illustrated separately in the drawing, the connection signal line SCL may be connected to the drain region DR of the transistor 100PC on a plane.

A first insulation layer 10 may be disposed on the buffer layer BFL. The first insulation layer 10 may overlap a plurality of pixels in common, and cover the semiconductor pattern SC, AL, DR, and SCL. The first insulation layer 10 may be an inorganic layer and/or an organic layer, and may have a single-layer or multi-layer structure. The first insulation layer 10 may include at least one of aluminum oxide, titanium oxide, silicon oxide, silicon nitride, silicon oxynitride, zirconium oxide, or hafnium oxide. In this embodiment, the first insulation layer 10 is a single-layer silicon oxide layer. An insulation layer of the circuit layer 120 to be described later, as well as the first insulation layer 10, may be an inorganic layer and/or an organic layer, and may have a single-layer or multi-layer structure. The inorganic layer may include at least one of the above-mentioned materials, but embodiments of the inventive concept are not limited thereto.

A gate GT of the transistor 100PC is disposed on the first insulation layer 10. The gate GT may be a portion of a metal pattern. The gate GT overlaps the active region AL. The gate GT may serve as a mask in a process of doping or reducing the semiconductor pattern SC, AL, DR, and SCL.

A second insulation layer 20 may be disposed on the first insulation layer 10, and cover the gate GT. The second insulation layer 20 may overlap the pixels in common. The second insulation layer 20 may be an inorganic layer and/or an organic layer, and may have a single-layer or multi-layer structure. The second insulation layer 20 may include at least one of silicon oxide, silicon nitride, or silicon oxynitride. In this embodiment, the second insulation layer 20 has a multi-layer structure including a silicon oxide layer and a silicon nitride layer.

A third insulation layer 30 may be disposed on the second insulation layer 20. The third insulation layer 30 may have a single-layer or multi-layer structure. For example, the third insulation layer 30 may have a multi-layer structure including a silicon oxide layer and a silicon nitride layer.

A first connection electrode CNE1 may be disposed on the third insulation layer 30. The first connection electrode CNE1 may be connected to the connection signal line SCL through a contact hole CNT-1 passing through the first, second, and third insulation layers 10, 20, and 30.

A fourth insulation layer 40 may be disposed on the third insulation layer 30. The fourth insulation layer 40 may be a single-layer silicon oxide layer. A fifth insulation layer 50 may be disposed on the fourth insulation layer 40. The fifth insulation layer 50 may be an organic layer.

A second connection electrode CNE2 may be disposed on the fifth insulation layer 50. The second connection electrode CNE2 may be connected to the first connection electrode CNE1 through a contact hole CNT-2 passing through the fourth insulation layer 40 and the fifth insulation layer 50.

A sixth insulation layer 60 may be disposed on the fifth insulation layer 50, and cover the second connection electrode CNE2. The sixth insulation layer 60 may be an organic layer.

The light-emitting element layer 130 may be disposed on the circuit layer 120. The light-emitting element layer 130 may include the light-emitting element 100PE. For example, the light-emitting element layer 130 may include an organic light-emitting material, an inorganic light-emitting material, an organic-inorganic light-emitting material, quantum dots, quantum rods, a micro-LED, or a nano-LED. Hereinafter, the light-emitting element 100PE is illustrated as an example of the organic light-emitting element, but embodiments of the inventive concept are not particularly limited thereto.

The light-emitting element 100PE may include a first electrode AE, a light-emitting layer EL, and a second electrode CE.

The first electrode AE may be disposed on the sixth insulation layer 60. The first electrode AE may be connected to the second connection electrode CNE2 through a contact hole CNT-3 passing through the sixth insulation layer 60.

A pixel-defining film 70 may be disposed on the sixth insulation layer 60, and cover a portion of the first electrode AE. An opening 70-OP is defined in the pixel-defining film 70. The opening 70-OP of the pixel-defining film 70 exposes at least a portion of the first electrode AE.

The first display part DA1-F (see FIG. 1A) may include a light-emitting region PXA and a non-light-emitting region NPXA adjacent to the light-emitting region PXA. The non-light-emitting region NPXA may surround the light-emitting region PXA. In this embodiment, the light-emitting region PXA is defined to correspond to a partial region of the first electrode AE exposed by the opening 70-OP.

The light-emitting layer EL may be disposed on the first electrode AE. The light-emitting layer EL may be disposed in a region corresponding to the opening 70-OP. That is, the light-emitting layer EL may be formed separately for each pixel. In a case where the light-emitting layer EL is formed separately for each pixel, the light-emitting layers EL may each emit light of at least one color of blue color, red color, or green color. However, embodiments of the inventive concept are not limited thereto. The light-emitting layer EL may also be connected to the pixels to be included in common. In this case, the light-emitting layer EL may provide blue color light, or white color light.

The second electrode CE may be disposed on the light-emitting layer EL. The second electrode CE may have an integrated form, and may be included in a plurality of pixels in common.

According to an embodiment of the inventive concept, a hole control layer is disposed between the first electrode AE and the light-emitting layer EL. The hole control layer may be disposed in the light-emitting region PXA and the non-light-emitting region NPXA in common. The hole control layer may include a hole transport layer, and may further include a hole injection layer. An electron control layer may be disposed between the light-emitting layer EL and the second electrode CE. The electron control layer may include an electron transport layer, and may further include an electron injection layer. The hole control layer and the electron control layer may be formed across the plurality of pixels in common through an open mask or an inkjet process.

The encapsulation layer 140 may be disposed on the light-emitting element layer 130. The encapsulation layer 140 may include an inorganic layer, an organic layer, and an inorganic layer that are stacked in sequence, but the layers constituting the encapsulation layer 140 are not limited thereto. The inorganic layers may protect the light-emitting element layer 130 from moisture and oxygen, and the organic layer may protect the light-emitting element layer 130 from foreign substances such as dust particles. The inorganic layers may include a silicon nitride layer, a silicon oxynitride layer, a silicon oxide layer, a titanium oxide layer, an aluminum oxide layer, or the like. The organic layer may include an acrylate-based organic layer, but embodiments of the inventive concept are not limited thereto.

The sensor layer 200 may include a base layer 201, a first conductive layer 202, an intermediate insulation layer 203, a second conductive layer 204, and a cover insulation layer 205.

The base layer 201 may be an inorganic layer including at least any one of silicon nitride, silicon oxynitride, or silicon oxide. Alternatively, the base layer 201 may be an organic layer including an epoxy resin, an acrylate resin, or an imide-based resin. The base layer 201 may have a single-layer structure, or may have a structure of multiple layers stacked along a third direction DR3.

The first conductive layer 202 and the second conductive layer 204 may each have a single-layer structure, or may have a structure of multiple layers stacked along the third direction DR3.

The first conductive layer 202 and the second conductive layer 204, each having a single-layer structure, may each include a metal layer or a transparent conductive layer. The metal layer may include molybdenum, silver, titanium, copper, aluminum, or an alloy thereof. The transparent conductive layer may include transparent conductive oxide such as indium tin oxide (ITO), indium zinc oxide (IZO), zinc oxide (ZnO), or indium zinc tin oxide (IZTO). In addition, the transparent conductive layer may include a conductive polymer such as poly (3.4-ethylenedioxythiophene) (PEDOT), a metal nanowire or graphene.

The first conductive layer 202 and the second conductive layer 204, each having a multi-layer structure, may each include metal layers. The metal layers may have a three-layer structure, for example, of titanium/aluminum/titanium. The multi-layer conductive layer may include at least one metal layer and at least one transparent conductive layer.

According to an embodiment of the inventive concept, the thickness of the first conductive layer 202 is greater than or equal to the thickness of the second conductive layer 204. When the thickness of the first conductive layer 202 is greater than the thickness of the second conductive layer 204, a resistance of a component included in the first conductive layer 202 may be reduced. In addition, since the first conductive layer 202 is disposed under the second conductive layer 204, despite the increased thickness of the first conductive layer 202, there is a lower possibility that a pattern of the first conductive layer 202 is visible due to external reflection than that of the second conductive layer 204.

According to an embodiment of the inventive concept, the width of a first mesh line included in the first conductive layer 202 is less than or equal to the width of a second mesh line included in the second conductive layer 204. When the first mesh line has a smaller width than that of the second mesh line when a user views the electronic device 1000 (see FIG. 1A), the possibility that the first mesh line is visible to the user may be reduced.

At least any one of the intermediate insulation layer 203 or the cover insulation layer 205 may include an inorganic film. The inorganic film may include at least one of aluminum oxide, titanium oxide, silicon oxide, silicon nitride, silicon oxynitride, zirconium oxide, or hafnium oxide.

At least any one of the intermediate insulation layer 203 or the cover insulation layer 205 may include an organic film. The organic film may include at least any one of an acrylate-based resin, a methacrylate-based resin, polyisoprene, a vinyl-based resin, an epoxy-based resin, a urethane-based resin, a cellulose-based resin, a siloxane-based resin, a polyimide-based region, a polyamide-based resin, or a perylene-based resin.

Previously, it is exemplarily illustrated that the sensor layer 200 includes the first conductive layer 202 and the second conductive layer 204, that is, two conductive layers in total, but embodiments of the inventive concept are not limited thereto. For example, the sensor layer 200 may include at least three conductive layers.

Figure 6:
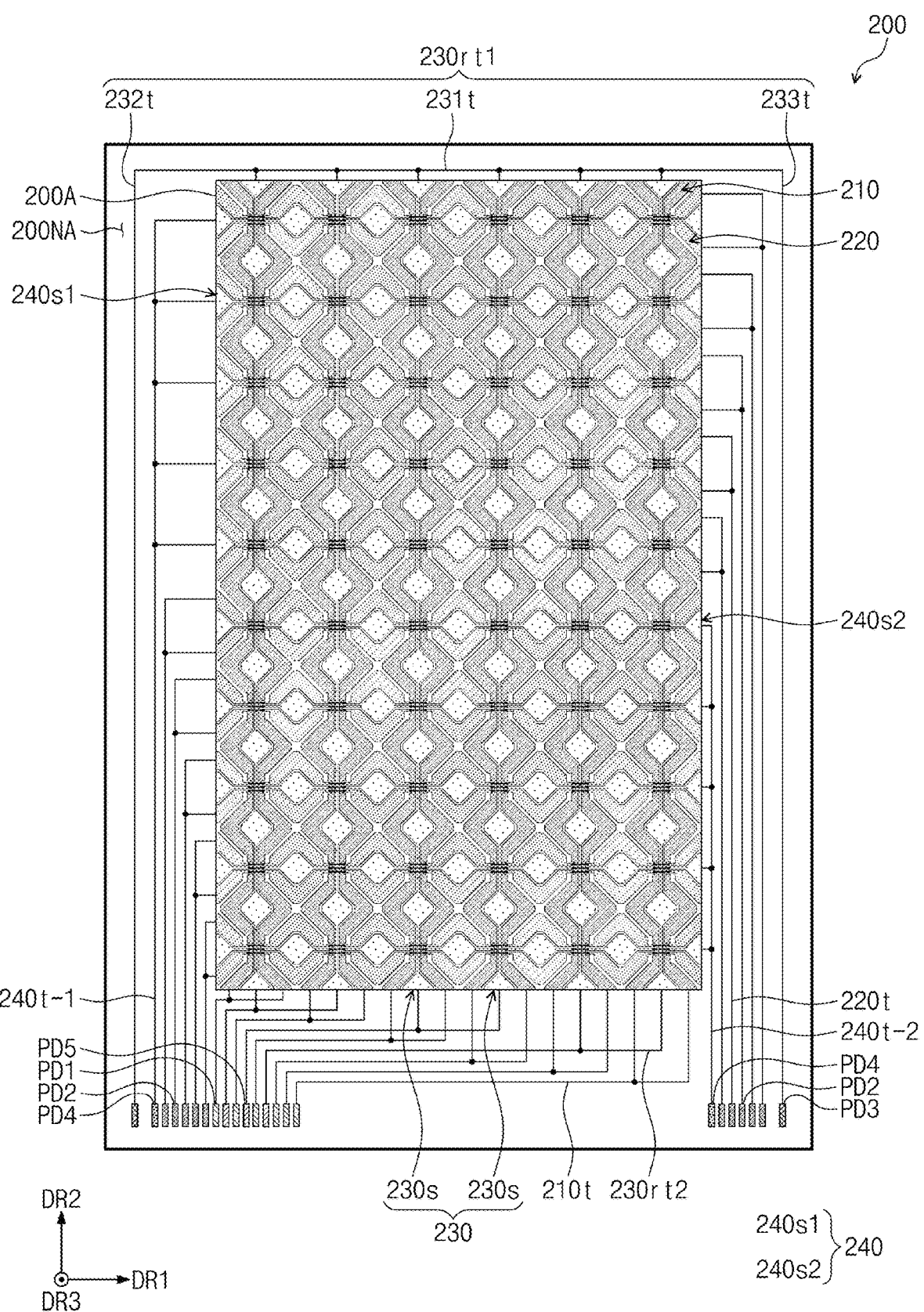
FIG. 6 is a plan view of a sensor layer according to an embodiment of the inventive concept.
Figure 7:
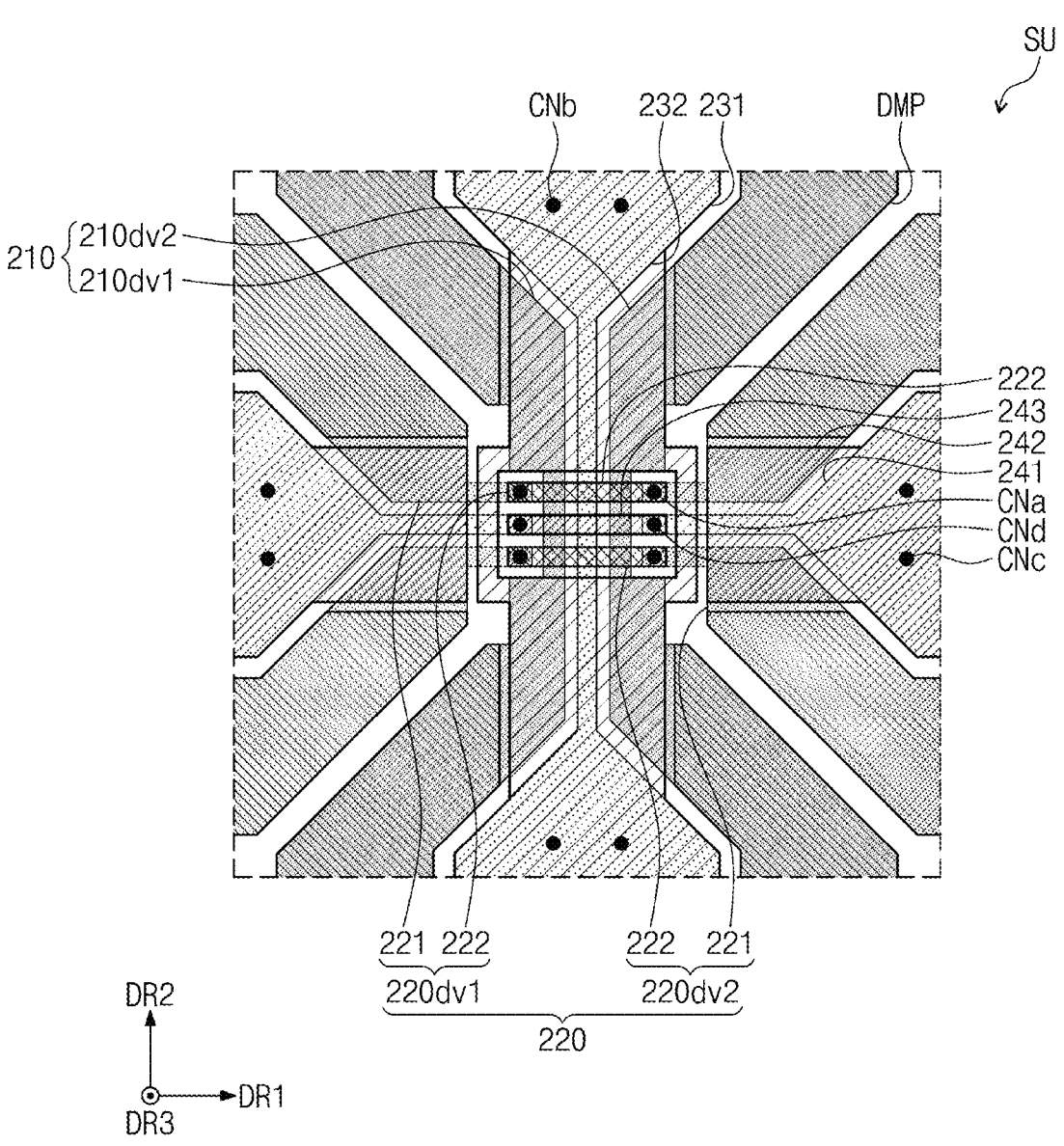
FIG. 7 is an enlarged plan view illustrating one sensing unit according to an embodiment of the inventive concept.
Figure 8A:
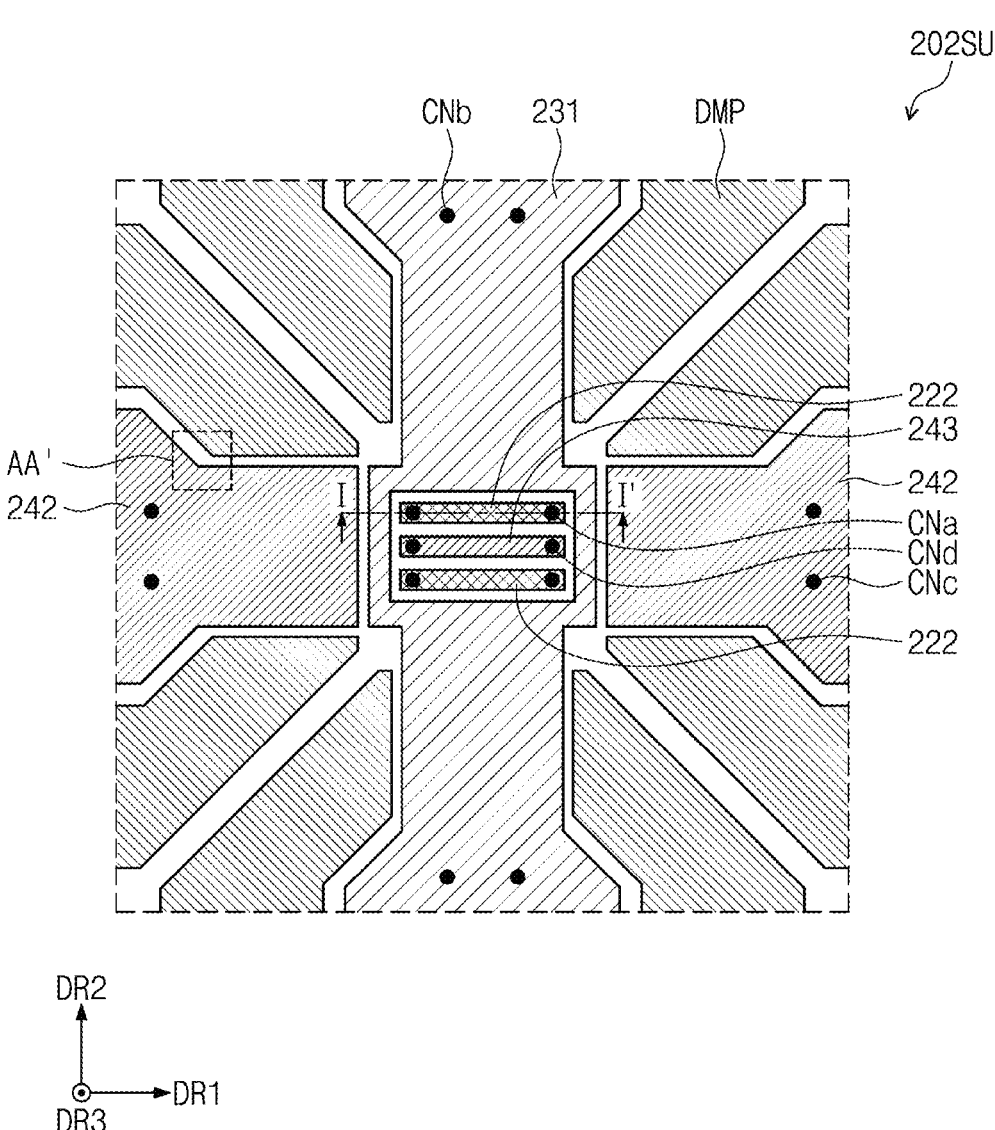
FIG. 8A is a plan view illustrating a first conductive layer of a sensing unit according to an embodiment of the inventive concept.
Figure 8B:
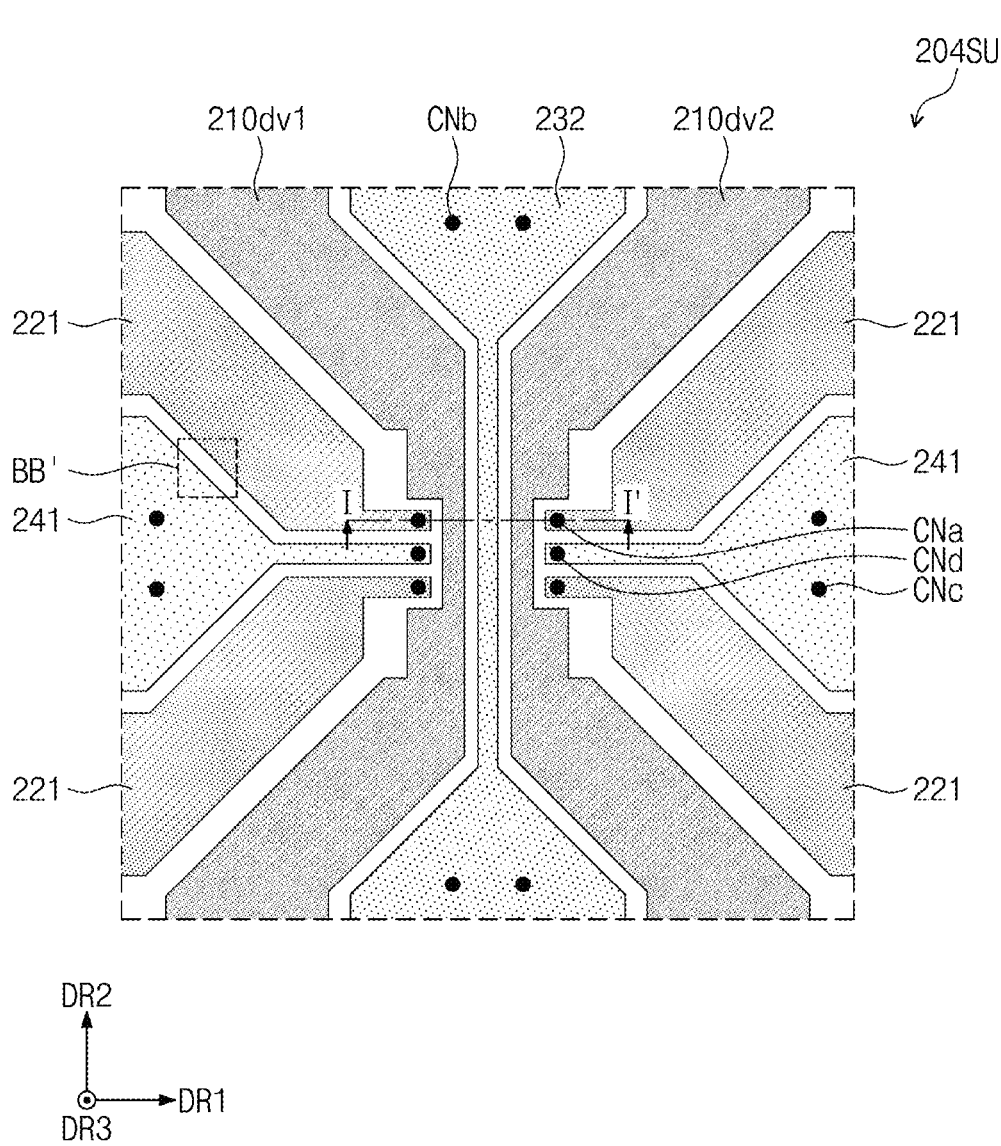
FIG. 8B is a plan view illustrating a second conductive layer of a sensing unit according to an embodiment of the inventive concept.
Figure 9:
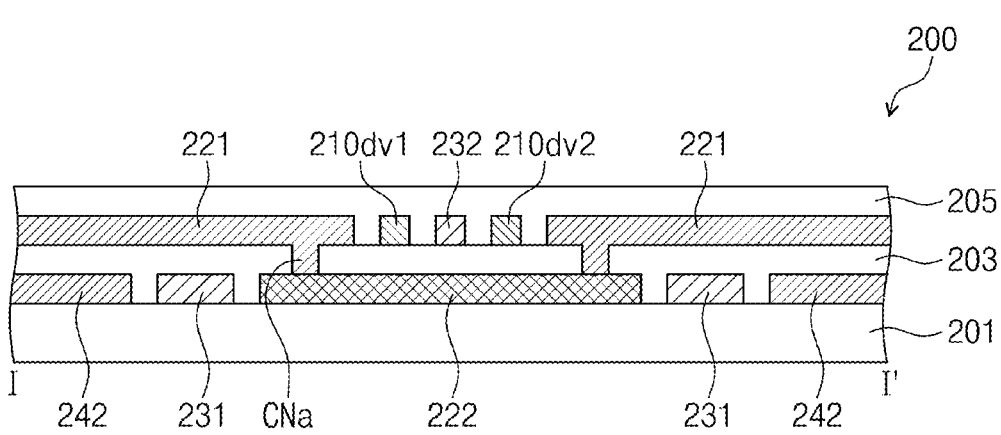
FIG. 9 is a cross-sectional view of a sensor layer, according to an embodiment of the inventive concept, taken along line I-I' of each of FIGS. 8A and 8B.

FIG. 6 is a plan view of a sensor layer 200 according to an embodiment of the inventive concept. FIG. 7 is an enlarged plan view illustrating one sensing unit SU according to an embodiment of the inventive concept. FIG. 8A is a plan view illustrating a first conductive layer 202SU of a sensing unit SU according to an embodiment of the inventive concept. FIG. 8B is a plan view illustrating a second conductive layer 204SU of a sensing unit SU according to an embodiment of the inventive concept. FIG. 9 is a cross-sectional view of a sensor layer 200, according to an embodiment of the inventive concept, taken along line I-I' of each of FIGS. 8A and 8B.

Referring to FIG. 6, a sensing region 200A and a peripheral region 200NA adjacent to the sensing region 200A are present in the sensor layer 200.

In an embodiment, the sensor layer 200 includes a plurality of first electrodes 210, a plurality of second electrodes 220, a plurality of third electrodes 230, and a plurality of fourth electrodes 240 disposed in the sensing region 200A.

The first electrodes 210 may cross the second electrodes 220, respectively. The first electrodes 210 may each extend along a second direction DR2, and the first electrodes 210 may be arranged spaced apart from each other in a first direction DR1. The second electrodes 220 may each extend along the first direction DR1, and the second electrodes 220 may be arranged spaced apart from each other in the second direction DR2. The sensing unit SU of the sensor layer 200 may be a region where one first electrode 210 and one second electrode 220 cross each other.

FIG. 6 exemplarily illustrates six first electrodes 210 and ten second electrodes 220, and exemplarily illustrates sixty sensing units SU, but the number of first electrodes 210 and the number of second electrodes 220 are not limited thereto.

Referring to FIGS. 6 and 7, in an embodiment, each of the first electrodes 210 include first division electrodes 210*dv*1 and 210*dv*2 (e.g., two first division electrodes). The first division electrodes 210*dv*1 and 210*dv*2 may extend along the second direction DR2, and may be spaced apart from each other in the first direction DR1. The first division electrodes 210*dv*1 and 210*dv*2 may have a symmetrical form in a line extending in the second direction DR2.

In an embodiment, the second electrodes 220 each include second division electrodes 220*dv*1 and 220*dv*2 (e.g., two second division electrodes). The second electrodes 220 may extend along the first direction DR1, and may be spaced apart from each other in the second direction DR2. The second division electrodes 220*dv*1 and 220*dv*2 may have a symmetrical form in a line extending in the first direction DR1.

Referring to FIGS. 7, 8A, 8B, and 9, the second division electrodes 220*dv*1 and 220*dv*2 may each include a sensing pattern 221 and a bridge pattern 222. In an embodiment, the sensing pattern 221 and the bridge pattern 222 are disposed on different layers. The sensing pattern 221 and the bridge pattern 222 may be electrically connected to each other through a first contact CNa. For example, as shown in FIG. 8A, the bridge pattern 222 may be included in a first conductive layer 202SU, and as shown in FIG. 8B, the sensing pattern 221 and the first division electrodes 210*dv*1 and 210*dv*2 may be included in a second conductive layer 204SU. The first conductive layer 202SU may be included in the first conductive layer 202 in FIG. 5, and the second conductive layer 204SU may be included in the second conductive layer 204 in FIG. 5.

The third electrodes 230 may each extend along the second direction DR2, and the third electrodes 230 may be arranged spaced apart from each other in the first direction DR1. According to an embodiment of the inventive concept, the third electrodes 230 each include a plurality of first auxiliary electrodes 230*s* connected in parallel. The number of the first auxiliary electrodes 230*s* included in each of the third electrodes 230 may be variously changed. For example, as the number of first auxiliary electrodes 230*s* included in each of the third electrodes 230 becomes larger, a resistance of each of the third electrodes 230 becomes lower, so that power efficiency and sensing sensitivity may be increased. On the contrary, as the number of first auxiliary electrodes 230*s* included in each of the third electrodes 230 is decreased, a loop coil pattern, which is formed by using the third electrodes 230, may be provided in more various forms.

FIG. 6 exemplarily illustrates that a single third electrode 230 includes two first auxiliary electrodes 230*s*, but embodiments of the inventive concept are not limited thereto. The first auxiliary electrodes 230*s* may be disposed in one-to-one correspondence to the first electrodes 210. Therefore, one sensing unit SU may include a portion of one first auxiliary electrode 230*s*.

A coupling capacitor may be present between one first electrode 210 and one first auxiliary electrode 230*s*. In this case, an induced current, generated during pen sensing, may be transferred from the first auxiliary electrode 230*s* to the first electrode 210 through the coupling capacitor. That is, the first auxiliary electrode 230*s* may serve to supplement a signal transmitted from the first electrode 210 to a sensor driver 200C. Therefore, it may be most effective when the phase of a signal induced to the first auxiliary electrode 230*s* and the phase of a signal induced to the first electrode 210 coincide. Therefore, the center of each of the first electrodes 210 in the second direction DR2 and the center of each of the first auxiliary electrodes 230*s* in the second direction DR2 may overlap each other. In addition, the center of each of the first electrodes 210 in the first direction DR1 and the center of each of the first auxiliary electrodes 230*s* in the first direction DR1 may also overlap each other.

According to an embodiment of the inventive concept, when a single third electrode 230 includes two first auxiliary electrodes 230*s*, the one third electrode 230 corresponds to (or overlap) two first electrodes 210. Therefore, the number of first electrodes 210 included in the sensor layer 200 may be larger than the number of third electrodes 230. For example, the number of first electrodes 210 may be equal to the product of the number of third electrodes 230 included in the sensor layer 200 and the number of first auxiliary electrodes 230$s$ included in each of the third electrodes 230. In FIG. 6, the number of first electrodes 210 may be six, the number of third electrodes 230 may be three, and the number of first auxiliary electrodes 230$s$ included in each of the third electrodes 230 may be two. According to an embodiment of the inventive concept, one end portions of the third electrodes 230 may be electrically connected to each other. In this case, the third electrodes 230 may function as one auxiliary electrode.

The fourth electrodes 240 may be arranged along the second direction DR2, and the fourth electrodes 240 may extend along the first direction DR1. According to an embodiment of the inventive concept, the fourth electrodes 240 each include second auxiliary electrodes 240$s$1 or 240$s$2 connected in parallel. The second auxiliary electrodes 240$s$1 or 240$s$2 may be referred to as a (2-1)-th auxiliary electrode 240$s$1 or a (2-1)-th auxiliary electrode 240$s$2.

The routing directions of the second auxiliary electrode 240$s$1 and the second auxiliary electrode 240$s$2 may be different from each other. FIG. 9 exemplarily illustrates two fourth electrodes 240 and five second auxiliary electrodes 240$s$1 or 240$s$2 included in each of the fourth electrodes 240.

In this specification, the different routing direction means a different connection location of the electrode and a trace line. For example, a first connection location of a fourth trace line 240$t$1 electrically connected to the second auxiliary electrode 240$s$1 and a second connection location of a fourth trace line 240$t$2 electrically connected to the second auxiliary electrode 240$s$2 may be different from each other. The first connection location may be the left end with respect to the second auxiliary electrode 240$s$1, and the second connection location may be the right end of the second auxiliary electrode 240$s$2.

According to an embodiment of the inventive concept, the sensor layer 200 further includes a single fourth electrode. In this embodiment, the fourth electrode may include ten second auxiliary electrodes connected in parallel. The number of second auxiliary electrodes is only for illustration of FIG. 6, and the number of second auxiliary electrodes included in the fourth electrode is not limited to the above-described example.

FIG. 6 exemplarily illustrates that five second auxiliary electrodes 240$s$1 are electrically connected to each other, and five second auxiliary electrodes 240$s$2 are electrically connected to each other. That is, the area ratio of two fourth electrodes 240 or the number ratio of the second auxiliary electrodes included in each of the two fourth electrodes 240 may be 1:1. However, embodiments of the inventive concept are not limited thereto. For example, the number of second auxiliary electrodes 240$s$1 and the number of second auxiliary electrodes 240$s$2 may also be different from each other.

According to an embodiment of the inventive concept, when each of the fourth electrodes 240 includes the second auxiliary electrodes 240$s$1 or 240$s$2 connected in parallel, this may have the effect of increasing the area of a single fourth electrode. In addition, resistance of each of the fourth electrodes 240 is lowered, so that the sensing sensitivity for the second input 3000 (see FIG. 7) may be increased.

In an embodiment, a coupling capacitor is present between one second electrode 220 and one second auxiliary electrode 240$s$1. In this embodiment, an induced current, generated during a pen sensing, may be transferred from the second auxiliary electrode 240$s$1 to the second electrode 220 through the coupling capacitor. That is, the second auxiliary electrode 240$s$1 may serve to supplement a signal transmitted from the second electrode 220 to the sensor driver 200C. Therefore, it may be most effective when the phase of a signal induced in the second auxiliary electrode 240$s$1 and the phase of a signal induced in the second electrode 220 coincide. Therefore, the center of each of the second electrodes 220 in the first direction DR1 and the center of each of the second auxiliary electrodes 240$s$1 in the first direction DR1 may overlap each other. In addition, the center of each of the second electrodes 220 in the second direction DR2 and the center of each of the second auxiliary electrodes 240$s$1 in the second direction DR2 may also overlap each other.

Referring to FIGS. 6, 8A, and 8B, the first auxiliary electrodes 230$s$ included in the third electrode 230 may each include a (3-1)-th pattern 231 and a (3-2)-th pattern 232. In an embodiment, the (3-1)-th pattern 231 and the (3-2)-th pattern 232 are disposed on different layers, and the (3-1)-th pattern 231 and the (3-2)-th pattern 232 may be electrically connected to each other through a second contact CNb. The (3-1)-th pattern 231 may be included in the first conductive layer 202SU, and the (3-2)-th pattern 232 may be included in the second conductive layer 204SU.

According to an embodiment of the inventive concept, a portion of the (3-1)-th pattern 231 overlaps a portion of each of the first division electrodes 210$dv$1 and 210$dv$2. Therefore, a coupling capacitance may be present (or formed) between the first electrode 210 and the third electrode 230.

Referring to FIGS. 6, 8A, and 8B, the second auxiliary electrodes 240$s$1 or 240$s$2 included in the fourth electrode 240 may each include a (4-1)-th pattern 241, a (4-2)-th pattern 242, and a (4-3)-th pattern 243. In an embodiment, the (4-2)-th pattern 242 and the (4-3)-th pattern 243 are disposed on the same layer, and the (4-1)-th pattern 241 is disposed on a different layer from the layer on which the (4-2)-th pattern 242 and the (4-3)-th pattern 243 are disposed. The (4-1)-th pattern 241 and the (4-2)-th pattern 242 may be electrically connected to each other through a third contact CNc, and the (4-1)-th pattern 241 and the (4-3)-th pattern 243 may be electrically connected to each other through a fourth contact CNd. The (4-2)-th pattern 242 and the (4-3)-th pattern 243 may be included in the first conductive layer 202SU, and the (4-1)-th pattern 241 may be included in the second conductive layer 204SU.

According to an embodiment of the inventive concept, a portion of the (4-2)-th pattern 242 overlaps a sensing pattern 221 of each of the second division electrodes 220$dv$1 and 220$dv$2. Therefore, a coupling capacitor may be present (or provided, formed) between the second electrode 220 and the fourth electrode 240.

According to an embodiment of the inventive concept, the first conductive layer 202SU further includes dummy patterns DMP. The dummy patterns DMP may each be electrically floated or electrically grounded. According to an embodiment of the inventive concept, the dummy patterns DMP are omitted. Alternatively, according to an embodiment of the inventive concept, the dummy patterns DMP are electrically connected to overlapping patterns.

As shown in FIG. 6, the sensor layer 200 may further include a plurality of first trace lines 210$t$, a plurality of first pads PD1 connected to the first trace lines 210$t$ in a one-to-one correspondence, a plurality of second trace lines 220$t$, and a plurality of second pads connected to the second trace lines 220$t$ in a one-to-one correspondence, which are disposed in the peripheral region 200NA.

The first trace lines 210$t$ may be electrically connected to the first electrodes 210 in a one-to-one correspondence. Two first division electrodes 210$dv$1 and 210$dv$2 included in a single first electrode 210 may be connected to one first trace line among the first trace lines 210*t*. The first trace lines 210*t* may each include a plurality of branch portions to be connected to the two first division electrodes 210*dv*1 and 210*dv*2. According to an embodiment of the inventive concept, the two first division electrodes 210*dv*1 and 210*dv*2 are connected to each other in the sensing region 200A.

The second trace lines 220*t* may be electrically connected to the second electrodes 220 in a one-to-one correspondence. Two second division electrodes 220*dv*1 and 220*dv*2 included in a single second electrode 220 may be connected to one second trace line among the second trace lines 220*t*. The second trace lines 220*t* may each include a plurality of branch portions to be connected to the two second division electrodes 220*dv*1 and 220*dv*2. According to an embodiment of the inventive concept, the two second division electrodes 220*dv*1 and 220*dv*2 are connected to each other in the sensing region 200A.

The sensor layer 200 may further include a third trace line 230*rt*1, a plurality of third pads PD3 connected to one end and the other end of the third trace line 230*rt*1, fourth trace lines 240*t*-1 and 240*t*-2, fourth pads PD4 connected to the fourth trace lines 240*t*-1 and 240*t*-2 in a one-to-one correspondence, fifth trace lines 230*rt*2, and fifth pads PD5 connected to the fifth trace lines 230*rt*2 in a one-to-one correspondence, which are disposed in the peripheral region 200NA.

The third trace line 230rt1 may be electrically connected to at least one first auxiliary electrode 230*s* among the first auxiliary electrodes 230*s*. According to an embodiment of the inventive concept, the third trace line 230rt1 is electrically connected to all of the first auxiliary electrodes 230*s*. That is, the third trace line 230rt1 may be electrically connected to all of the third electrodes 230. The third trace line 230*rt*1 may include a first line portion 231*t* extending along the first direction DR1 and electrically connected to the third electrodes 230, a second line portion 232*t* extending from a first end portion of the first line portion 231*t* along the second direction DR2, and a third line portion 233*t* extending from a second end portion of the first line portion 231*t* along the second direction DR2. The third electrodes 230 may be connected to each other by the third trace line 230*rt*1, and may thus function as a single electrode.

According to an embodiment of the inventive concept, a resistance of the second line portion 232*t* and resistance of the third line portion 233*t* are the same or substantially the same as resistance of one third electrode among the third electrodes 230. Therefore, the second line portion 232*t* and the third line portion 233*t* may serve as the third electrodes 230, and the same effect may be achieved as if the third electrodes 230 are disposed in the peripheral region 200NA as well. For example, any one among the second line portion 232*t* and the third line portion 233*t* and any one among the third electrodes 230 may form a coil. Therefore, a pen, located in a region adjacent to the peripheral region 200NA, may also be sufficiently charged by a loop including the second line portion 232*t* or the third line portion 233*t*.

According to an embodiment of the inventive concept, to control the resistance of the second line portion 232*t* and the resistance of the third line portion 233*t*, the width of each of the second line portion 232*t* and the third line portion 233*t* in the first direction DR1 may be adjusted. However, this is only an example, and the first to third line portions 231*t*, 232*t*, and 233*t* may also have the same or substantially the same width.

The fifth trace lines 230*rt*2 may be connected to the third electrodes 230 in a one-to-one correspondence. That is, the number of fifth trace lines 230*rt*2 may correspond to the number of third electrodes 230. FIG. 6 exemplarily illustrates three fifth trace lines 230*rt*2.

According to an embodiment of the inventive concept, the fifth trace lines 230rtr2 and the fifth pad PD5 are omitted, and a charge driving mode for charging a pen is omitted. In this case, the sensor layer 200 may sense an input by an active-type pen which is capable of emitting a magnetic field even if the magnetic field is not provided by the sensor layer 200.

In an embodiment, the fourth trace lines 240*t*-1 and 240*t*-2 are spaced apart from each other with the sensing region 200A therebetween. For example, one fourth trace line 240*t*-1 may be spaced apart from the other fourth trace line 240*t*-2 in the first direction DR1. The fourth trace line 240*t*-1 may be electrically connected to at least one second auxiliary electrode 240*s*1 among the second auxiliary electrodes 240*s*1. For example, one end portion of each of the second auxiliary electrodes 240*s*1 may be connected to the fourth trace line 240*t*-1. The fourth trace line 240*t*-2 may be electrically connected to at least one second auxiliary electrode 240*s*2 among the second auxiliary electrodes 240*s*2. For example, one end portion of each of the second auxiliary electrodes 240*s*2 may be connected to the fourth trace line 240*t*-2.

Referring to FIGS. 8A and 8B, in the second conductive layer 204SU in one sensing unit SU, the area occupied by components included in the first electrode 210 and the second electrode 220 may be larger than the area occupied by components included in the third electrode 230 and the fourth electrode 240. The change in capacitance due to the first input 2000 (see FIG. 4) may become greater as the distance becomes closer. Therefore, the component for sensing the first input 2000 (see FIG. 4) may be disposed relatively in larger area on a layer adjacent to a surface of the electronic device 1000 (see FIG. 1A). As a result, touch performance may be increased.

While FIGS. 6 to 9 exemplarily illustrate a structure where the first to fourth electrodes 210, 220, 230, and 240 are divided into two conductive layers 202SU and 204SU to be disposed thereon, embodiments of the inventive concept are not limited thereto. For example, the first to fourth electrodes 210, 220, 230, and 240 may be divided into three conductive layers or four conductive layers.

According to an embodiment of the inventive concept, the third electrode 230, to which a signal is applied in the charge driving mode, may be included in a third conductive layer disposed under the first and second conductive layers 202SU and 204SU. For example, the third conductive layer may be disposed under the base layer 201. The third conductive layer may also be disposed between the base layer 201 and the display layer 100, disposed under the display layer 100, or included in the display layer 100.

The first, second, and fourth electrodes 210, 220, and 240 may be included in the first and second conductive layers 202SU and 204SU. For example, in an embodiment where the third electrode 230 is provided in a separate conductive layer such as the third conductive layer, the shape of the third electrode 230 may be designed more freely. For example, the third electrode 230 may be provided in a form including a plurality of coils. In addition, using the third conductive layer, the third electrode 230 may be more densely configured, and in this case, the pen-sensing sensitivity may be increased. According to another embodiment of the inventive concept, the third conductive layer includes the fourth electrode 240 instead of the third electrode 230.

Figure 10A:
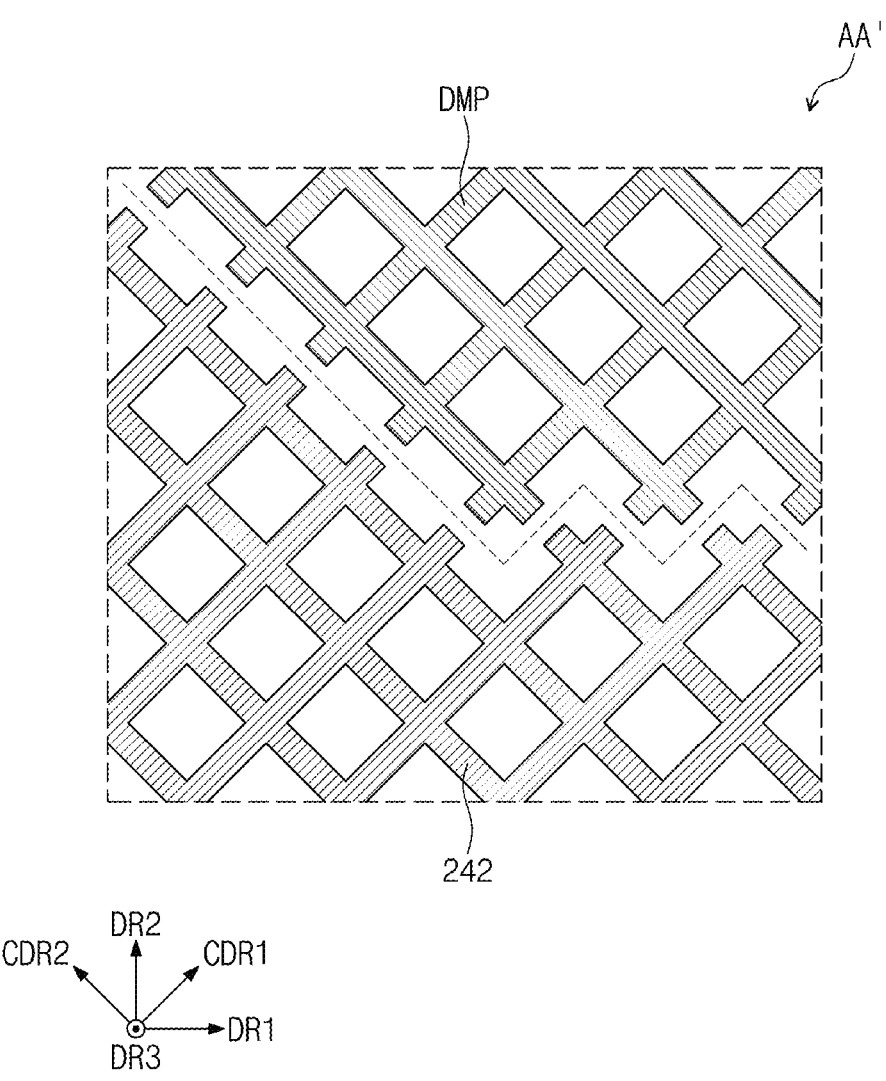
FIG. 10A is an enlarged plan view of region AA' illustrated in FIG. 8A.
Figure 10B:
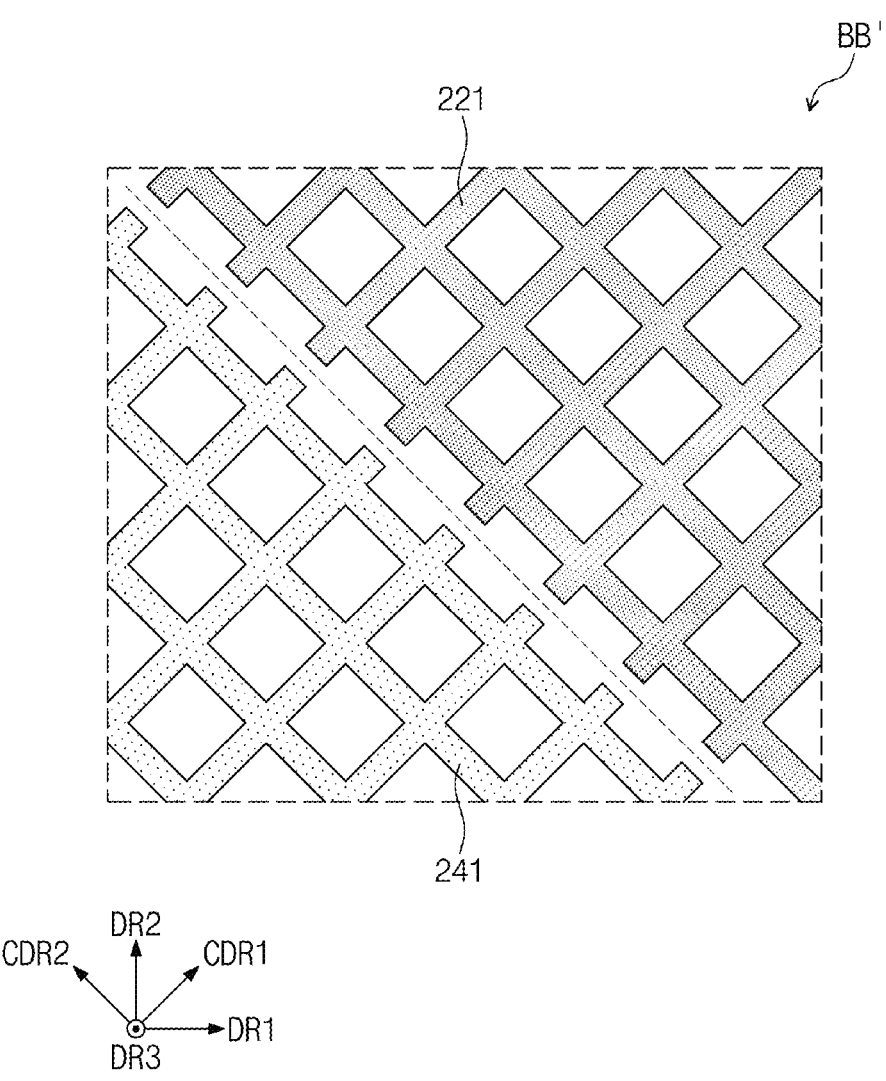
FIG. 10B is an enlarged plan view of region BB' illustrated in FIG. 8B.

FIG. 10A is an enlarged plan view of region AA' illustrated in FIG. 8A. FIG. 10B is an enlarged plan view of region BB' illustrated in FIG. 8B.

Referring to FIGS. 8A, 8B, 10A, and 10B, the first electrodes 210, the second electrodes 220, the third electrodes 230, the fourth electrodes 240, and the dummy patterns DMP may each have a mesh structure. The mesh structures may each include a plurality of mesh lines. The plurality of mesh lines may each have a straight-line shape extending in a predetermined direction, and may be connected to each other. Openings where a mesh structure is not disposed may be present (provided or formed) in each of the first electrodes 210, the second electrodes 220, the third electrodes 230, the fourth electrodes 240, and the dummy patterns DMP.

FIGS. 10A and 10B exemplarily illustrate that the mesh structure includes mesh lines extending along a first cross direction CDR1 crossing a first direction DR1 and a second direction DR2, and mesh lines extending along a second cross direction CDR2 crossing the first cross direction CDR1. However, the extending direction of the mesh lines constituting the mesh structure is not limited to the illustrations in FIGS. 10A and 10B. For example, the mesh structure may include only mesh lines extending in the first direction DR1 and the second direction DR2, or include mesh lines extending in the first direction DR1 and the second direction DR2, and in the first cross direction CDR1 and the second cross direction CDR2. That is, the mesh structure may be variously changed.

FIG. 11 is a drawing illustrating operation of the sensor driver 200C (see FIG. 4) according to an embodiment of the inventive concept.

Referring to FIGS. 4 and 11, the sensor driver 200C may operate selectively in any one among a first operation mode DMD1, a second operation mode DMD2, and a third operation mode DMD3.

The first operation mode DMD1 may be referred to as a touch and pen standby mode, the second operation mode DMD2 may be referred to as a touch activation and pen standby mode, and the third operation mode DMD3 may be referred to as a pen activation mode. The first operation mode DMD1 may be a standby mode for a first input 2000 and a second input 3000. The second operation mode DMD2 may be a mode for sensing the first input 2000, and on standby for the second input 3000. The third operation mode DMD3 may be a mode for sensing the second input 3000.

According to an embodiment of the inventive concept, the sensor driver 200C operates first in the first operation mode DMD1. In the first operation mode DMD1, when the first input 2000 is sensed, the sensor driver 200C may be switched (or changed) to the second operation mode DMD2. Alternatively, in the first operation mode DMD1, when the second input 3000 is sensed, the sensor driver 200C may be switched (or changed) to the third operation mode DMD3.

According to an embodiment of the inventive concept, in the second operation mode DMD2, when the second input 3000 is sensed, the sensor driver 200C may be switched to the third operation mode DMD3. In the second operation mode DMD2, when the first input 2000 is cleared (or not sensed), the sensor driver 200C may be switched to the first operation mode DMD1. In the third operation mode DMD3, when the second input 3000 is cleared (or not sensed), the sensor driver 200C may be switched to the first operation mode DMD1.

FIG. 12 is a drawing illustrating operation of the sensor driver 200C (see FIG. 4) according to an embodiment of the inventive concept.

Referring to FIGS. 4, 11, and 12, operations in the first to third operation modes DMD1, DMD2, and DMD3 are exemplarily illustrated in order of time t.

In the first operation mode DMD1, the sensor driver 200C may operate repeatedly in a second mode MD2-*d* and a first mode MD1-*d*. During the second mode MD2-*d*, the sensor layer 200 may be scan-driven to detect the second input 3000. During the first mode MD1-*d*, the sensor layer 200 may be scan-driven to detect the first input 2000. FIG. 12 exemplarily illustrates that the sensor driver 200C operates in the first mode MD1-*d* continuously after the second mode MD2-*d*, but the order is not limited thereto.

In the second operation mode DMD2, the sensor driver 200C may operate repeatedly in the second mode MD2-*d* and a first mode MD1. During the second mode MD2-*d*, the sensor layer 200 may be scan-driven to detect the second input 3000. During the first mode MD1, the sensor layer 200 may be scan-driven to detect a coordinate by the first input 2000.

In the third operation mode DMD3, the sensor driver 200C may operate in a second mode MD2. During the second mode MD2, the sensor layer 200 may be scan-driven to detect a coordinate by the second input 3000. In an embodiment of the third operation mode DMD3, the sensor driver 200C does not operate in the first mode MD1-*d* or MD1 until the second input 3000 is cleared (or not sensed). For example, the sensor driver 200*c* may operate in the first mode MD1-*d* or MD1 after the second input 3000 has not been senses for a certain period of time.

Referring to FIG. 6 together, in the first mode MD1-*d* and the first mode MD1, all of the third electrodes 230 and the fourth electrodes 240 may be grounded. Therefore, it may be possible to prevent touch noise from entering through the third electrodes 230 and the fourth electrodes 240.

In the second mode MD2-*d* of the first operation mode DMD1 or the second operation mode DMD2, and in the second mode MD2 of the third operation mode DMD3, one end of each of the third electrodes 230 and the fourth electrodes 240 may be floated. In addition, in the second mode MD2-*d* and the second mode MD2, the other end of each of the third electrodes 230 and the fourth electrodes 240 may be grounded or floated. Therefore, compensation of a sensing signal may be maximized by coupling between the first electrodes 210 and the third electrodes 230 and coupling between the second electrodes 220 and the fourth electrodes 240.

FIG. 13 is a drawing illustrating operation of the sensor driver 200C (see FIG. 4) according to an embodiment of the inventive concept.

Referring to FIGS. 4 and 13, a second mode MD2 includes a charge driving mode PCD, a pen proximity sensing driving mode PHS, and a pen sensing driving mode PPS.

In the charge driving mode PCD, a current path may be formed (provided or defined) in the sensor layer 200. The current path may have a coil form, and in the charge driving mode PCD, a resonance circuit of a pen PN may be charged by the current path. According to an embodiment of the inventive concept, the charge driving mode PCD for charging the pen PN is omitted. In this embodiment, the sensor layer 200 senses an input by an active-type pen capable of emitting a magnetic field even if the magnetic field is not provided from the sensor layer 200.

In the pen proximity sensing driving mode PHS, the sensor driver 200C may sense an input by the pen PN which is not in contact with the electronic device 1000 (hereinafter, referred to as a hovering state). For example, in the pen proximity sensing driving mode PHS, the pen PN in the hovering state and the sensor layer 200 may be inductively coupled.

According to an embodiment of the inventive concept, in the pen proximity sensing driving mode PHS, the sensor driver 200C is configured to further receive a signal from at least one of the third electrode 230 (see FIG. 6) or the fourth electrode 240 (see FIG. 6), as well as the first electrodes 210 (see FIG. 6) or the second electrodes 220 (see FIG. 6). For example, in the pen proximity sensing driving mode PHS, the sensor driver 200C may be provided to merge a signal received from the third electrode 230 with a signal received from the first electrodes 210. In this case, recognition sensitivity for sensing approach of the pen PN may be increased.

After an input by the pen PN is sensed in the hovering state, the sensor driver 200C may enter a full-fledged driving mode for pen sensing. Since the pen sensing driving mode PPS begins after the approach of the pen PN has been sensed, the total current consumption of the electronic device 1000 (see FIG. 1A) may be reduced. In case of recognizing the pen PN first in the hovering state, reaction speed for the first input by the pen PN may be increased. In addition, the pen PN may be sensed in the hovering state, so that various functions, such as a pointer, may be applied to the electronic device 1000.

Figure 14A:
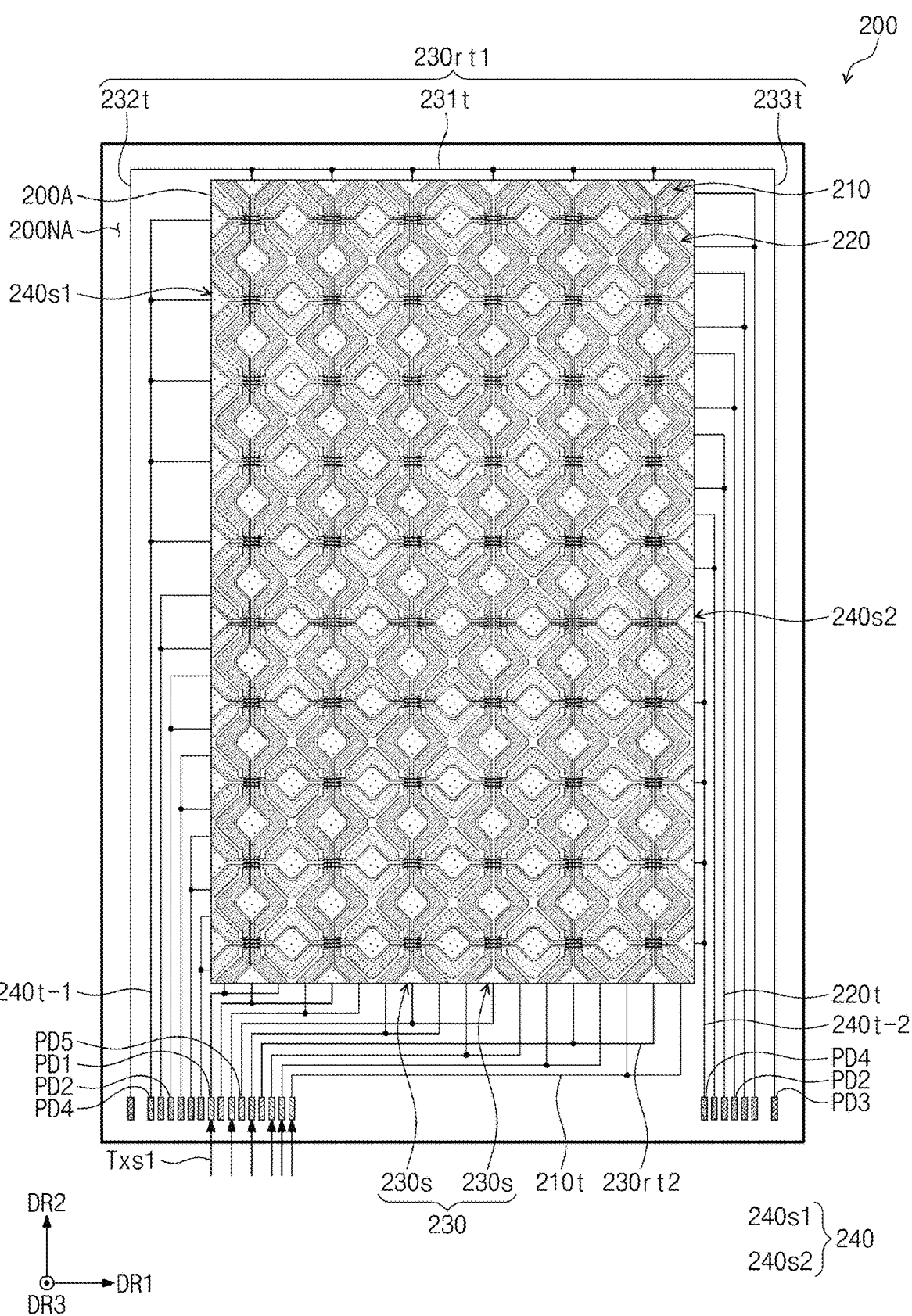
FIG. 14A is a drawing illustrating a first mode according to an embodiment of the inventive concept.
Figure 14B:
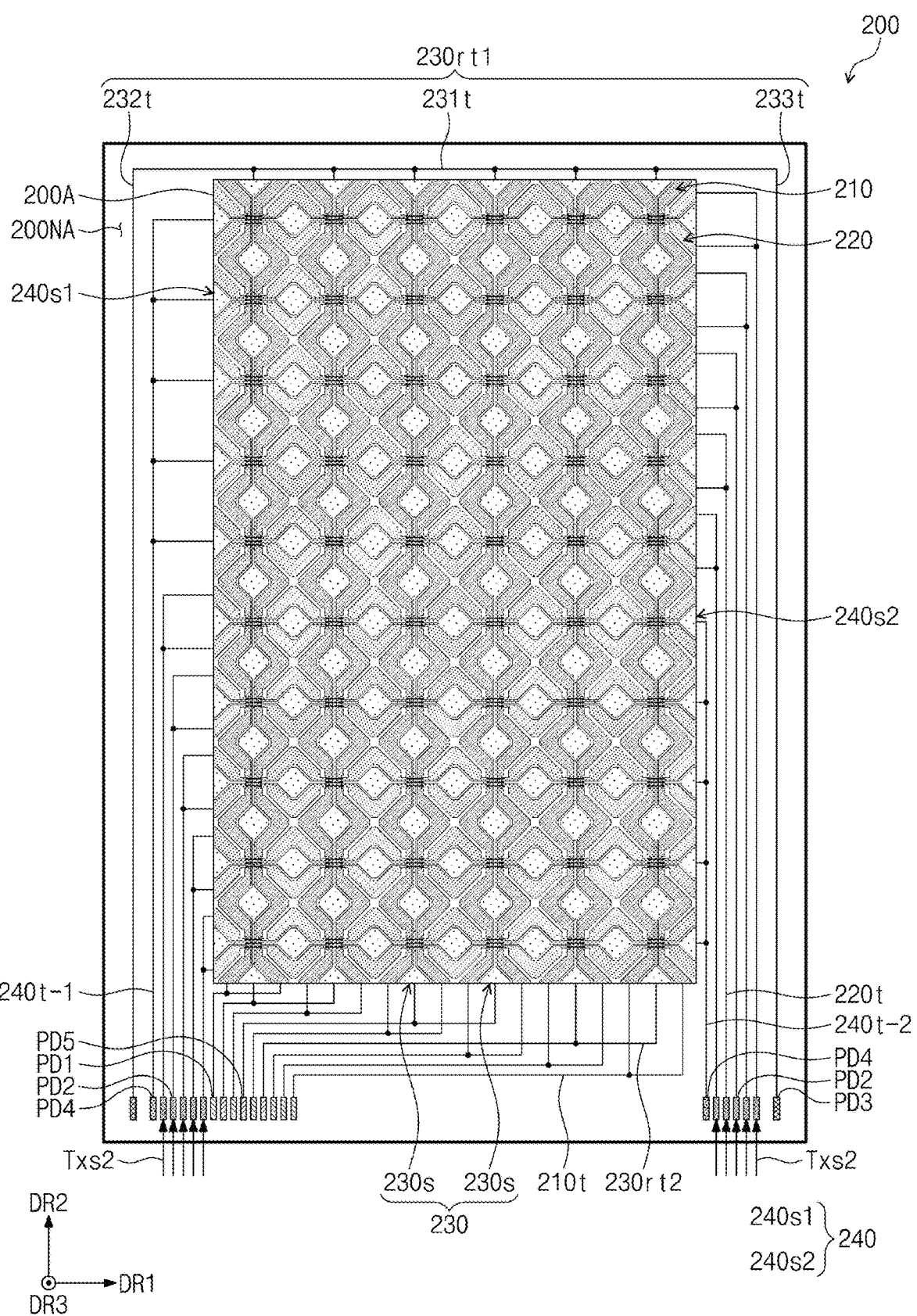
FIG. 14B is a drawing illustrating a first mode according to an embodiment of the inventive concept.

FIG. 14A is a drawing illustrating a first mode according to an embodiment of the inventive concept. FIG. 14B is a drawing illustrating a first mode according to an embodiment of the inventive concept.

Referring to FIGS. 12, 14A, and 14B, in an embodiment, the first mode MD1-d and the first mode MD1 include a self-capacitance detection mode. The self-capacitance detection mode may include a first sub section and a second sub section. FIG. 14A is a drawing illustrating an operation that occurs in the first sub section, and FIG. 14B is a drawing illustrating an operation that occurs in the second sub section.

In an embodiment of the self-capacitance detection mode, a sensor driver 200C is configured to output driving signals Txs1 and Txs2 to first electrodes 210 and second electrodes 220, to sense a change in capacitance of each of the first electrodes 210 and the second electrodes 220 and calculate an input coordinate based on the sensed change. Referring to FIG. 14A, in the first sub section, the sensor driver 200C may output the driving signal Txs1 to first trace lines 210t. Referring to FIG. 14B, in the second sub section, the sensor driver 200C may output the driving signal Txs2 to second trace lines 220t. The first sub section and the second sub section may operate separately at different timings. However, embodiments of the inventive concept are not limited thereto. For example, the timings of the first sub section and the second sub section may overlap each other. That is, in the same timing, the sensor driver 200C may output the driving signal Txs1 to the first trace lines 210t, and output the driving signal Txs2 to the second trace lines 220t.

Third electrodes 230 may be electrically connected to a third trace line 230rt1 and fifth trace lines 230rt2, and fourth electrodes 240 may be electrically connected to fourth trace lines 240t-1 and 240t-2. In an embodiment of the self-capacitance detection mode, all of the third electrodes 230 and the fourth electrodes 240 are grounded. For example, a switching circuit may be present that connects all of the third electrodes 230 and the fourth electrodes 240 to a ground voltage during the self-capacitance detection mode. A controller may be present that controls the switching circuit. Therefore, noise may not occur from current that flows in through the third electrodes 230 and the fourth electrodes 240. According to another embodiment of the inventive concept, all of the third electrodes 230 and the fourth electrodes 240 are floated. For example, a switching circuit may be present that disconnects all of the third electrodes 230 and the fourth electrodes 240 from a supply or a ground voltage. According to another embodiment of the inventive concept, a reference potential is applied to the third electrodes 230 and the fourth electrodes 240 during the self-capacitance detection mode. According to another embodiment of the inventive concept, a signal in phase with a transmission signal is applied to the third electrodes 230 and the fourth electrodes 240 during the self-capacitance detection mode. In this embodiment, noise may not be occur due to current that flows in through the third electrodes 230 and the fourth electrodes 240.

Figure 15:
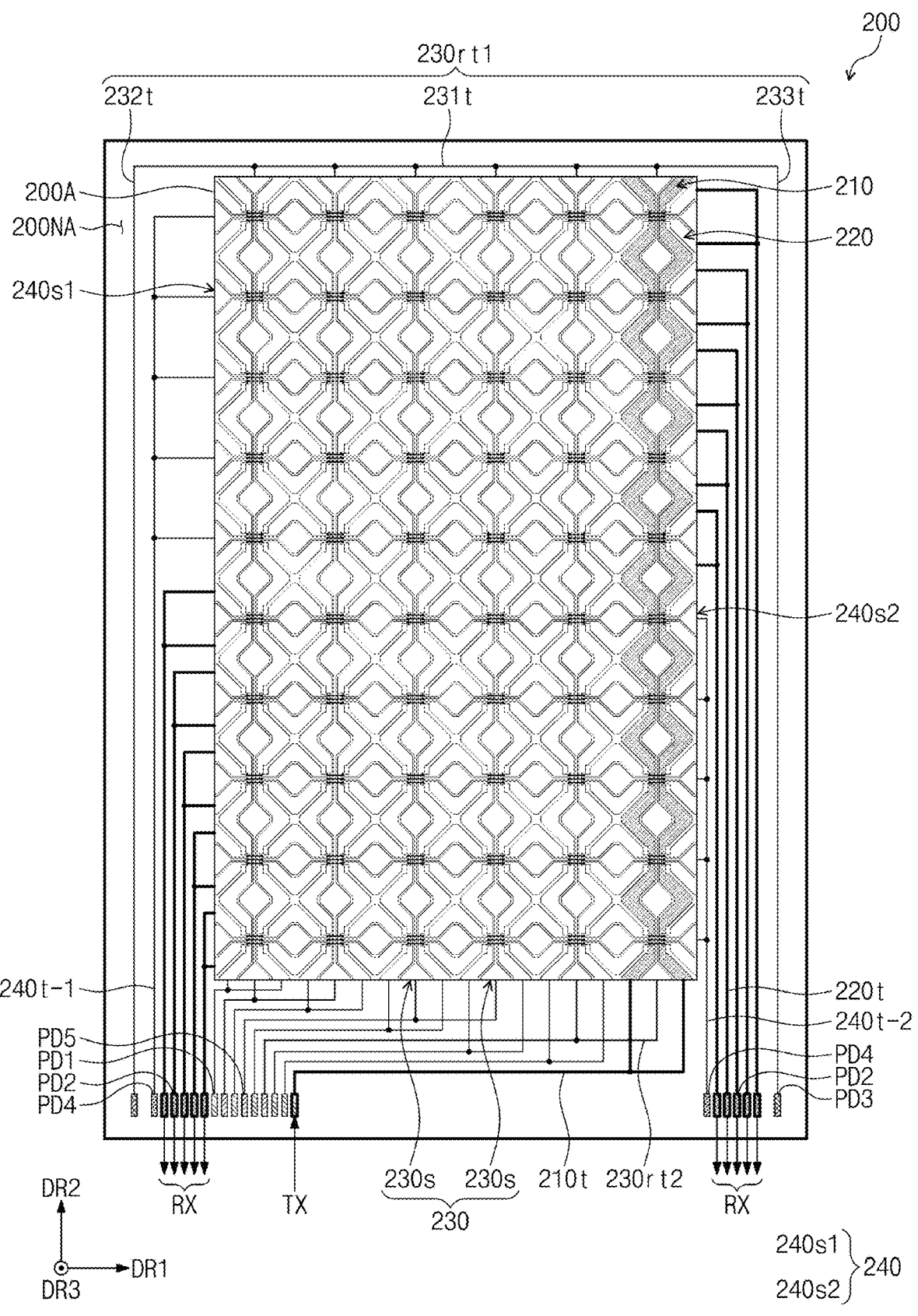
FIG. 15 is a drawing illustrating a first mode according to an embodiment of the inventive concept.

FIG. 15 is a drawing illustrating a first mode according to an embodiment of the inventive concept.

Referring to FIGS. 4, 12, and 15, the first mode MD1-d and the first mode MD1 may further include a mutual-capacitance detection mode. FIG. 15 is a drawing illustrating the mutual-capacitance detection mode in the first mode MD1-d and the first mode MD1.

In an embodiment of the mutual capacitance detection mode, the sensor driver 200C provides a transmission signal TX to first electrodes 210 in sequence, and detects a coordinate of a first input 2000 using a reception signal RX detected through second electrodes 220. For example, the sensor driver 200C may sense a change in mutual capacitance between the first electrodes 210 and the second electrodes 220 to calculate an input coordinate. The transmission signal TX may be referred to as a first driving signal, and the reception signal RX may be referred to as a first sensing signal.

FIG. 15 exemplarily illustrates that the transmission signal TX is provided to one first electrode 210, and the reception signal RX is output from the second electrodes 220. In FIG. 15, to clearly express the signal, hatching is applied only to one first electrode 210 to which the transmission signal TX is provided. However, the sensor driver 200C may detect an input coordinate of the first input 2000 by sensing a change in capacitance between the first electrode 210 and each of the second electrodes 220.

In an embodiment of the mutual-capacitance detection mode, all of the third electrodes 230 and the fourth electrodes 240 are grounded. Therefore, noise may not occur due to current flowing in through the third electrodes 230 and the fourth electrodes 240. According to another embodiment of the inventive concept, the reference potential may be applied to the third electrodes 230 and the fourth electrodes 240 in the mutual-capacitance detection mode. According to another embodiment of the inventive concept, a signal in phase with the transmission signal TX is applied to the third electrodes 230 and the fourth electrodes 240 in the mutual-capacitance detection mode. In this case, noise may not occur when current flows in through the third electrodes 230 and the fourth electrodes 240.

The sensor layer 200 may alternately repeat the operations described with reference to FIGS. 14A, 14B, and 15 in each of the first mode MD1-d of the first operation mode DMD1 and the first mode MD1 of the second operation mode DMD2. However, this is only an example, and embodiments of the inventive concept are not limited thereto. For example, the sensor layer 200 may repeat only the operation described with reference to FIG. 15 in each of the first mode MD1-d and the first mode MD1. Alternatively, in the first mode MD1-d, the sensor layer 200 may repeat only at least one operation among the operations described with reference to FIG. 14A, 14B, or 15, and in the first mode MD1, the sensor layer 200 may alternately repeat the operations described with reference to FIGS. 14A, 14B, and 15.

Figure 16:
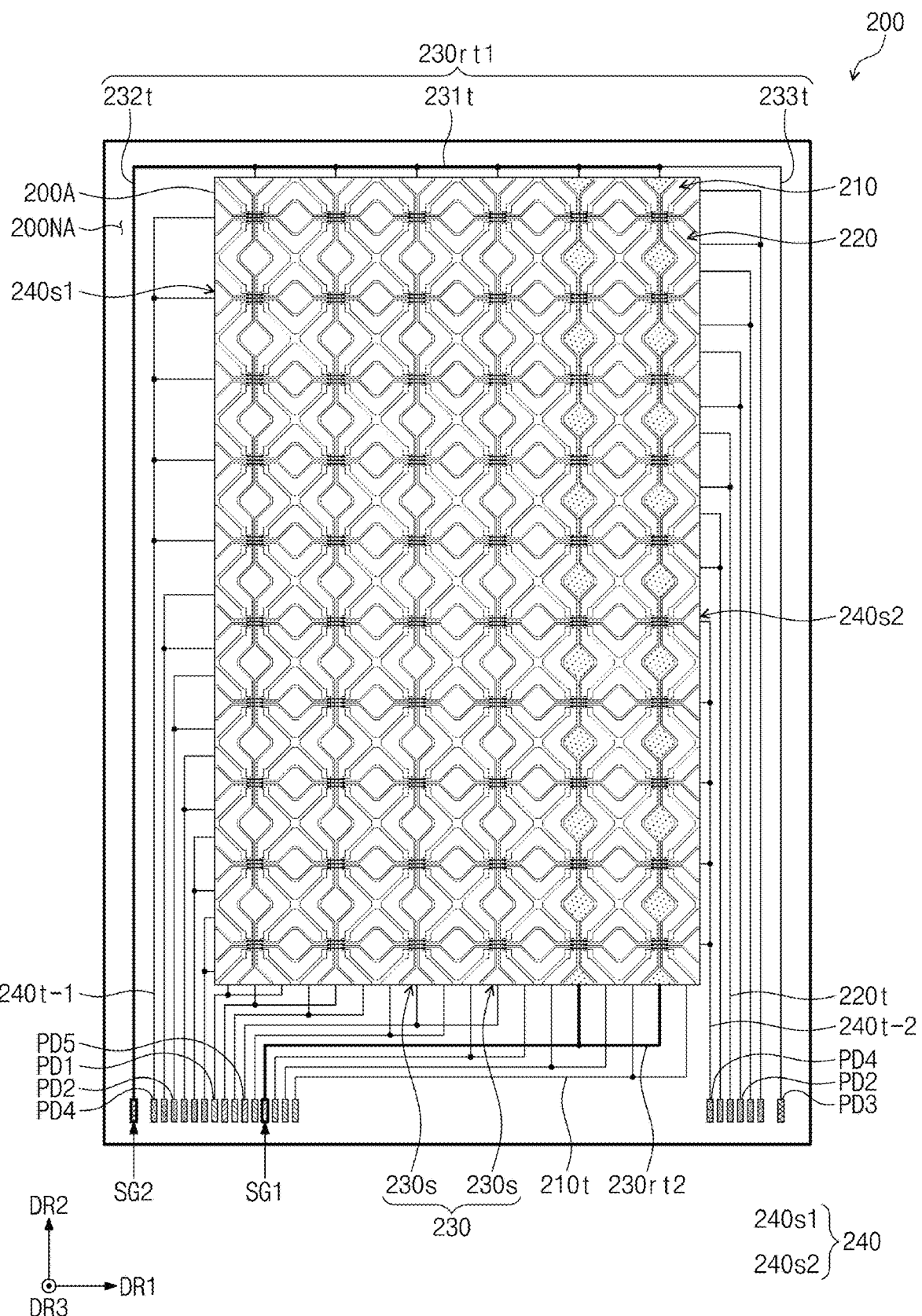
FIG. 16 is a drawing illustrating a second mode according to an embodiment of the inventive concept.
Figure 17A:
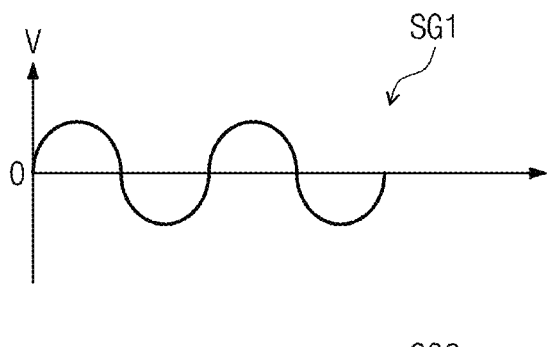
FIG. 17A shows graphs illustrating waveforms of a first signal and a second signal according to an embodiment of the inventive concept.
Figure 17A:
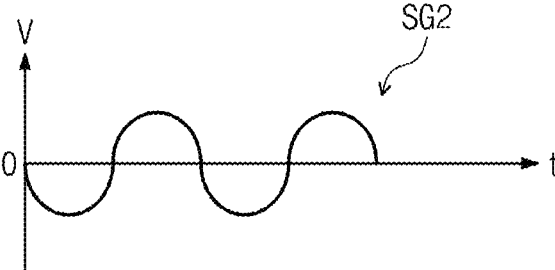
Figure 17B:
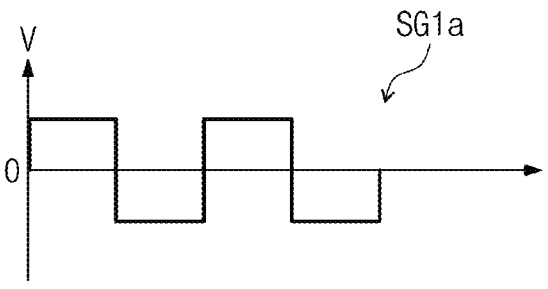
FIG. 17B shows graphs illustrating waveforms of a first signal and a second signal according to an embodiment of the inventive concept.
Figure 17B:
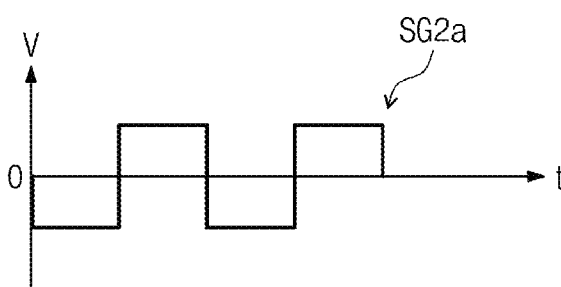
Figure 17C:
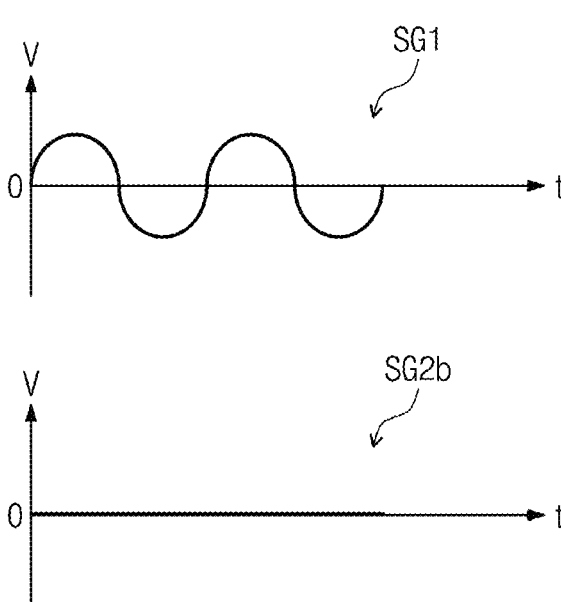
FIG. 17C shows graphs illustrating waveforms of a first signal and a second signal according to an embodiment of the inventive concept.

FIG. 16 is a drawing illustrating a second mode according to an embodiment of the inventive concept. FIG. 17A shows graphs illustrating waveforms of a first signal and a second signal according to an embodiment of the inventive concept. FIG. 17B shows graphs illustrating waveforms of a first signal and a second signal according to an embodiment of the inventive concept. FIG. 17C shows graphs illustrating waveforms of a first signal and a second signal according to an embodiment of the inventive concept.

FIG. 16 is a drawing illustrating a charge driving mode PCD. Referring to FIGS. 13, 16, and 17A, in the charge driving mode PCD, the sensor driver 200C may apply a first signal SG1 to at least one pad of third pads PD3 or fifth pads PD5, and apply a second signal SG2 to at least one other pad. In an embodiment, the second signal SG2 is a signal of a phase that is opposite to the phase of the first signal SG1. For example, the first signal SG1 may be a sinusoidal wave signal.

FIG. 16 exemplarily illustrates that the first signal SG1 is applied to one pad, and the second signal SG2 is applied to another pad, but embodiments of the inventive concept are not limited thereto. For example, the first signal SG1 may be applied to at least two pads, and the second signal SG2 may be applied to at least two other pads.

Since the first signal SG1 and the second signal SG2 are applied to at least two pads, a current RFS may flow along a current path through at least one pad to at least one other pad. In addition, when the first signal SG1 and the second signal SG2 are sinusoidal wave signals having an opposite-phase relationship to each other (e.g., see FIG. 17A), the direction of the current RFS may be periodically changed.

Referring to FIGS. 16 and 17B, a first signal SG1a and a second signal SG2a may each be a square wave signal. In an embodiment, a phase of the second signal SG2a is opposite to a phase of the first signal SG1a. When the first signal SG1a and the second signal SG2a are applied to at least two pads, a current RFS may flow along a current path through at least one pad to at least one other pad. In addition, when the first signal SG1a and the second signal SG2 are square wave signals having the opposite-phase relationship, the direction of the current RFS may be periodically changed.

The first signal SG1 or SG1a illustrated in FIGS. 17A and 17B has an opposite-phase relationship with the second signal SG2 or SG2a. Therefore, noise caused by the first signal SG1 or SG1a onto the display layer 100 (see FIG. 3) may cancel out noise caused by the second signal SG2 or SG2a. Therefore, flickering may not occur on the display layer 100, and the display layer 100 may have increased display quality.

Referring to FIGS. 16 and 17C, the first signal SG1 may be a sinusoidal wave signal. However, embodiments of the inventive concept are not limited thereto. For example, the first signal SG1 may be a square wave signal. In an embodiment when the first signal SG1 is a sinusoidal wave signal or a square wave signal, the second signal SG2b has a predetermined constant voltage. For example, the second signal SG2b may be a ground voltage or a direct current (DC) voltage. That is, a pad to which the second signal SG2b is applied may be seen as grounded. Also in this case, the current RFS may flow from at least one pad to at least one other pad. In addition, since the first signal SG1 is a sinusoidal wave signal or a square wave signal, the direction of the current RFS may be periodically changed even though the at least one other pad is grounded.

Referring to FIG. 16 again, it is illustrated that the second signal SG2 is provided to one third pad PD3a connected to one third trace line 230rt1, and the first signal SG1 is provided to one fifth pad PD5a connected to the third electrode 230. The current RFS may flow along a current path defined by a fifth pad PD5a, the fifth trace line 230rt2 connected to the fifth pad PD5a, the third electrode 230, a portion of the third trace line 230rt1 connected to a third pad PD3a, and the third pad PD3a. The current path may have a coil form or a loop coil form. Therefore, in the charge driving mode PCD of the second mode MD2, the resonance circuit of the pen PN may be charged by the current path.

According to an embodiment of the inventive concept, a current path in a loop coil pattern may be provided by the components included in the sensor layer 200. Therefore, the electronic device 1000 (see FIG. 1A) may charge the pen PN using the sensor layer 200. Accordingly, since a separate component having a coil for charging the pen PN does not need to be added, the electronic device 1000 may not increase in thickness and weight, or decrease in flexibility.

In an embodiment of the charge driving mode PCD, the first electrodes 210, the second electrodes 220, and the fourth electrodes 240 are grounded, have constant voltages applied thereto, or electrically floated. In particular, the first electrodes 210, the second electrodes 220, and the fourth electrodes 240 may be floated. In this case, the current RFS may not flow to the first electrodes 210, the second electrodes 220, and the fourth electrodes 240.

Figure 18:
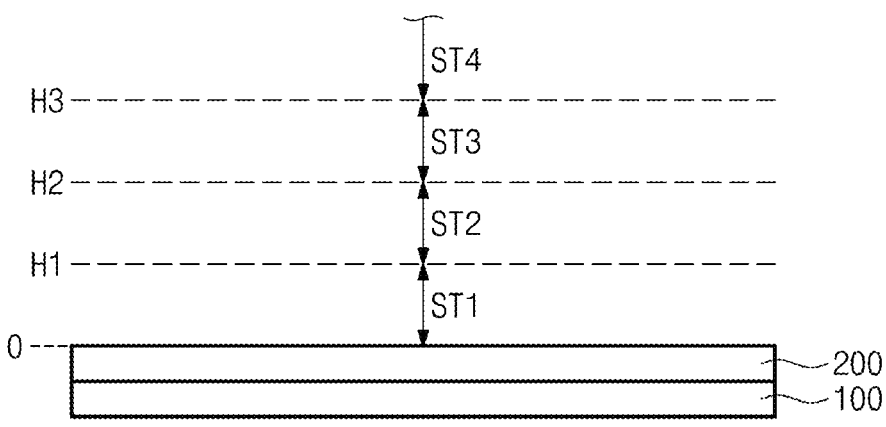
FIG. 18 is a drawing illustrating a pen proximity sensing driving mode according to an embodiment of the inventive concept.

FIG. 18 is a drawing illustrating a pen proximity sensing driving mode according to an embodiment of the inventive concept.

Referring to FIGS. 4 and 18, in the pen proximity sensing driving mode PHS (see FIG. 13), the sensor driver 200C may sense an input by the pen PN which is not in contact with the electronic device 1000 (hereinafter, referred to as a hovering state). For example, the sensor driver 200C may sense when the pen PN has been brought close to the sensor layer 200 without contacting the sensor layer 200.

According to an embodiment of the inventive concept, the sensor driver 200C receives a signal from the sensor layer 200, and by using the sensed signal, determines the approximate height at which the pen PN is positioned or a section in which the pen PN is positioned. A first height H1, a second height H2, and a third height H3 may be defined sequentially from the sensor layer 200. For example, the first height H1 may be about 10 millimeter (mm), the second height H2 may be about 20 mm, and the third height H3 may be about 30 mm, but embodiments of the inventive concept are not limited thereto. The first to third heights H1, H2, and H3, which are the references for distinguishing the sections to be described hereinafter, may be variously changed.

According to an embodiment of the inventive concept, distance sections between the sensor layer 200 and the pen PN may be divided into a contact section ST1 most adjacent to the sensor layer 200, a proximity section ST2 above the contact section ST1, a remote distance section ST3 above the proximity section ST2, and an unrecognition section ST4 above the remote distance section ST3. The contact section ST1 and the proximity section ST2 may be distinguished on the basis of the first height H1, the proximity section ST2 and the remote distance section ST3 may be distinguished on the basis of the second height H2, and the remote distance section ST3 and the unrecognition section ST4 may be distinguished on the basis of the third height H3. For example, the sensor driver 200C may determine that it is not to recognize a hovering state when it determines the height to be greater than the third height H3.

Figure 19A:
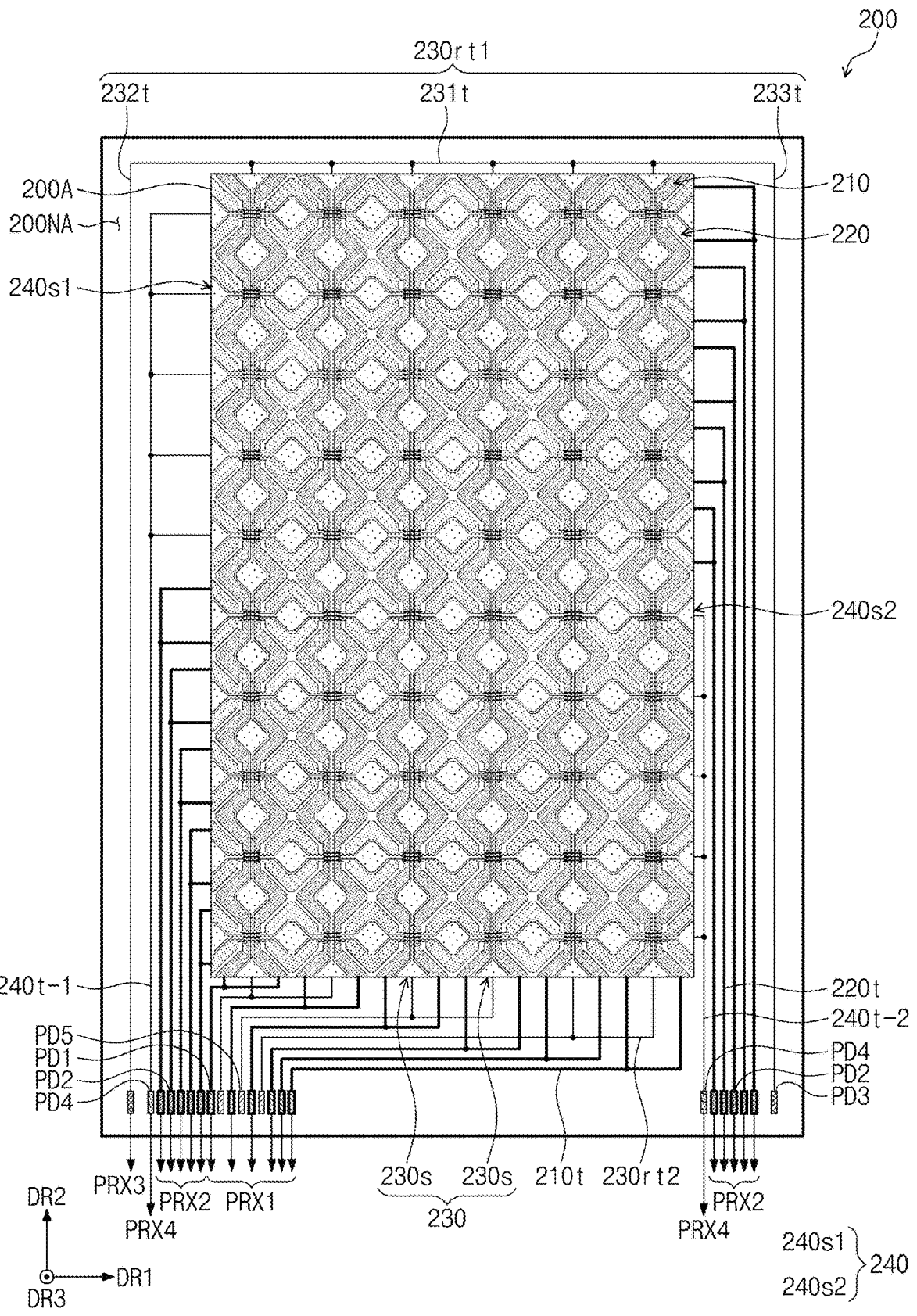
FIG. 19A is a drawing illustrating a pen proximity sensing driving mode according to an embodiment of the inventive concept.
Figure 19B:
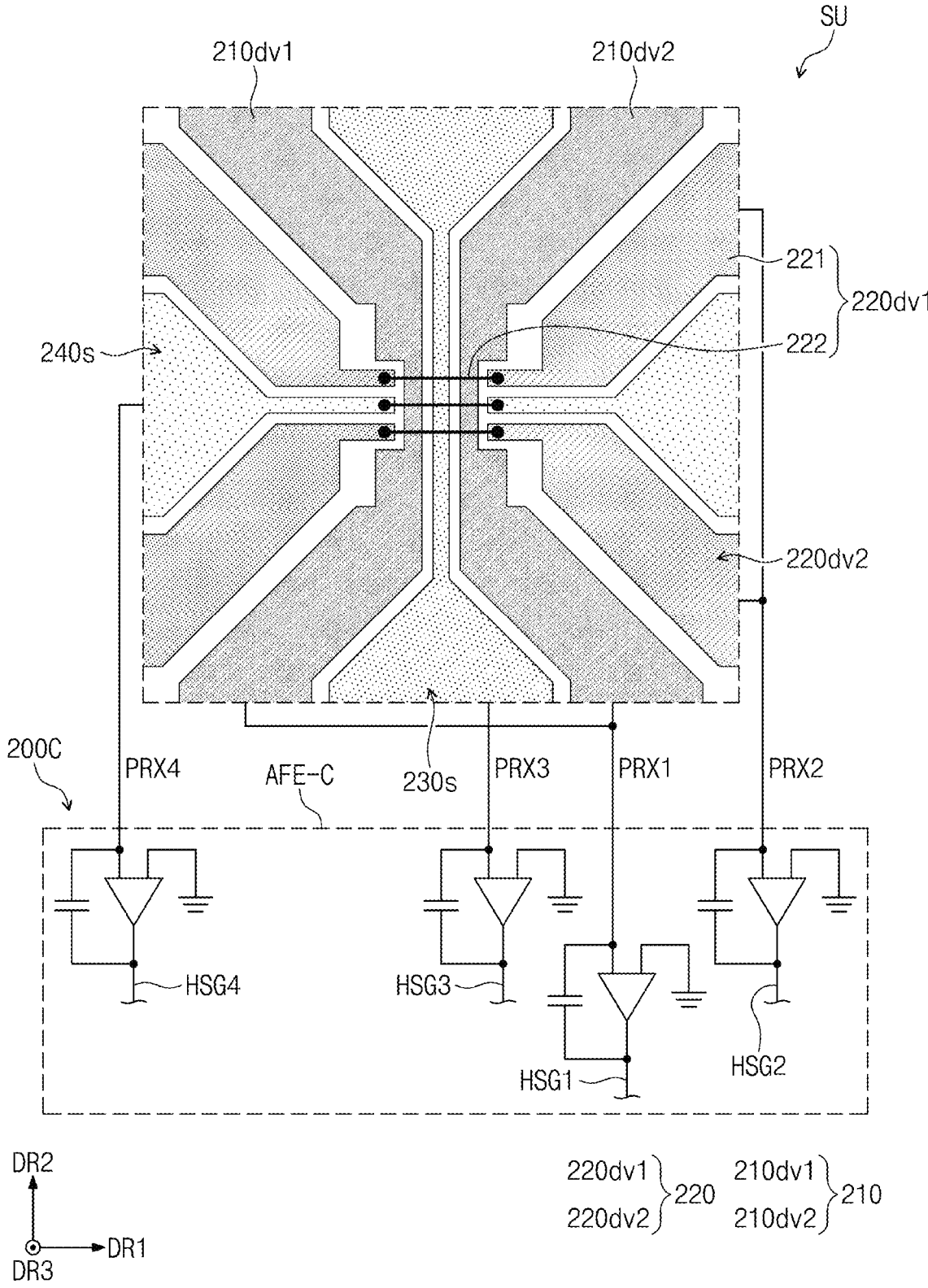
FIG. 19B is a drawing illustrating a pen proximity sensing driving mode on the basis of a sensing unit according to an embodiment of the inventive concept.

FIG. 19A is a drawing illustrating a pen proximity sensing driving mode according to an embodiment of the inventive concept. FIG. 19B is a drawing illustrating a pen proximity sensing driving mode on the basis of a sensing unit according to an embodiment of the inventive concept.

Referring to FIGS. 13, 19A and 19B, in the pen proximity sensing driving mode PHS, the sensor driver 200C may receive a first reception signal PRX1 from first electrodes 210, receive a second reception signal PRX2 from second electrodes 220, receive a third reception signal PRX3 from third electrodes 230, and receive a fourth reception signal PRX4 from fourth electrodes 240.

The third electrodes 230 may be connected to each other by a third trace line 230rt1 to function as one electrode, and the fourth electrodes 240 may each overlap at least two second electrodes 220. Therefore, the third reception signal PRX3 and the fourth reception signal PRX4 may be used for determining whether a pen is in proximity, instead of recognizing a detailed coordinate. For example, in a simulation of comparing the second reception signal PRX2 and the fourth reception signal PRX4, it is seen that upon a pen being in proximity, the voltage (or current) change of the fourth reception signal PRX4 has a similar level with that of the voltage (or current) change of the second reception signal PRX2.

In an embodiment, the sensor driver 200C includes an analog front-end circuit AFE-C. In an embodiment of the second mode, the analog front-end circuit AFE-C is electrically connected to the first electrodes 210 and the second electrodes 220, and selectively electrically connected to the third electrode 230 and the fourth electrode 240. For example, the analog front-end circuit AFE-C may be electrically connected to all of the first electrodes 210, the second electrodes 220, the third electrode 230, and the fourth electrode 240 in the second mode. Alternatively, according to the position at which the pen PN is sensed, the analog front-end circuit AFE-C may not be electrically connected to at least one of the third electrode 230 or the fourth electrode 240.

Referring to FIG. 19B, when the pen proximity sensing driving mode begins, the analog front-end circuit AFE-C of the sensor driver 200C may be electrically connected to the first electrodes 210, the second electrodes 220, the third electrode 230, and the fourth electrode 240. The analog front-end circuit AFE-C may receive the first to fourth reception signals PRX1, PRX2, PRX3, and PRX4, and output first to fourth signals HSG1, HSG2, HSG3, and HSG4 corresponding thereto.

FIG. 20 is a drawing illustrating a pen proximity sensing driving mode according to an embodiment of the inventive concept.

Referring to FIGS. 13, 19B, and 20, in an embodiment of the pen proximity sensing driving mode PHS, the sensor driver 200C calculates first to third data DATA1, DATA2, and DATA3 based on signals received from the first electrodes 210, the second electrodes 220, the third electrode 230, and the fourth electrode 240.

The first data DATA1 may be data that merges (or combines) the first to fourth signals HSG1, HSG2, HSG3, and HSG4. The second data DATA2 may be data that merges the first, second, and fourth signals HSG1, HSG2, and HSG4. The third data DATA3 may be data that merges the first and second signals HSG1 and HSG2. However, this is only an example, and the second data DATA2 may also be data that merges the first, second, and third signals HSG1, HSG2, and HSG3.

FIG. 21A is a drawing illustrating a pen proximity sensing driving mode according to an embodiment of the inventive concept.

Referring to FIGS. 19B, 20, and 21A, the sensor driver 200C is configured to compare the first data DATA1 to a first threshold value TH1, compare the second data DATA2 to a second threshold value TH2, and compare the third data DATA3 to a third threshold value TH3. The first to third threshold values TH1, TH2, and TH3 may be the same as each other, or differ from each other.

According to an embodiment of the inventive concept, when the first to third data DATA1, DATA2, and DATA3 are respectively greater than the corresponding first to third threshold values TH1, TH2, and TH3, the sensor driver 200C may determine that the pen PN (see FIG. 4) is positioned in a contact section ST1. When the first and second data DATA1 and DATA2 are respectively greater than the corresponding first and second threshold values TH1 and TH2, the sensor driver 200C may determine that the pen PN is positioned in a proximity section ST2. When only the first data DATA1 is greater than the first threshold value TH1, the sensor driver 200C may determine that the pen PN is positioned in a remote distance section ST3.

FIG. 21B is a drawing illustrating a pen proximity sensing driving mode according to an embodiment of the inventive concept.

Referring to FIGS. 19B, 20, and 21B, the sensor driver 200C is configured to compare total data SDATA of the first data DATA1, the second data DATA2, and the third data DATA3 to a plurality of threshold values THa, THb, and THc, and to determine the distance section between the sensor layer 200 and the pen PN (see FIG. 4) based on a result of the compare.

According to an embodiment of the inventive concept, when the total data SDATA is greater than the first threshold value THa, the sensor driver 200C may determine that the pen PN (see FIG. 4) is positioned in a contact section ST1. When the total data SDATA is greater than the second threshold value THb and less than or equal to the first threshold value THa, the sensor driver 200C may determine that the pen PN is positioned in a proximity section ST2. When the total data SDATA is greater than the third threshold value THc and less than or equal to the second threshold value THb, the sensor driver 200C may determine that the pen PN is positioned in a remote distance section ST3. When the total data SDATA is less than or equal to the third threshold value THc, the sensor driver 200C may determine that the pen PN is unrecognized.

FIG. 22 is a drawing illustrating a pen proximity sensing driving mode according to an embodiment of the inventive concept.

Referring to FIGS. 19B, 21A, and 22, in the pen proximity sensing driving mode, once a position of the pen PN (see FIG. 4) is determined, the sensor driver 200C may activate or deactivate electrodes that are used for determining a proximity position of the pen PN on the basis of the position. For example, the electrode for sensing an input positioned above the recognized pen may be deactivated.

According to an embodiment of the inventive concept, when it is determined that the pen PN is positioned in the contact section ST1 or the proximity section ST2, the sensor driver 200C deactivates DIS the third electrode 230 and the fourth electrode 240. Deactivating DIS may mean electrically disconnecting the analog front-end circuit AFE-C from the third electrode 230 and the fourth electrode 240. In this case, the sensor driver 200C may sense the proximity and coordinate of the pen PN by using the activated EN first electrodes 210 and second electrodes 220.

In an embodiment, when it is determined that the pen PN is positioned in the remote distance section ST3, the sensor driver 200C deactivate DIS any one among the third electrode 230 and the fourth electrode 240. FIG. 22 exemplarily illustrates that the third electrode 230 is deactivated DIS. In this case, the sensor driver 200C may sense the proximity and coordinate of the pen PN by using the activated EN first electrodes 210, second electrodes 220, and fourth electrodes 240.

When the pen PN is not sensed, the sensor driver 200C may determine that the pen PN is positioned in the unrecognition section ST4, and may activate EN all of the first to fourth electrodes 210, 220, 230, and 240 to sense the approach of the pen PN.

According to an embodiment of the inventive concept, the sensor driver 200C deactivates predetermined electrodes after determining the position of the pen PN. In this case, the current consumption of the electronic device 1000 (see FIG. 1A) may be reduced.

Figure 23A:
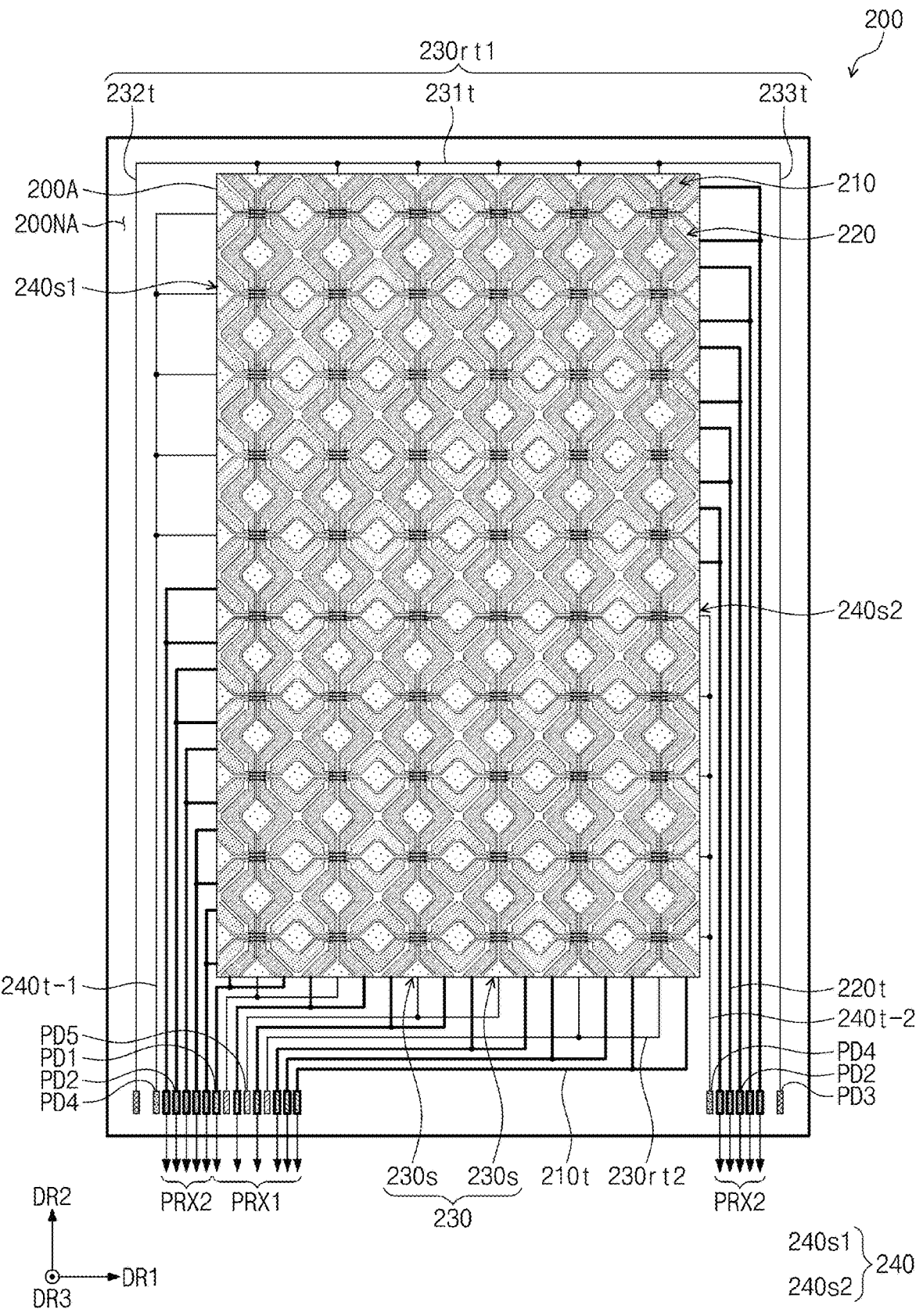
FIG. 23A is a drawing illustrating a second mode according to an embodiment of the inventive concept.
Figure 23B:
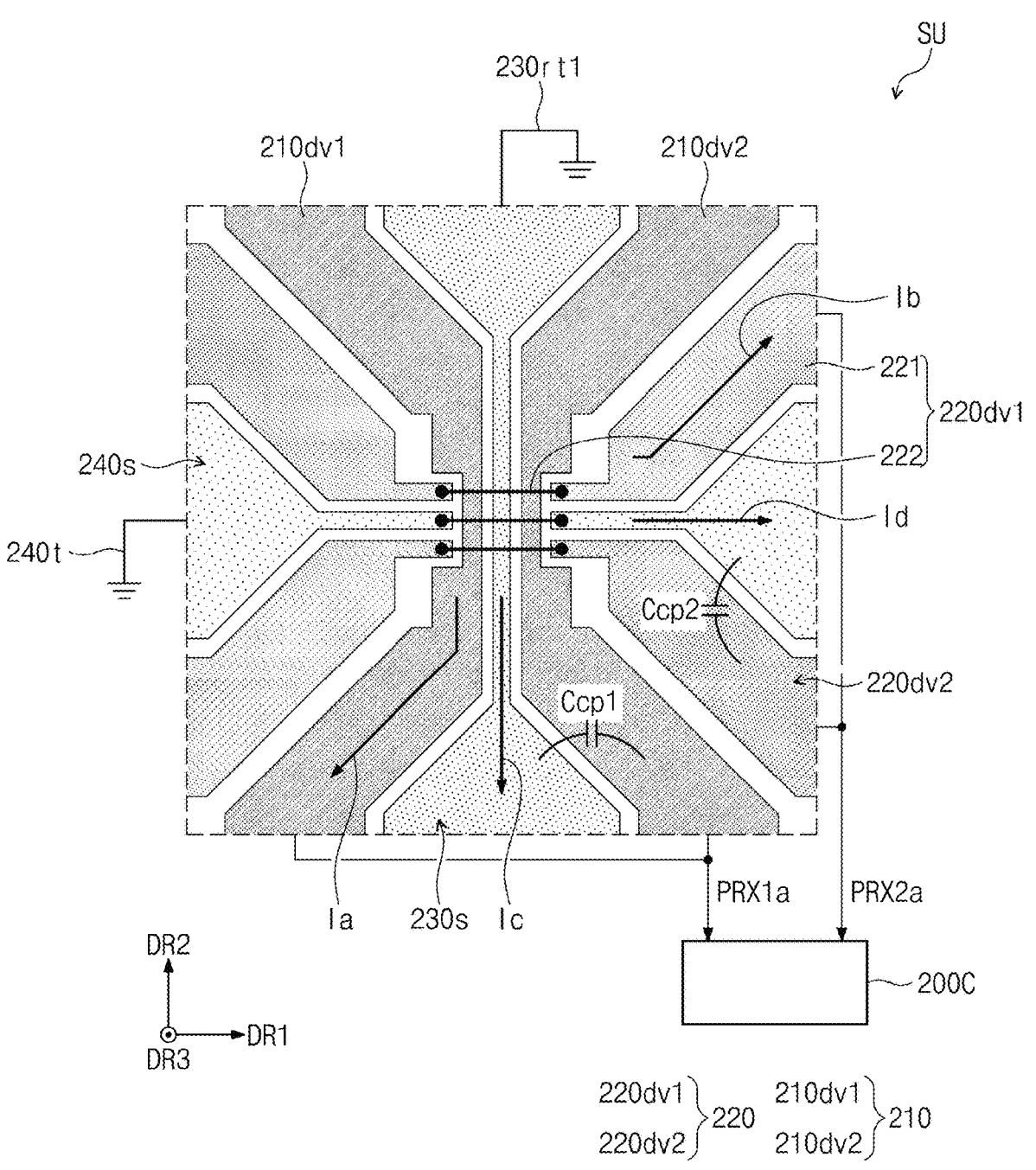
FIG. 23B is a drawing illustrating a second mode on the basis of a sensing unit according to an embodiment of the inventive concept.

FIG. 23A is a drawing illustrating a second mode according to an embodiment of the inventive concept. FIG. 23B is a drawing illustrating a second mode on the basis of a sensing unit according to an embodiment of the inventive concept.

Referring to FIGS. 13, 23A, and 23B, FIGS. 23A and 23B are drawings illustrating a pen sensing driving mode PPS. FIG. 23B illustrates one sensing unit SU in which first to fourth induced currents Ia, Ib, Ic, and Id, generated by a pen PN, flow.

An RLC resonance circuit of the pen PN may emit a magnetic field of resonance frequency while discharging the charged charge. Due to the magnetic field provided from the pen PN, the first induced current Ia may be generated in a first electrode 210, and the second induced current Ib may be generated in a second electrode 220. In addition, the third induced current Ic may be generated in a first auxiliary electrode 230s of a third electrode 230, and the fourth induced current Id may be generated in a second auxiliary electrode 240s of a fourth electrode 240.

A first coupling capacitor Ccp1 may be formed between the first auxiliary electrode 230s and the first electrode 210, and a second coupling capacitor Ccp2 may be formed between the second auxiliary electrode 240s and the second electrode 220. The third induced current Ic may be transferred to the first electrode 210 through the first coupling capacitor Ccp1, and the fourth induced current Id may be transferred to the second electrode 220 through the second coupling capacitor Ccp2.

The sensor driver 200C may receive a first reception signal PRX1a based on the first induced current Ia and the third induced current Ic, from the first electrode 210, and receive a second reception signal PRX2a based on the second induced current Ib and the fourth induced current Id, from the second electrode 220. The sensor driver 200C may detect an input coordinate of the pen PN on the basis of the first reception signal PRX1a and the second reception signal PRX2a.

The sensor driver 200C may receive the first reception signal PRX1a from the first electrodes 210, and receive the second reception signal PRX2a from the second electrodes 220. In an embodiment, one end portions of the third electrodes 230 and the fourth electrodes 240 are all floated. Therefore, compensation of a sensing signal may be maximized by a coupling between the first electrodes 210 and the third electrodes 230 and a coupling between the second electrodes 220 and the fourth electrodes 240. In addition, the other end portions of the third electrodes 230 and the fourth electrodes 240 may be grounded or floated. Therefore, the third induced current Ic and the fourth induced current Id may be sufficiently transferred to the first electrodes 210 and the second electrodes 220 due to the coupling between the first electrodes 210 and the third electrodes 230 and the coupling between the second electrodes 220 and the fourth electrodes 240.

According to an embodiment of the inventive concept, routing directions of an electrode and an auxiliary electrode of the sensor layer 200, overlapping each other, may differ from each other. For example, the routing direction of the first electrode 210 and the routing direction of the first auxiliary electrode 230s may be different from each other. In addition, the routing direction of the second electrode 220 and the routing direction of the second auxiliary electrode 240s may be different from each other. For example, in FIG. 23B, the first electrode 210 and a first trace line 210t may be connected to each other on a lower part of the sensing unit SU, and the first auxiliary electrode 230s and a third trace line 230rt1 may be connected to each other on an upper part of the sensing unit SU. The second electrode 220 and a second trace line 220t may be connected to each other on the left side of the sensing unit SU, and the second auxiliary electrode 240s and a fourth trace line 240t may be connected to each other on the right side of the sensing unit SU.

Figure 24:
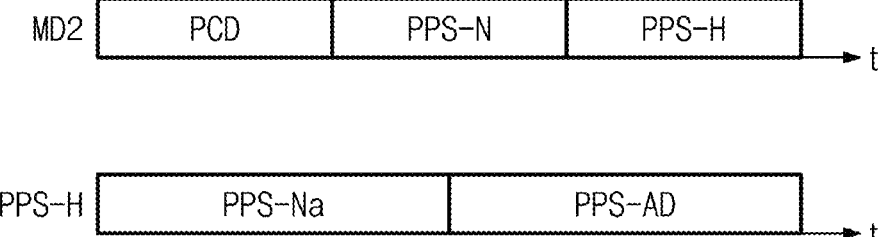
FIG. 24 is a drawing illustrating a second mode according to an embodiment of the inventive concept.

FIG. 24 is a drawing illustrating a second mode according to an embodiment of the inventive concept.

Referring to FIGS. 4 and 24, a second mode MD2 includes a charge driving mode PCD and a pen sensing driving mode. The pen sensing driving mode includes a normal operation mode PPS-N and a high sensitivity driving mode PPS-H.

According to an embodiment of the inventive concept, the high sensitivity driving mode PPS-H may operate according to a particular circumstance or a user's choice. That is, FIG. 24 exemplarily illustrates that the high sensitivity driving mode PPS-H operates continuously after the normal operation mode PPS-N, but embodiments of the inventive concept are not limited thereto. For example, in the second mode MD2, the high sensitivity driving mode PPS-H may operate continuously after the charge driving mode PCD, and the normal operation mode PPS-N may also be omitted. Alternatively, in the second mode MD2, the normal operation mode PPS-N may operate after the charge driving mode PCD, and the high sensitivity driving mode PPS-H may be omitted. In addition, according to an embodiment of the inventive concept, the second mode MD2 may further include the pen proximity sensing driving mode PHS (see FIG. 13) previously described.

The high sensitivity driving mode PPS-H may include a normal operation mode PPS-Na and an additional operation mode PPS-AD. In the high sensitivity driving mode PPS-H, a sensor driver 200C and a sensor layer 200 may operate in a time-division manner in the normal operation mode PPS-Na and the additional operation mode PPS-AD.

The normal operation mode PPS-N and PPS-Na may correspond to the pen sensing driving mode PPS described with reference to FIGS. 23A and 23B. Referring to FIG. 23B, in the normal operation mode PPS-N and PPS-Na, the sensor driver 200C may receive the first reception signal PRX1a based on the first induced current 1a and the third induced current Ic, from the first electrode 210, and receive the second reception signal PRX2a based on the second induced current Ib and the fourth induced current Id, from the second electrode 220. The sensor driver 200C may detect an input coordinate of the pen PN based on the first reception signal PRX1a and the second reception signal PRX2a.

The additional operation mode PPS-AD may be an operation mode which additionally uses at least one of the first auxiliary electrode 230s of the third electrode 230 or the second auxiliary electrode 240s of the fourth electrode 240, of the sensor layer 200, for high-sensitivity sensing. For example, an analog front-end circuit AFE-C of the sensor driver 200C may be selectively connected to at least one electrode of the first auxiliary electrode 230s or the second auxiliary electrode 240s. This will be described in detail with reference to FIGS. 25A to 25C as follows.

Figure 25A:
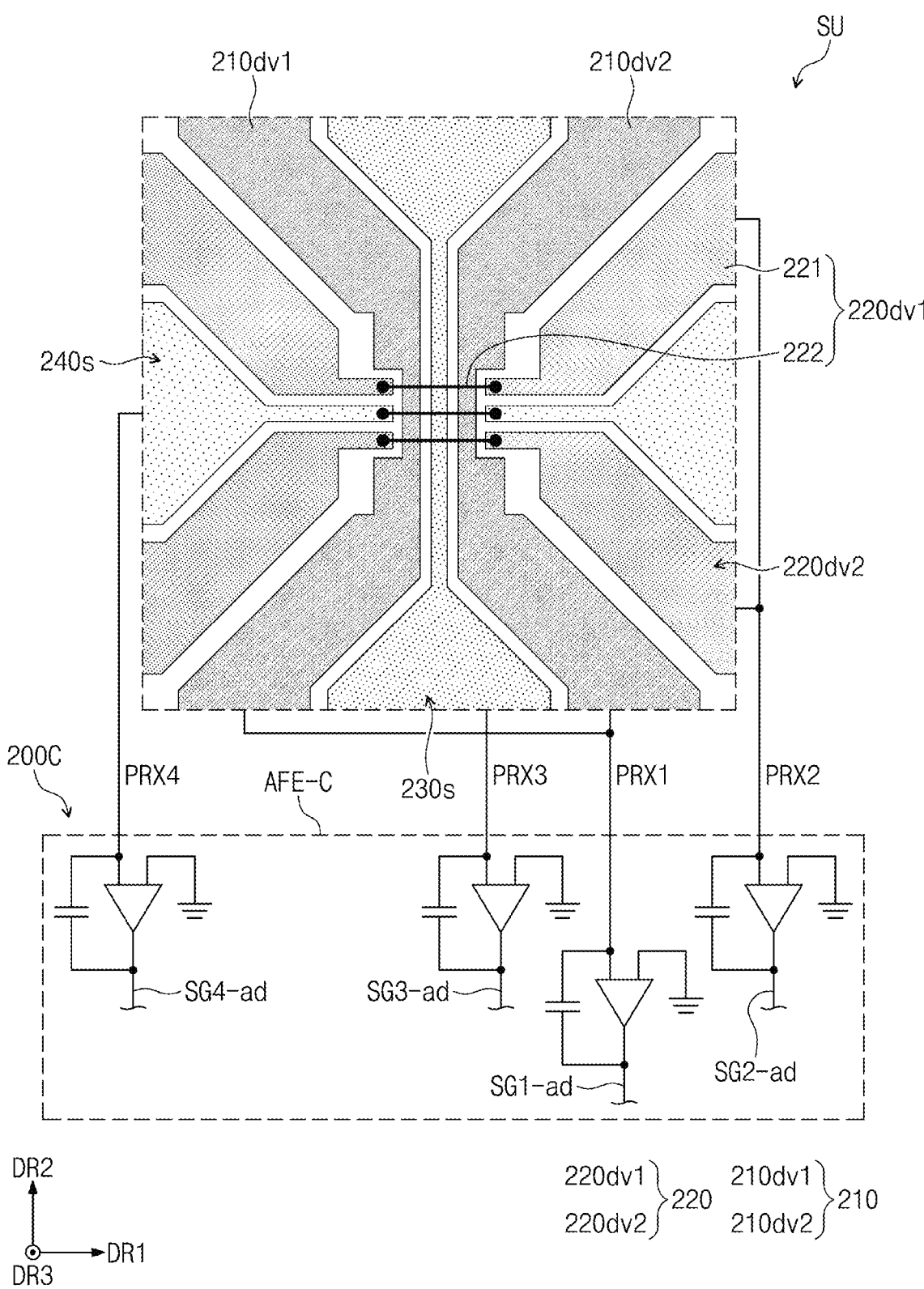
FIG. 25A is a drawing illustrating a high sensitivity driving mode on the basis of a sensing unit according to an embodiment of the inventive concept.
Figure 25B:
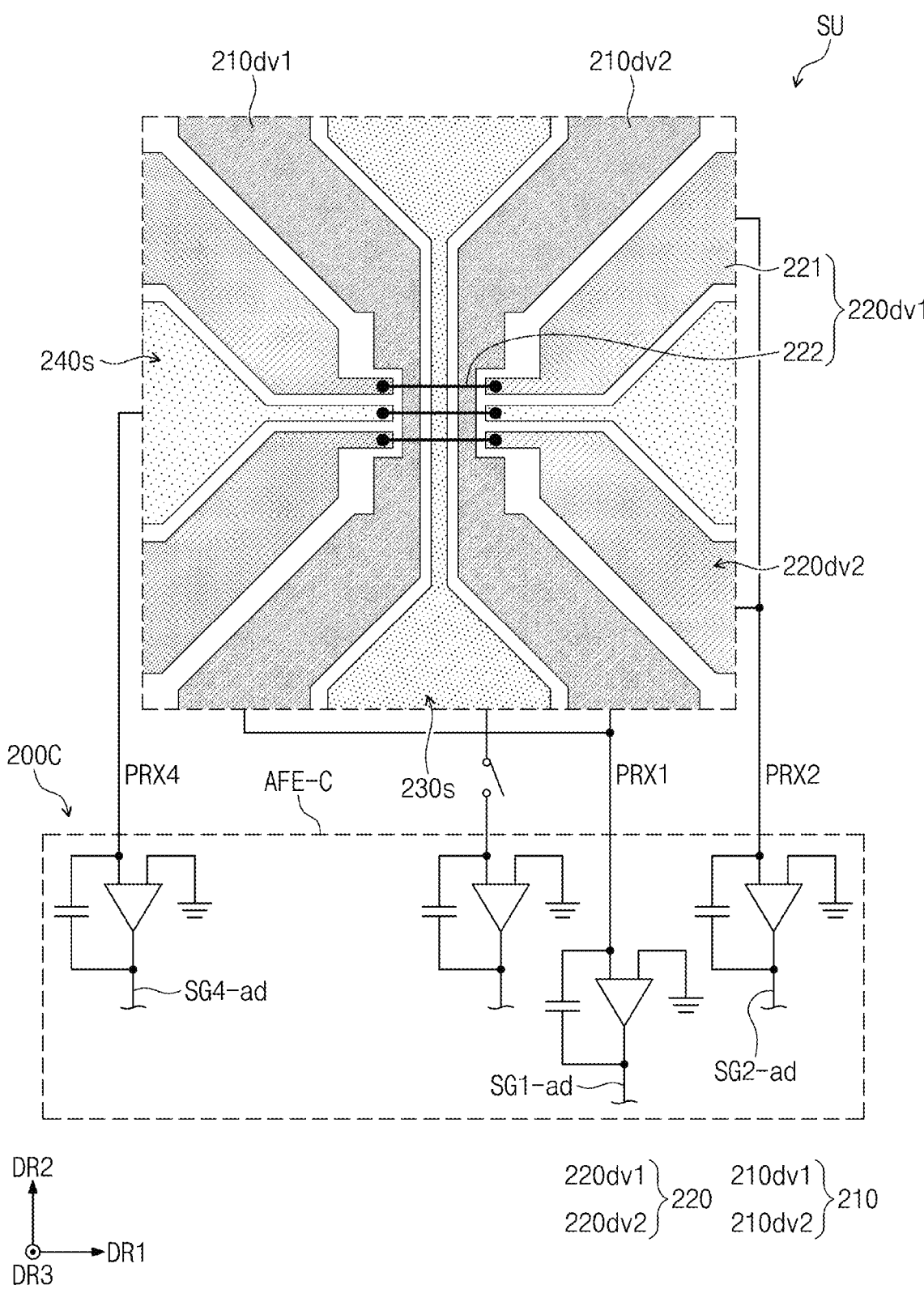
FIG. 25B is a drawing illustrating a high sensitivity driving mode on the basis of a sensing unit according to an embodiment of the inventive concept.
Figure 25C:
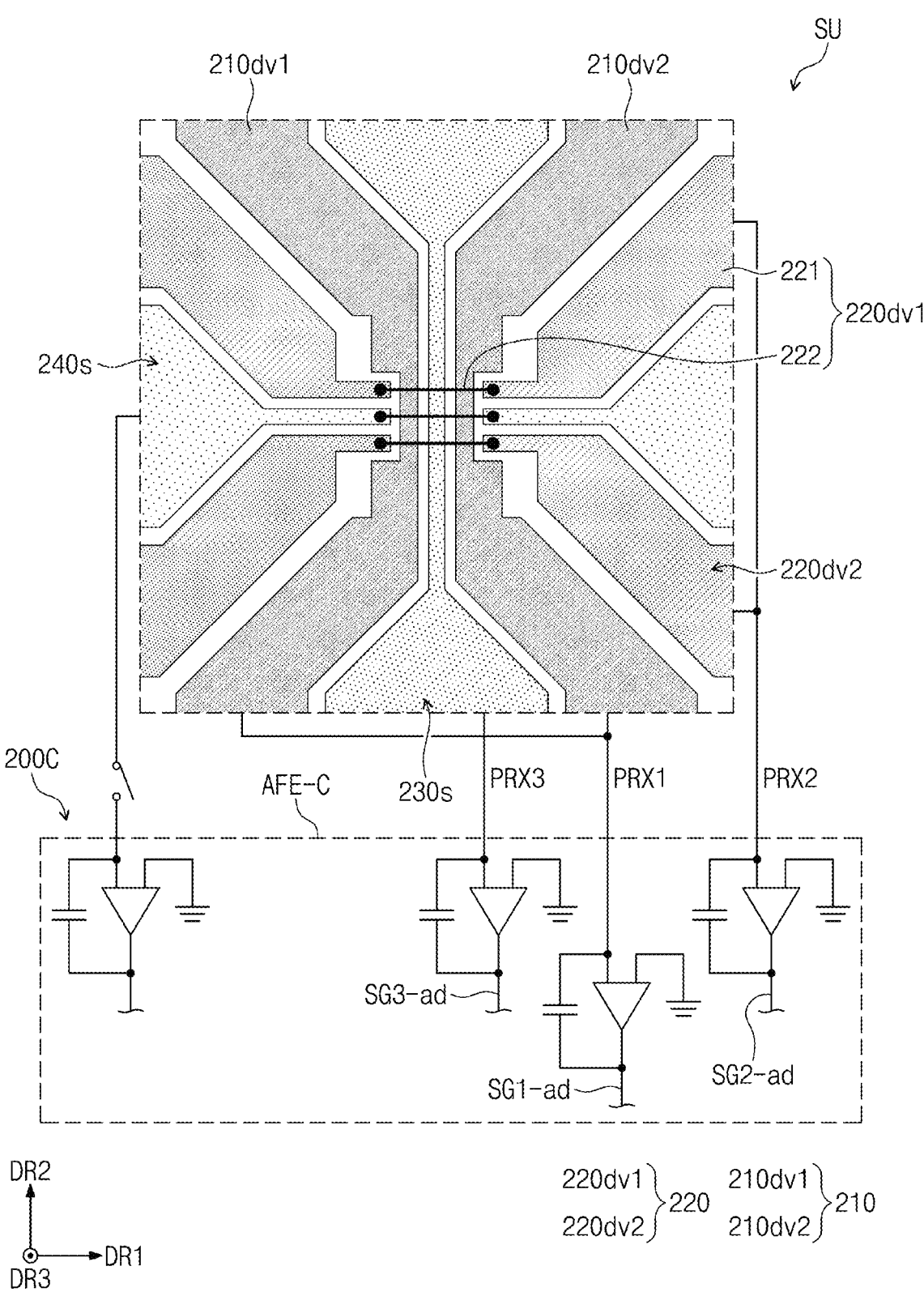
FIG. 25C is a drawing illustrating a high sensitivity driving mode on the basis of a sensing unit according to an embodiment of the inventive concept.

FIG. 25A is a drawing illustrating a high sensitivity driving mode on the basis of a sensing unit according to an embodiment of the inventive concept. FIG. 25B is a drawing illustrating a high sensitivity driving mode on the basis of a sensing unit according to an embodiment of the inventive concept. FIG. 25C is a drawing illustrating a high sensitivity driving mode on the basis of a sensing unit according to an embodiment of the inventive concept.

Referring to FIG. 25A, a sensor driver 200C may receive first to fourth reception signals PRX1, PRX2, PRX3, and PRX4 from a first electrode 210, a second electrode 220, a first auxiliary electrode 230s, and a second auxiliary electrode 240s, and this operation mode may be referred to as a first operation mode.

The sensor driver 200C may include an analog front-end circuit AFE-C. In an embodiment of the first operation mode, the analog front-end circuit AFE-C is electrically connected to the first electrode 210, the second electrode 220, the first auxiliary electrode 230s, and the second auxiliary electrode 240s. The analog front-end circuit AFE-C may receive, and output first to fourth signals SG1-ad, SG2-ad, SG3-ad, and SG4-ad corresponding thereto. In an embodiment, a first switch is present between a first node of the analog front-end circuit AFE-C that receives the first reception signal PRX1 and the first electrode 210; a second switch is present between a second node of the analog front-end circuit AFE-C that receives the second reception signal PRX2 and the second electrode 220; a third switch is present between a third node of the analog front-end circuit AFE-C that receives the third reception signal PRX3 and the third electrode 230s; a fourth switch is present between a fourth node of the analog front-end circuit AFE-C that receives the fourth reception signal PRX4 and a second auxiliary electrode 240s; and all the switches are closed during the first operation mode.

Referring to FIG. 25B, a sensor driver 200C may receive first, second, and fourth reception signals PRX1, PRX2, and PRX4 from a first electrode 210, a second electrode 220, and a second auxiliary electrode 240s, and this operation mode may be referred to as a second operation mode. An analog front-end circuit AFE-C may receive the first, second and fourth reception signals PRX1, PRX2, and PRX4, and output first, second and fourth signals SG1-ad, SG2-ad, and SG4-ad corresponding thereto. In an embodiment, the third switch is opened to prevent the sensor driver 200C from receiving the third reception signal PRX3 during the second operation mode. When the third switch is implemented by a transistor, a controller may be present that outputs a control signal to a gate of the transistor to open the third switch during the second operation mode.

Referring to FIG. 25C, a sensor driver 200C receives first, second, and third reception signals PRX1, PRX2, and PRX3 from a first electrode 210, a second electrode 220, and a first auxiliary electrode 230s, and this operation mode may be referred to as a third operation mode. An analog front-end circuit AFE-C may receive the first, second, and third reception signals PRX1, PRX2, and PRX3, and output first, second, and third signals SG1-ad, SG2-ad, and SG3-ad corresponding thereto. In an embodiment, the fourth switch is opened to prevent the sensor driver 200C from receiving the fourth reception signal PRX4 during the third operation mode. When the fourth switch is implemented by a transistor, a controller may be present that outputs a control signal to a gate of the transistor to open the fourth switch during the third operation mode.

The sensor driver 200C may operate in a time-division manner in a normal operation mode and at least one among first to third operation modes for high-sensitivity sensing. In the normal operation mode, the sensor driver 200C may detect an input coordinate of a pen PN based on a first reception signal PRX1a and a second reception signal PRX2a received from the first electrode 210 and the second electrode 220. In addition, in each of the first to third operation modes, the sensor driver 200C may further use data which is based on at least one among the third and fourth reception signals PRX3 and PRX4 transmitted to the first auxiliary electrode 230s and the second auxiliary electrode 240s. In this case, it may be possible to calculate the approach of the pen and the coordinate of the pen through the high sensitivity sensing mode even though a film or a cover accessory is mounted on the electronic device 1000 (see FIG. 1A).

Figure 26:
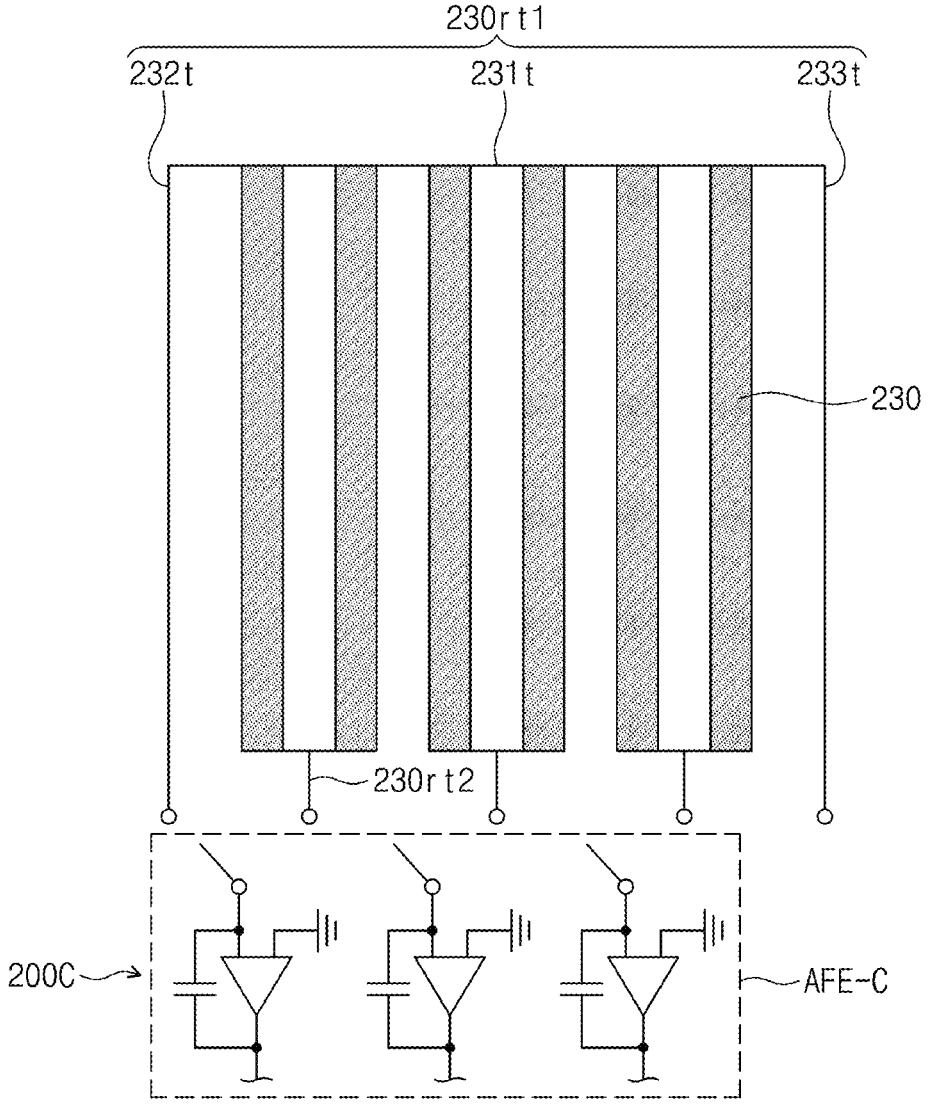
FIG. 26 is a drawing illustrating a partial configuration of a sensor layer and a sensor driver according to an embodiment of the inventive concept.

FIG. 26 is a drawing illustrating a partial configuration of a sensor layer and a sensor driver according to an embodiment of the inventive concept.

Referring to FIGS. 6 and 26, FIG. 26 schematically illustrates a third electrode 230, a third trace line 230rt1, and fifth trace lines 230rt2, and an analog front-end circuit AFE-C included in the sensor driver 200C.

According to an embodiment of the inventive concept, in a second mode, the analog front-end circuit AFE-C is selectively connected to at least one of a second line portion 232t, a third line portion 233t, and the fifth trace lines 230rt2. For example, the analog front-end circuit AFE-C may include at least one amplifier. FIG. 26 exemplarily illustrates three amplifiers, but embodiments of the inventive concept are not limited thereto.

In the second mode, one amplifier may be selectively connected to one among the second line portion 232t, the third line portion 233t, and the fifth trace lines 230rt2. However, embodiments of the inventive concept are not limited thereto. For example, a plurality of amplifiers may be electrically connected to a plurality of portions selected among the second line portion 232t, the third line portion 233t, and the fifth trace lines 230rt2, respectively. Alternatively, one amplifier may be electrically connected to the plurality of portions selected among the second line portion 232t, the third line portion 233t, and the fifth trace lines 230rt2. For example, switches may be used to selectively connect the amplifiers to the plurality of portions.

According to an embodiment of the inventive concept, since the third electrodes 230 are electrically connected to each other by the third trace line 230rt1, the analog front-end circuit AFE-C may be connected to one terminal among the second line portion 232t, the third line portion 233t, and the fifth trace lines 230rt2. For example, in a high sensitivity sensing mode, in a case where the sensor driver 200C operates to receive a signal from the third electrode 230, the analog front-end circuit AFE-C may be selectively connected to one terminal among the second line portion 232t, the third line portion 233*t*, and the fifth trace lines 230*rt*2 within a sensing time, and the terminal to which the analog front-end circuit AFE-C is connected may vary.

According to an embodiment of the inventive concept, the analog front-end circuit AFE-C is connected to at least two terminals among the second line portion 232*t*, the third line portion 233*t*, and the fifth trace lines 230*rt*2.

According to an embodiment of the inventive concept, in a pen proximity sensing driving mode or a high sensitivity driving mode, the sensor driver 200C may receive a signal additionally from the third electrode 230. By merging the received signal with signals received from the first electrodes 210 or the second electrodes 220, the sensitivity may be increased. Therefore, recognition sensitivity for the pen's approach may be more increased.

Figure 27:
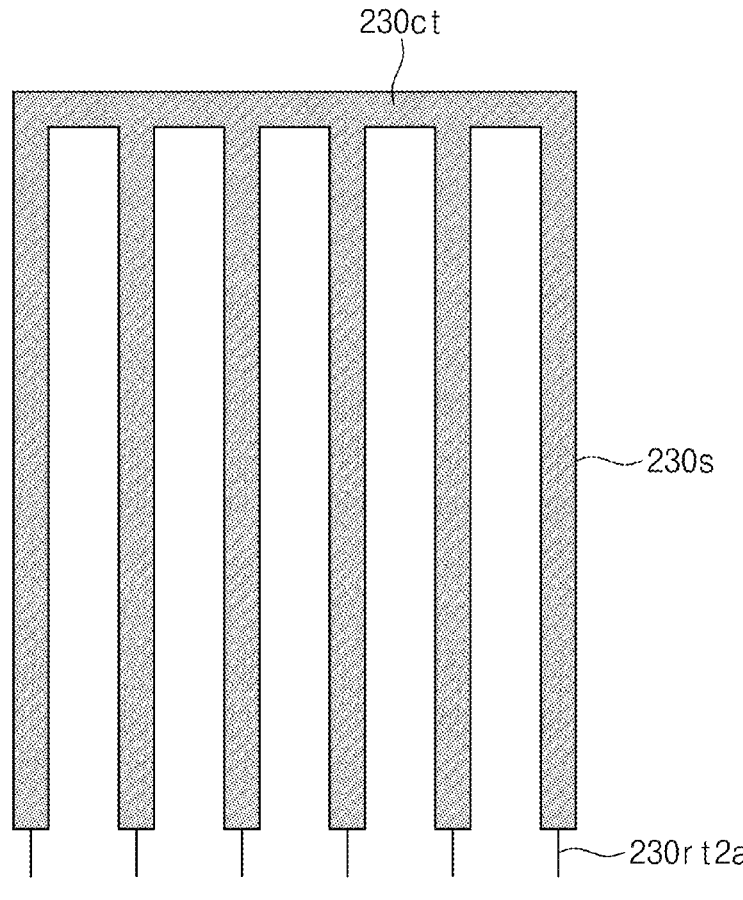
FIG. 27 is a drawing illustrating a partial configuration of a sensor layer according to an embodiment of the inventive concept.

FIG. 27 is a drawing illustrating a partial configuration of a sensor layer according to an embodiment of the inventive concept.

Referring to FIGS. 6 and 27, a plurality of first auxiliary electrodes 230*s*, a connection electrode 230*ct*, and a plurality of fifth trace lines 230*rt*2*a* are exemplarily illustrated. The connection electrode 230*ct* may be connected to one end portions of the first auxiliary electrodes 230*s* to electrically connect the first auxiliary electrodes 230*s* to each other. The connection electrode 230*ct* may be referred to as a shorting bar.

According to an embodiment of the inventive concept, the first auxiliary electrodes 230*s* and the fifth trace lines 230*rt*2*a* may be electrically connected to each other in a one-to-one correspondence. Therefore, the number of first auxiliary electrodes 230*s* and the number of fifth trace lines 230*rt*2*a* may be the same. However, this is only an example. For example, in an embodiment, at least two first auxiliary electrodes 230*s* are electrically connected to a single fifth trace line 230*rt*2.

According to an embodiment of the inventive concept, in a pen proximity sensing driving mode or in a high sensitivity driving mode, the sensor driver 200C may receive a signal additionally from the first auxiliary electrodes 230*s* that are electrically connected to each other. By merging the received signal with signals received from the first electrodes 210 or the second electrodes 220, the sensitivity may be increased. Therefore, recognition sensitivity for the pen's approach may be more increased.

Figure 28:
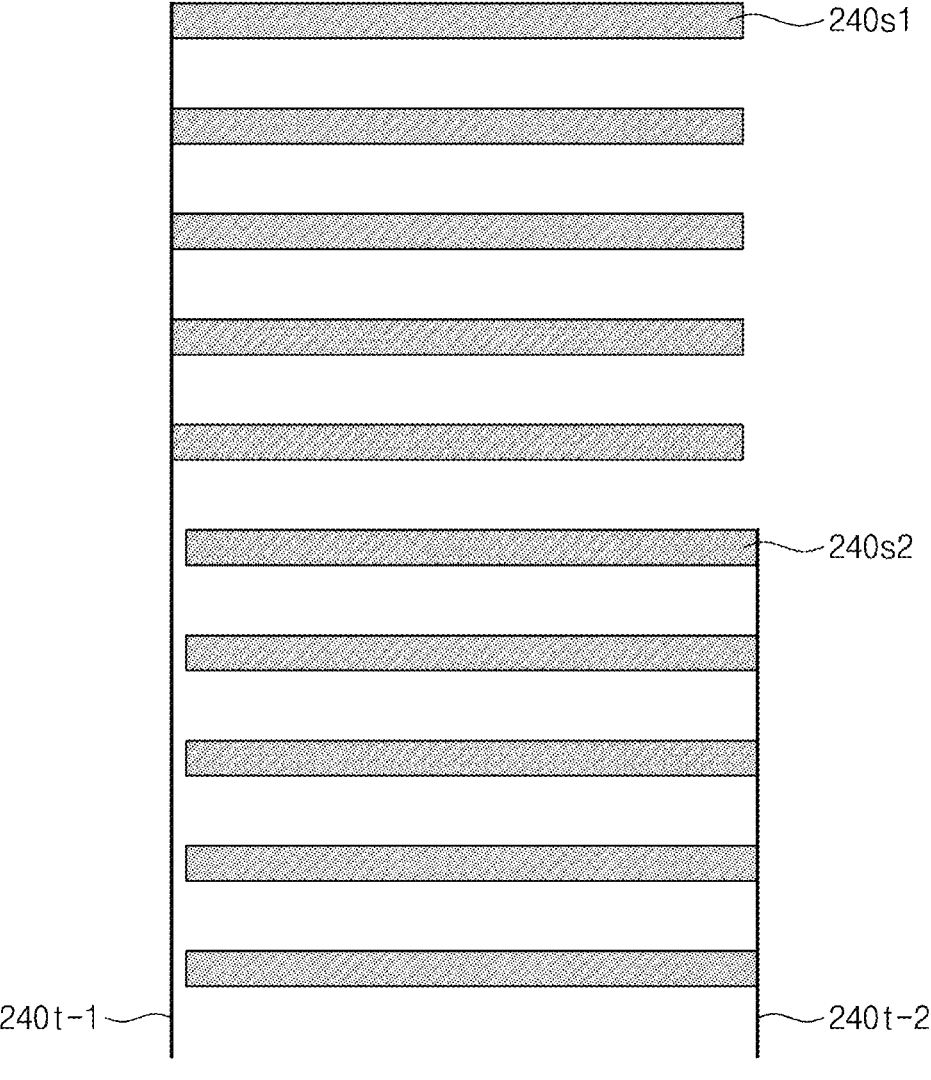
FIG. 28 is a drawing illustrating a partial configuration of a sensor layer according to an embodiment of the inventive concept.

FIG. 28 is a drawing illustrating a partial configuration of a sensor layer according to an embodiment of the inventive concept. FIG. 28 schematically illustrates the second auxiliary electrodes 240*s*1 and 240*s*2 and the fourth trace lines 240*t*-1 and 240*t*-2 illustrated in FIG. 6.

Referring to FIGS. 6 and 28, some second auxiliary electrodes 240*s*1 may be electrically connected to a single fourth trace line 240*t*-1. The other second auxiliary electrodes 240*s*2 may be electrically connected to the other fourth trace line 240*t*-2. The one fourth trace line 240*t*-1 and the other fourth trace line 240*t*-2 may be spaced apart from each other in the extending direction of each of the second auxiliary electrodes 240*s*1 and 240*s*2.

Since some second auxiliary electrodes 240*sl* are electrically connected to one fourth trace line 240*t*-1, and the other second auxiliary electrodes 240*s*2 are electrically connected to the other fourth trace line 240*t*-2, the fourth electrodes 240 may not be used for detailed coordinate recognition. However, according to an embodiment of the inventive concept, in a pen proximity sensing driving mode or in a high sensitivity driving mode, the sensor driver 200C (see FIG. 4) may receive a signal additionally from the second auxiliary electrodes 240*s*1 and 240*s*2. By merging the received signal with signals received from the first electrodes 210 or the second electrodes 220, the sensitivity may be increased. Therefore, recognition sensitivity for the pen's approach may be more increased.

Figure 29:
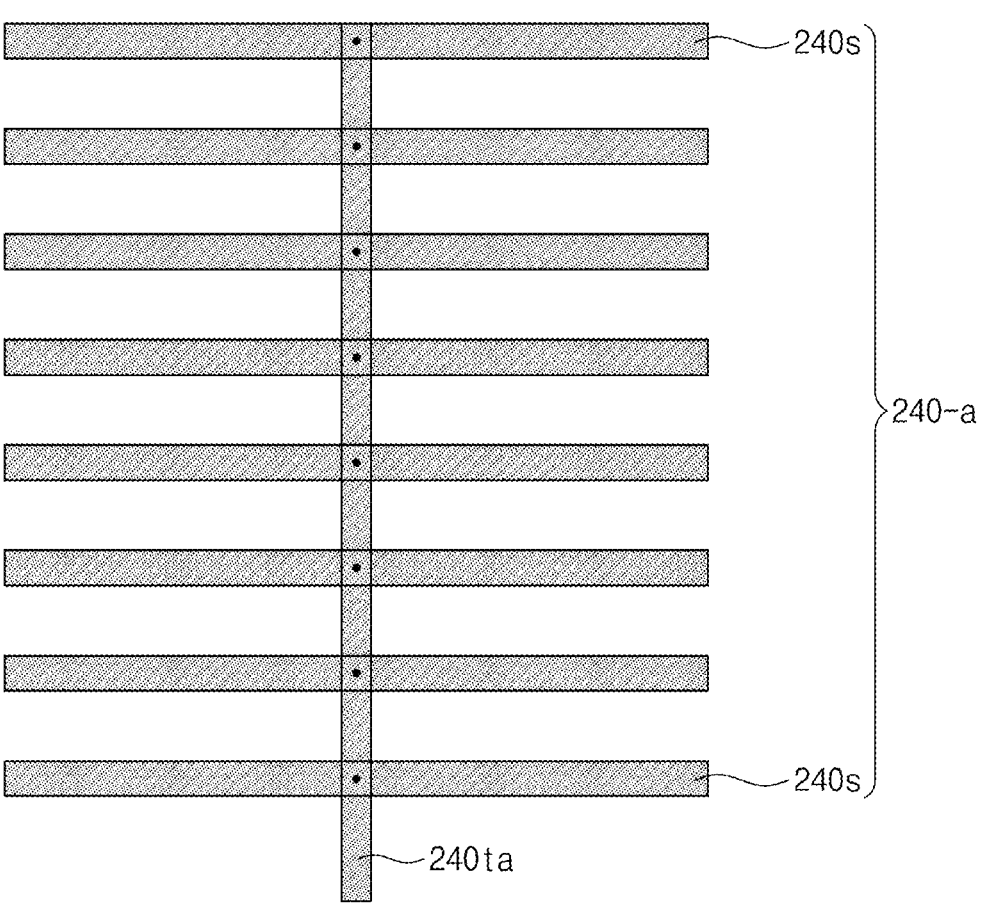
FIG. 29 is a drawing illustrating a partial configuration of a sensor layer according to an embodiment of the inventive concept.
Figure 30:
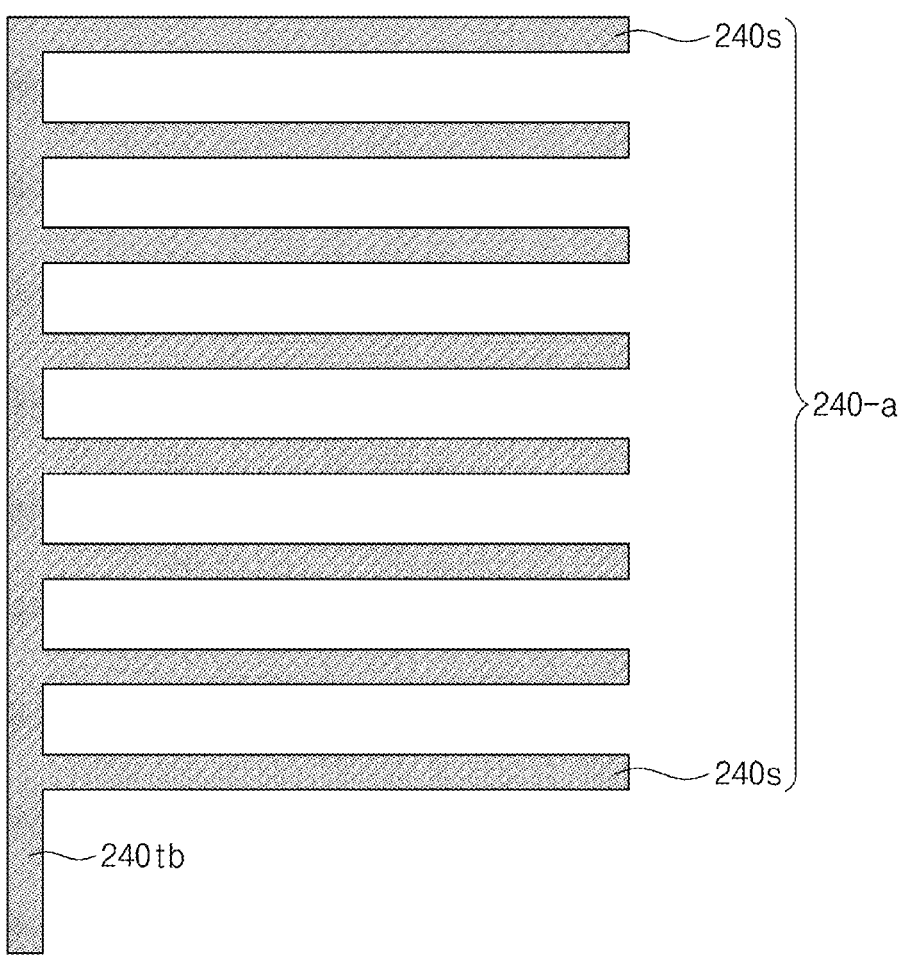
FIG. 30 is a drawing illustrating a partial configuration of a sensor layer according to an embodiment of the inventive concept.

FIG. 29 is a drawing illustrating a partial configuration of a sensor layer according to an embodiment of the inventive concept. FIG. 30 is a drawing illustrating a partial configuration of a sensor layer according to an embodiment of the inventive concept.

Referring to FIG. 29, a fourth electrode 240-*a* may include a plurality of second auxiliary electrodes 240*s*. In an embodiment, all of the second auxiliary electrodes 240*s* are electrically connected to a single fourth trace line 240*ta*. The fourth trace line 240*ta* may also be referred to as a connection electrode. The fourth trace line 240*ta* may be connected to the second auxiliary electrodes 240*s* in regions respectively overlapping the second auxiliary electrodes 240*s*.

Referring to FIG. 30, a fourth electrode 240-*a* may include a plurality of second auxiliary electrodes 240*s*. In an embodiment, all of the second auxiliary electrodes 240*s* are electrically connected to a single fourth trace line 240*tb*. The fourth trace line 240*tb* may be connected to one end portion of each of the second auxiliary electrodes 240*s*.

Referring to FIGS. 6, 29, and 30, in the pen proximity sensing driving mode or in a high sensitivity driving mode, the sensor driver 200C (see FIG. 4) may receive a signal additionally from the fourth electrode 240-*a*. By merging the received signal with signals received from the first electrodes 210 or the second electrodes 220, the sensitivity may be increased. Therefore, recognition sensitivity for the pen's approach may be more increased.

According to at least one embodiment described above, by using a sensor layer, not only an input by a touch but also an input by a pen may be sensed. Therefore, since a separate component for pen sensing (for example, a digitizer) not need to be added to an electronic device, increases in thickness and weight and decrease in flexibility, caused by the addition of the digitizer, may not occur. In addition, in a pen proximity sensing driving mode or in a high sensitivity driving mode, a sensor driver may be provided to receive a signal additionally from at least one of a third electrode or a fourth electrode, as well as first electrodes or second electrodes. In this case, recognition sensitivity for the approach of the pen may be more increased.

Although embodiments of the inventive concept have been described, it is understood that the inventive concept is not limited to these embodiments but various changes and modifications can be made by one ordinary skilled in the art within the spirit and scope of the inventive concept as hereinafter claimed.

What is claimed is:
1. An electronic device comprising:
a sensor layer; and
a sensor driver configured to operate in one of a first mode to drive the sensor layer to sense input by a touch and a second mode to drive the sensor layer to sense input by a pen,
wherein the sensor layer comprises:
a plurality of first electrodes arranged along a first direction, and extending along a second direction crossing the first direction;
a plurality of second electrodes arranged along the second direction, and extending along the first direction;
a third electrode having a plurality of first auxiliary electrodes which are arranged along the first direc- tion, extend along the second direction, and overlap the plurality of first electrodes in a plan view; and a fourth electrode having a plurality of second auxiliary electrodes which are arranged along the second direction, extend along the first direction, and, and wherein the sensor driver is configured to receive a signal from the plurality of first electrodes, the plurality of second electrodes, and at least one electrode among the third electrode, and the fourth electrode, in the second mode.

2. The electronic device of claim 1, wherein the sensor driver comprises an analog front-end circuit, and the analog front-end circuit is selectively connected to the at least one electrode in the second mode.

3. The electronic device of claim 1, wherein in the second mode, the sensor driver is configured to calculate first data based on signals received from the plurality of first electrodes, the plurality of second electrodes, the third electrode, and the fourth electrode, the sensor driver is configured to calculate second data based on signals received from the plurality of first electrodes, the plurality of second electrodes, and the fourth electrode, and the sensor driver is configured to calculate third data based on signals received from the plurality of first electrodes and the plurality of second electrodes.

4. The electronic device of claim 3, wherein the sensor driver is configured to determine a distance section between the sensor layer and the pen by comparing the first data to a first threshold value, comparing the second data to a second threshold value, and comparing the third data to a third threshold value.

5. The electronic device of claim 3, wherein the sensor driver is configured to determine a distance section between the sensor layer and the pen by comparing a sum of the first data, the second data, and the third data to a plurality of threshold values.

6. The electronic device of claim 3, wherein distance sections between the sensor layer and the pen comprise a contact section which is most adjacent to the sensor layer, a proximity section which is above the contact section, and a remote distance section which is above the proximity section, and the sensor driver is configured to deactivate the third electrode and the fourth electrode when it is determined that the pen is positioned in the contact section, and deactivate the third electrode when it is determined that the pen is positioned in the proximity section.

7. The electronic device of claim 1, wherein one first electrode among the plurality of first electrodes overlaps one first auxiliary electrode among the plurality of first auxiliary electrodes, and one second electrode among the plurality of second electrodes overlaps one second auxiliary electrode among the plurality of second auxiliary electrodes, and a first coupling capacitor is between the one first electrode and the one first auxiliary electrode, and a second coupling capacitor is between the one second electrode and the one second auxiliary electrode.

8. The electronic device of claim 7, wherein in the second mode, the sensor driver is configured to operate in a normal operation mode where a first induced current, flowing from the one first auxiliary electrode toward the one first electrode through the first coupling capacitor, is received, and a second induced current, flowing from the one second auxiliary electrode toward the one second electrode through the second coupling capacitor, is received.

9. The electronic device of claim 8, wherein in the second mode, the sensor driver operates in a time-division manner in the normal operation mode and operates in one of a first operation mode, a second operation mode, and a third operation mode, where signals are received from the plurality of first electrodes, the plurality of second electrodes, the plurality of first auxiliary electrodes, and the plurality of second auxiliary electrodes in the first operation mode;

where signals are received from the plurality of first electrodes, the plurality of second electrodes, and the plurality of second auxiliary electrodes in the second operation mode; and where signals are received from the plurality of first electrodes, the plurality of second electrodes, and the plurality of first auxiliary electrodes in the third operation mode.

10. The electronic device of claim 1, wherein the sensor layer further comprises:

a plurality of first trace lines electrically connected to the plurality of first electrodes in a one-to-one correspondence;

a plurality of second trace lines electrically connected to the plurality of second electrodes in a one-to-one correspondence;

a third trace line electrically connected to the plurality of first auxiliary electrodes; and a fourth trace line electrically connected to at least one second auxiliary electrode among the plurality of second auxiliary electrodes.

11. The electronic device of claim 10, wherein all of the plurality of second auxiliary electrodes are electrically connected to the fourth trace line.

12. The electronic device of claim 11, wherein the fourth trace line is connected to one end portion of each of the plurality of second auxiliary electrodes.

13. The electronic device of claim 11, wherein the fourth trace line is connected to each of the plurality of second auxiliary electrodes in a region where the fourth trace line overlaps each of the plurality of second auxiliary electrodes.

14. The electronic device of claim 10, wherein the fourth trace line is provided in plurality, one fourth trace line is electrically connected to some second auxiliary electrodes among the plurality of second auxiliary electrodes, and another fourth trace line is electrically connected to the other second auxiliary electrodes among the plurality of second auxiliary electrodes, and the one fourth trace line is spaced apart from the other fourth trace line in the first direction.

15. The electronic device of claim 10, wherein the third trace line is connected to first end portions of the plurality of first auxiliary electrodes to electrically connect the first end portions to each other, second end portions of the plurality of first auxiliary electrodes are spaced apart from the first end portions in the second direction, and the second end portions are spaced apart from each other.

16. The electronic device of claim 15, wherein the third trace line comprises a first line portion extending along the first direction and electrically connected to the first end portions of the plurality of first auxiliary electrodes, a second line portion extending from one end of the first line portion along the second direction, and a third line portion extending from the other end of the first line portion along the second direction.

17. The electronic device of claim 16, wherein the sensor layer further comprises a plurality of fifth trace lines electrically connected to the plurality of first auxiliary electrodes.

18. The electronic device of claim 17, wherein the sensor driver comprises an analog front-end circuit, and the analog front-end circuit is selectively connected to at least one of the second line portion, the third line portion, or the plurality of fifth trace lines in the second mode.

19. An electronic device comprising:

a sensor layer; and a sensor driver configured to operate in one of a first mode to drive the sensor layer to sense an input by a touch and a second mode to drive the sensor layer to sense an input by a pen, and including an analog front-end circuit, wherein the sensor layer comprises:

a first electrode;

a second electrode crossing the first electrode;

a first auxiliary electrode overlapping the first electrode in a plan view; and a second auxiliary electrode overlapping the second electrode in a plan view, and wherein the second mode includes a pen sensing driving mode and a pen proximity sensing driving mode, wherein, in the pen sensing driving mode, the analog front-end circuit is electrically connected to the first electrode and the second electrode, and wherein, in the pen proximity sensing driving mode, the analog front-end circuit is electrically connected to the first electrode, the second electrode, and at least one electrode among the first auxiliary electrode and the second auxiliary electrode.

20. The electronic device of claim 19, wherein in the second mode, the sensor driver is configured to calculate first data based on signals received from the first electrode, the second electrode, the first auxiliary electrode, and the second auxiliary electrode, the sensor driver is configured to calculate second data based on signals received from the first electrode, the second electrode, and the second auxiliary electrode, the sensor driver is configured to calculate third data based on signals received from the first electrode and the second electrode, the sensor driver is configured to determine a distance section between the sensor layer and the pen by comparing the first data, the second data, and the third data to a threshold value, the distance section comprises a contact section which is most adjacent to the sensor layer, a proximity section which is above the contact section, and a remote distance section which is above the proximity section, and the sensor driver is configured to deactivate the first auxiliary electrode and the second auxiliary electrode when it is determined that the pen is positioned in the contact section, and deactivate the first auxiliary electrode when it is determined that the pen is positioned in the proximity section.

21. The electronic device of claim 19, wherein in the second mode, the sensor driver is configured to operate in a normal operation mode where a first induced current, flowing from the first auxiliary electrode toward the first electrode through a first coupling capacitor between the first electrode and the first auxiliary electrode, is received, and a second induced current, flowing from the second auxiliary electrode toward the second electrode through a second coupling capacitor between the second electrode and the second auxiliary electrode, is received.

22. The electronic device of claim 21, wherein in the second mode, the sensor driver operates in a time-division manner in the normal operation mode and operates in one of a first operation mode, a second operation mode and a third operation mode, where signals are received from the first electrode, the second electrode, the first auxiliary electrode, and the second auxiliary electrode in the first operation mode, where signals are received from the first electrode, the second electrode, and the second auxiliary electrode in the second operation mode, and where signals are received from the first electrode, the second electrode, and the first auxiliary electrode in the third operation mode.

23. An electronic device comprising:

a sensor layer; and a sensor driver configured to operate in one of a first mode to drive the sensor layer to sense an input by a touch and a second mode to drive the sensor layer to sense an input by a pen, wherein the sensor layer comprises:

a first electrode to which a first driving signal is applied in the first mode and that is configured to output a first signal in the second mode, a second electrode configured to output a first sensing signal in the first mode and that is configured to output a second signal in the second mode, a third electrode overlapping the first electrode in a plan view, and configured to output a third signal in the second mode, and a fourth electrode overlapping the second electrode in a plan view, and configured to output a fourth signal in the second mode, wherein the second mode includes a pen sensing driving mode and a pen proximity sensing driving mode, and in the pen proximity sensing driving mode, the sensor driver is configured to calculate a plurality of pieces of data based on the third signal and the fourth signal, and determine a distance section between the sensor layer and the pen based on the plurality of pieces of data.

24. The electronic device of claim 23, wherein in the pen proximity sensing driving mode, the sensor driver is configured to further receive the first signal from the first electrode, and further receive the second signal from the second electrode.

25. The electronic device of claim 24, wherein in the pen proximity sensing driving mode, the sensor driver is configured to calculate first data based on signals received from the first electrode, the second electrode, the third electrode, and the fourth electrode, the sensor driver is configured to calculate second data based on signals received from the first electrode, the second electrode, and the fourth electrode, and the sensor driver is configured to calculate third data based on the signals received from the first electrode and the second electrode.

26. The electronic device of claim 25, wherein the sensor driver is configured to determine the distance section between the sensor layer and the pen by comparing the first data to a first threshold value, the second data to a second threshold value, and the third data to a third threshold value.

27. The electronic device of claim 25, wherein the sensor driver is configured to determine the distance section between the sensor layer and the pen by comparing a sum of the first data, the second data, and the third data to a plurality of threshold values.

* * * * *